United States Patent
Zhang et al.

(10) Patent No.: US 11,064,537 B2
(45) Date of Patent: Jul. 13, 2021

(54) RANDOM ACCESS PROCEDURE FALLBACK

(71) Applicant: QUALCOMM Incorporated, San Diego, CA (US)

(72) Inventors: Xiaoxia Zhang, San Diego, CA (US); Jing Sun, San Diego, CA (US); Sony Akkarakaran, Poway, CA (US); Muhammad Nazmul Islam, Littleton, MA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/746,704

(22) Filed: Jan. 17, 2020

(65) Prior Publication Data

US 2020/0252973 A1 Aug. 6, 2020

Related U.S. Application Data

(60) Provisional application No. 62/800,329, filed on Feb. 1, 2019.

(51) Int. Cl.
*H04W 74/08* (2009.01)
*H04W 76/10* (2018.01)

(52) U.S. Cl.
CPC ....... *H04W 74/0833* (2013.01); *H04W 76/10* (2018.02)

(58) Field of Classification Search
CPC .......................... H04W 74/0833; H04W 76/10
See application file for complete search history.

(56) References Cited

U.S. PATENT DOCUMENTS

2018/0103465 A1 4/2018 Agiwal et al.
2018/0116000 A1 4/2018 Ly et al.
(Continued)

FOREIGN PATENT DOCUMENTS

WO WO-2018175809 A1 9/2018

OTHER PUBLICATIONS

International Search Report and Written Opinion—PCT/US2020/014407—ISA/EPO—dated Apr. 24, 2020.
(Continued)

*Primary Examiner* — Jae Y Lee
(74) *Attorney, Agent, or Firm* — Holland & Hart LLP/Qualcomm

(57) ABSTRACT

This disclosure provides systems, methods and apparatus for wireless communications that support fallback from a 2-step to a 4-step random access procedures. A user equipment (UE) may establish a connection with a base station using a random access procedure. The random access procedure may be a 2-step random access procedure and reduce a number of handover exchange messages. The 2-step random access procedure may include the UE transmitting, to the base station, a first random access message including a preamble and a payload. In some implementations, the base station may receive the preamble but fail to receive or decode the payload. The random access procedure may utilize the received preamble information instead of performing retransmission of the first random access message. The base station may transmit a second random access message to the UE indicating, explicitly or implicitly, a fallback to a 4-step random access procedure for connection establishment.

30 Claims, 28 Drawing Sheets

(56) References Cited

U.S. PATENT DOCUMENTS

| | | | |
|---|---|---|---|
| 2020/0092777 A1* | 3/2020 | Agiwal | H04W 24/08 |
| 2020/0107322 A1* | 4/2020 | Lunttila | H04W 74/0833 |
| 2020/0146069 A1* | 5/2020 | Chen | H04W 52/362 |
| 2020/0267774 A1* | 8/2020 | Vos | H04L 1/1861 |

OTHER PUBLICATIONS

LG Electronics Inc: "2-Step RACH Procedure for NR-U", 3GPP Draft,3GPP TSG-RAN WG2 #103bis, R2-1818098, 3rd Generation Partnership Project (3GPP), Mobile Competence Centre, 650, Route Des Lucioles, F-06921, Sophia-Antipolis Cedex, France, vol. RAN WG2, No. Spokane, USA, Nov. 12, 2018-Nov. 16, 2018, Nov. 12, 2018 (Nov. 12, 2018), XP051557604, pp. 1-4, Retrieved from the Internet: URL: http://www.3gpp.org/ftp/Meetings%05F3GPP%5FSYNC/RAN2/Docs/R2%2D1818098%2Ezip [retrieved on Nov. 12, 2018], Sections 1 and 2, p. 1-p. 4.

VIVO: "RAN2 Impacts of 2-step RACH", 3GPP Draft, R2-1818260, RAN2 Impacts of 2-step RACH, 3GPP TSG-RAN WG2 Meeting #104, 3rd Generation Partnership Project (3GPP), Mobile Competence Centre, 650, Route Des Lucioles, F-06921, Sophia-Antipolis Cedex, France, vol. RAN WG2, No. Spokane, USA, Nov. 12, 2018-Nov. 16, 2018, Nov. 12, 2018 (Nov. 12, 2018), XP051557761, 5 pages, Retrieved from the Internet: URL: http://www.3gpp.org/ftp/Meetings%5F3GPP%5FSYNC/RAN2/Docs/R2%2D1818260%2Ezip [retrieved on Nov. 12, 2018], Sections 1 and 2, p. 1-p. 4.

* cited by examiner

RANDOM ACCESS PROCEDURE FALLBACK

CROSS REFERENCE

The present application for patent claims the benefit of U.S. Provisional Patent Application No. 62/800,329 by ZHANG et al., entitled "RANDOM ACCESS PROCEDURE FALLBACK," filed Feb. 1, 2019, assigned to the assignee hereof, and expressly incorporated herein.

TECHNICAL FIELD

This disclosure relates to wireless communications, and more specifically to random access procedure fallback.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support one or more random access procedures for communication between a UE and a base station, including an initial access to a channel, a connection re-establishment, a handover procedure, or synchronization on the channel. The random access procedures may involve a series of handshake messages exchanged between the UE and the base station. In some implementations, the exchange may be associated with a non-contention based random access procedure and the UE may transmit one or more messages based on a reserved preamble sequence. In some other implementations (such as unlicensed spectrum band operations), the UE may perform channel sensing (such as listen-before-talk (LBT) procedure) before transmitting one or more messages on available resources of the channel, as part on the exchange.

As demand for communication access increases, a wireless communications system may support methods for reducing the number of handshake messages exchanged between a UE and a base station. The reduced random access procedure may minimize potential delays for channel access, particularly for contention-based procedures. In some implementations, however, a base station may fail to receive or decode a data payload of the exchange. Consequently, improved techniques for performing random access procedures are needed.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication at a UE. The method may include transmitting, to a base station, a first random access message of a first random access procedure, the first random access message including a random access preamble and a connection request, monitoring a response window of a channel to receive a second random access message in response to the first random access message, the response window based on a configured timer, identifying a format of the second random access message based on the receiving, where the format of the second random access message indicates one of: the first random access procedure or a second random access procedure, and establishing a connection with the base station based on the first random access message, the second random access message, and the indicated one of the first random access procedure or the second random access procedure.

Another innovative aspect of the subject matter described in this disclosure can be implemented in an apparatus for wireless communication at a UE. The apparatus may include a processor, memory in electronic communication with the processor, and instructions stored in the memory. The instructions may be executable by the processor to cause the apparatus to transmit, to a base station, a first random access message of a first random access procedure, the first random access message including a random access preamble and a connection request, monitor a response window of a channel to receive a second random access message in response to the first random access message, the response window based on a configured timer, identify a format of the second random access message based on the receiving, where the format of the second random access message indicates one of: the first random access procedure or a second random access procedure, and establish a connection with the base station based on the first random access message, the second random access message, and the indicated one of the first random access procedure or the second random access procedure.

Another innovative aspect of the subject matter described in this disclosure can be implemented in an apparatus for wireless communication at a UE. The apparatus may include means for transmitting, to a base station, a first random access message of a first random access procedure, the first random access message including a random access preamble and a connection request, monitoring a response window of a channel to receive a second random access message in response to the first random access message, the response window based on a configured timer, identifying a format of the second random access message based on the receiving, where the format of the second random access message indicates one of: the first random access procedure or a second random access procedure, and establishing a connection with the base station based on the first random access message, the second random access message, and the indicated one of the first random access procedure or the second random access procedure.

Another innovative aspect of the subject matter described in this disclosure can be implemented in a non-transitory computer-readable medium storing code for wireless communication at a UE. The code may include instructions executable by a processor to transmit, to a base station, a first random access message of a first random access procedure, the first random access message including a random access preamble and a connection request, monitor a response window of a channel to receive a second random access message in response to the first random access message, the response window based on a configured timer, identify a format of the second random access message based on the receiving, where the format of the second random access message indicates one of: the first random access procedure or a second random access procedure, and establish a connection with the base station based on the first random access message, the second random access message, and the indicated one of the first random access procedure or the second random access procedure.

In some implementations, the method, apparatuses, and non-transitory computer-readable medium can include identifying the format of the second random access message and further may include operations, features, means, or instructions for determining the second random access message includes at least a random access response and a connection setup message for the first random access procedure.

In some implementations, the method, apparatuses, and non-transitory computer-readable medium can include identifying the format of the second random access message and further may include operations, features, means, or instructions for determining the second random access message includes at least a preamble index and an uplink grant indicating a switch from the first random access procedure to the second random access procedure.

In some implementations, the method, apparatuses, and non-transitory computer-readable medium can include operations, features, means, or instructions for transmitting a third random access message based on the switch from the first random access procedure to the second random access procedure, the third random access message including a retransmission of the connection request, receiving a fourth random access message from the base station in response to the third random access message, the fourth random access message including a connection setup message in response to the connection request, and where establishing the connection can be further based on the third random access message and the fourth random access message.

In some implementations, the method, apparatuses, and non-transitory computer-readable medium can include operations, features, means, or instructions for initiating the response window of the channel following the connection request.

In some implementations, the method, apparatuses, and non-transitory computer-readable medium can include operations, features, means, or instructions for initiating the response window of the channel following the random access preamble and prior to the connection request.

In some implementations, the method, apparatuses, and non-transitory computer-readable medium can include operations, features, means, or instructions for sensing the channel prior to at least one of the random access preamble or the connection request, and where the transmitting can be based on sensing the channel, the transmitting spanning one or more physical uplink shared channel transmit occasions.

In some implementations, the method, apparatuses, and non-transitory computer-readable medium can include that the first random access procedure can be a two-step random access procedure and the second random access procedure can be a four-step random access procedure.

One innovative aspect of the subject matter described in this disclosure can be implemented in a method at a UE. The method may include transmitting, to a base station, a first random access message of a first random access procedure, the first random access message including a random access preamble and a connection request, monitoring one or more response windows of a channel to receive a second random access message in response to the first random access message, selecting one of the first random access procedure or a second random access procedure, where the selection is based on a response window of the one or more response windows over which the second random access message is received, and establishing a connection with the base station based on the first random access message, the second random access message, and the selected one of the first random access procedure or the second random access procedure.

Another innovative aspect of the subject matter described in this disclosure can be implemented in an apparatus for wireless communication at a UE. The apparatus may include a processor, memory in electronic communication with the processor, and instructions stored in the memory. The instructions may be executable by the processor to cause the apparatus to transmit, to a base station, a first random access message of a first random access procedure, the first random access message including a random access preamble and a connection request, monitor one or more response windows of a channel to receive a second random access message in response to the first random access message, select one of the first random access procedure or a second random access procedure, where the selection is based on a response window of the one or more response windows over which the second random access message is received, and establish a connection with the base station based on the first random access message, the second random access message, and the selected one of the first random access procedure or the second random access procedure.

Another innovative aspect of the subject matter described in this disclosure can be implemented in an apparatus for wireless communication at a UE. The apparatus may include means for transmitting, to a base station, a first random access message of a first random access procedure, the first random access message including a random access preamble and a connection request, monitoring one or more response windows of a channel to receive a second random access message in response to the first random access message, selecting one of the first random access procedure or a second random access procedure, where the selection is based on a response window of the one or more response windows over which the second random access message is received, and establishing a connection with the base station based on the first random access message, the second random access message, and the selected one of the first random access procedure or the second random access procedure.

Another innovative aspect of the subject matter described in this disclosure can be implemented in a non-transitory computer-readable medium storing code for wireless communication at a UE. The code may include instructions executable by a processor to transmit, to a base station, a first random access message of a first random access procedure, the first random access message including a random access preamble and a connection request, monitor one or more response windows of a channel to receive a second random access message in response to the first random access message, select one of the first random access procedure or a second random access procedure, where the selection is based on a response window of the one or more response windows over which the second random access message is received, and establish a connection with the base station based on the first random access message, the second random access message, and the selected one of the first random access procedure or the second random access procedure.

In some implementations, the method, apparatuses, and non-transitory computer-readable medium can include operations, features, means, or instructions for transmitting a third random access message to the base station based at least in part selecting the second random access procedure, the third random access message including a retransmission of the connection request, receiving a fourth random access message from the base station in response to the third random access message, the fourth random access message including a connection setup message in response to the connection request, and where establishing the connection can be further based on the third random access message and the fourth random access message.

In some implementations, the method, apparatuses, and non-transitory computer-readable medium can include operations, features, means, or instructions for initiating, following the random access preamble, a first response window of the one or more response windows, monitoring the first response window for receiving the second random access message as part of the first random access procedure, initiating, following the connection request, a second response window of the one or more response windows, and monitoring the second response window for receiving the second random access message as part of the second random access procedure.

In some implementations, the method, apparatuses, and non-transitory computer-readable medium can include that the first response window can be based on a first configured timer and the second response window can be based on a second configured timer.

In some implementations, the method, apparatuses, and non-transitory computer-readable medium can include that the first response window and the second response window span different temporal durations.

In some implementations, the method, apparatuses, and non-transitory computer-readable medium can include that the first response window and the second response window overlap during a temporal duration.

In some implementations, the method, apparatuses, and non-transitory computer-readable medium can include operations, features, means, or instructions for initiating the response window of the one or more response windows following the random access preamble, monitoring, prior to the connection request, the response window for receiving the second random access message as part of the first random access procedure, and monitoring, following the connection request, the response window for receiving the second random access message as part of the first random access procedure or the second random access procedure.

In some implementations, the method, apparatuses, and non-transitory computer-readable medium can include operations, features, means, or instructions for initiating the response window of the one or more response windows following the connection request, and monitoring the response window for receiving the second random access message as part of the first random access procedure or the second random access procedure.

In some implementations, the method, apparatuses, and non-transitory computer-readable medium can include that the first random access procedure can be a two-step random access procedure and the second random access procedure can be a four-step random access procedure.

One innovative aspect of the subject matter described in this disclosure can be implemented in a method of wireless communication at a UE. The method may include transmitting, to a base station, a first random access message of a first random access procedure, the first random access message including a random access preamble and a first redundancy version of a connection request, receiving, in response to the first random access message, a second random access message indicating a switch from the first random access procedure to a second random access procedure, transmitting a third random access message in response to the indicated switch from the first random access procedure to the second random access procedure, the third random access message including at least one of a new data indicator or a second redundancy version of the connection request, and receiving a fourth random access message from the base station in response to the third random access message, the fourth random access message including a connection setup message in response to the connection request.

Another innovative aspect of the subject matter described in this disclosure can be implemented in an apparatus for wireless communication at a UE. The apparatus may include a processor, memory in electronic communication with the processor, and instructions stored in the memory. The instructions may be executable by the processor to cause the apparatus to transmit, to a base station, a first random access message of a first random access procedure, the first random access message including a random access preamble and a first redundancy version of a connection request, receive, in response to the first random access message, a second random access message indicating a switch from the first random access procedure to a second random access procedure, transmit a third random access message in response to the indicated switch from the first random access procedure to the second random access procedure, the third random access message including at least one of a new data indicator or a second redundancy version of the connection request, and receive a fourth random access message from the base station in response to the third random access message, the fourth random access message including a connection setup message in response to the connection request.

Another innovative aspect of the subject matter described in this disclosure can be implemented in an apparatus for wireless communication at a UE. The apparatus may include means for transmitting, to a base station, a first random access message of a first random access procedure, the first random access message including a random access preamble and a first redundancy version of a connection request, receiving, in response to the first random access message, a second random access message indicating a switch from the first random access procedure to a second random access procedure, transmitting a third random access message in response to the indicated switch from the first random access procedure to the second random access procedure, the third random access message including at least one of a new data indicator or a second redundancy version of the connection request, and receiving a fourth random access message from the base station in response to the third random access message, the fourth random access message including a connection setup message in response to the connection request.

Another innovative aspect of the subject matter described in this disclosure can be implemented in a non-transitory computer-readable medium storing code for wireless communication at a UE. The code may include instructions executable by a processor to transmit, to a base station, a first random access message of a first random access procedure, the first random access message including a random access preamble and a first redundancy version of a connection request, receive, in response to the first random access message, a second random access message indicating a switch from the first random access procedure to a second random access procedure, transmit a third random access message in response to the indicated switch from the first random access procedure to the second random access procedure, the third random access message including at least one of a new data indicator or a second redundancy version of the connection request, and receive a fourth random access message from the base station in response to the third random access message, the fourth random access message including a connection setup message in response to the connection request.

In some implementations, the method, apparatuses, and non-transitory computer-readable medium can include operations, features, means, or instructions for establishing a connection with the base station based on the response to the connection request.

In some implementations, the method, apparatuses, and non-transitory computer-readable medium can include operations, features, means, or instructions for receiving an indication of the second redundancy version in the second random access message, and selecting the second redundancy version of the connection request for the third random access message based on the indication.

In some implementations, the method, apparatuses, and non-transitory computer-readable medium can include operations, features, means, or instructions for identifying a subset of a set of supported redundancy version identification values can be based on a received remaining minimum system information transmission.

In some implementations, the method, apparatuses, and non-transitory computer-readable medium can include operations, features, means, or instructions for receiving a broadcast of system information prior to transmitting the first random access message, the system information identifying a set of supported redundancy versions for the first random access message or the third random access message.

In some implementations, the method, apparatuses, and non-transitory computer-readable medium can include operations, features, means, or instructions for identifying the second redundancy version of the connection request based on a standard configuration, and where transmitting the third random access message can be based on the identifying.

In some implementations, the method, apparatuses, and non-transitory computer-readable medium can include that the second random access message includes a medium access control protocol data unit including at least an uplink grant, a timing advance command, a network identifier, and a reserved bit.

In some implementations, the method, apparatuses, and non-transitory computer-readable medium can include that the first random access procedure can be a two-step random access procedure and the second random access procedure can be a four-step random access procedure.

One innovative aspect of the subject matter described in this disclosure can be implemented in a method of wireless communication at a base station. The method may include monitoring a channel for receiving, from a UE, a first random access message of a first random access procedure, the first random access message including a random access preamble and a connection request, determining a format of a second random access message based on receiving the first random access message, where the format of the second random access message indicates one of: the first random access procedure or a second random access procedure, transmitting, to the UE, the second random access message in response to the first random access message, and establishing a connection with the base station based on the first random access message, the second random access message, and the indicated one of the first random access procedure or the second random access procedure.

Another innovative aspect of the subject matter described in this disclosure can be implemented in an apparatus for wireless communication at a base station. The apparatus may include a processor, memory in electronic communication with the processor, and instructions stored in the memory. The instructions may be executable by the processor to cause the apparatus to monitor a channel for receiving, from a UE, a first random access message of a first random access procedure, the first random access message including a random access preamble and a connection request, determine a format of a second random access message based on receiving the first random access message, where the format of the second random access message indicates one of: the first random access procedure or a second random access procedure, transmit, to the UE, the second random access message in response to the first random access message, and establish a connection with the base station based on the first random access message, the second random access message, and the indicated one of the first random access procedure or the second random access procedure.

Another innovative aspect of the subject matter described in this disclosure can be implemented in an apparatus for wireless communication at a base station. The apparatus may include means for monitoring a channel for receiving, from a UE, a first random access message of a first random access procedure, the first random access message including a random access preamble and a connection request, determining a format of a second random access message based on receiving the first random access message, where the format of the second random access message indicates one of: the first random access procedure or a second random access procedure, transmitting, to the UE, the second random access message in response to the first random access message, and establishing a connection with the base station based on the first random access message, the second random access message, and the indicated one of the first random access procedure or the second random access procedure.

Another innovative aspect of the subject matter described in this disclosure can be implemented in an non-transitory computer-readable medium storing code for wireless communication at a base station. The code may include instructions executable by a processor to monitor a channel for receiving, from a UE, a first random access message of a first random access procedure, the first random access message including a random access preamble and a connection request, determine a format of a second random access message based on receiving the first random access message, where the format of the second random access message indicates one of: the first random access procedure or a second random access procedure, transmit, to the UE, the second random access message in response to the first random access message, and establish a connection with the base station based on the first random access message, the second random access message, and the indicated one of the first random access procedure or the second random access procedure.

In some implementations, the method, apparatuses, and non-transitory computer-readable medium can include operations, features, means, or instructions for identifying the random access preamble and the connection request based on the monitoring, configuring the second random access message to include a random access response and a connection setup message for the first random access procedure, and where determining the format of the second random access message can be based on the configuring.

In some implementations, the method, apparatuses, and non-transitory computer-readable medium can include operations, features, means, or instructions for identifying an absence of the connection request or an inability to decode a payload of the first random access message based on the monitoring, configuring the second random access message to include a preamble index and an uplink grant indicating a switch from the first random access procedure to the second random access procedure, and where determining the format of the second random access message can be based on the configuring.

In some implementations, the method, apparatuses, and non-transitory computer-readable medium can include operations, features, means, or instructions for receiving, from the UE, a third random access message based on the switch from the first random access procedure to the second random access procedure, the third random access message including a retransmission of the connection request, transmitting a fourth random access message in response to the third random access message, the fourth random access message including a connection setup message in response to the connection request, and where establishing the connection can be further based on the third random access message and the fourth random access message.

In some implementations, the method, apparatuses, and non-transitory computer-readable medium can include that the first random access procedure can be a two-step random access procedure and the second random access procedure can be a four-step random access procedure.

One innovative aspect of the subject matter described in this disclosure can be implemented in a method of wireless communication at a base station. The method may include monitoring a channel for receiving, from a UE, a first random access message of a first random access procedure, the first random access message including a random access preamble and a connection request, determining a payload of the first random access message based on receiving the first random access message, transmitting, based on the determining, a second random access message in response to the first random access message, where the second random access message is associated with one of: the first random access procedure or a second random access procedure, and establishing a connection with the base station based on the first random access message, the second random access message, and the associated one of the first random access procedure or the second random access procedure.

Another innovative aspect of the subject matter described in this disclosure can be implemented in an apparatus for wireless communication at a base station. The apparatus may include a processor, memory in electronic communication with the processor, and instructions stored in the memory. The instructions may be executable by the processor to cause the apparatus to monitor a channel for receiving, from a UE, a first random access message of a first random access procedure, the first random access message including a random access preamble and a connection request, determine a payload of the first random access message based on receiving the first random access message, transmit, based on the determining, a second random access message in response to the first random access message, where the second random access message is associated with one of: the first random access procedure or a second random access procedure, and establish a connection with the base station based on the first random access message, the second random access message, and the associated one of the first random access procedure or the second random access procedure.

Another innovative aspect of the subject matter described in this disclosure can be implemented in an apparatus for wireless communication at a base station. The apparatus may include means for monitoring a channel for receiving, from a UE, a first random access message of a first random access procedure, the first random access message including a random access preamble and a connection request, determining a payload of the first random access message based on receiving the first random access message, transmitting, based on the determining, a second random access message in response to the first random access message, where the second random access message is associated with one of: the first random access procedure or a second random access procedure, and establishing a connection with the base station based on the first random access message, the second random access message, and the associated one of the first random access procedure or the second random access procedure.

Another innovative aspect of the subject matter described in this disclosure can be implemented in a non-transitory computer-readable medium storing code for wireless communication at a base station. The code may include instructions executable by a processor to monitor a channel for receiving, from a UE, a first random access message of a first random access procedure, the first random access message including a random access preamble and a connection request, determine a payload of the first random access message based on receiving the first random access message, transmit, based on the determining, a second random access message in response to the first random access message, where the second random access message is associated with one of: the first random access procedure or a second random access procedure, and establish a connection with the base station based on the first random access message, the second random access message, and the associated one of the first random access procedure or the second random access procedure.

In some implementations, the method, apparatuses, and non-transitory computer-readable medium can include operations, features, means, or instructions for identifying the random access preamble and the connection request based on the monitoring, and configuring the second random access message to include a random access response and a connection setup message for the first random access procedure.

In some implementations, the method, apparatuses, and non-transitory computer-readable medium can include operations, features, means, or instructions for identifying an absence of the connection request or an inability to decode the payload of the first random access message based on the monitoring, and configuring the second random access message to include a preamble index and an uplink grant indicating a switch from the first random access procedure to the second random access procedure.

In some implementations, the method, apparatuses, and non-transitory computer-readable medium can include operations, features, means, or instructions for multiplexing the second random access message with one or more additional random access messages for a random access response.

In some implementations, the method, apparatuses, and non-transitory computer-readable medium can include operations, features, means, or instructions for receiving, from the UE, a third random access message based on the switch from the first random access procedure to the second random access procedure, the third random access message including a retransmission of the connection request, transmitting a fourth random access message in response to the third random access message, the fourth random access message including a connection setup message in response to the connection request, and where establishing the connection can be further based on the third random access message and the fourth random access message.

In some implementations, the method, apparatuses, and non-transitory computer-readable medium can include that the first random access procedure can be a two-step random access procedure and the second random access procedure can be a four-step random access procedure.

One innovative aspect of the subject matter described in this disclosure can be implemented in a method of wireless communication at a base station. The method may include monitoring a channel for receiving, from a UE, a first random access message of a first random access procedure, the first random access message including a random access preamble and a first redundancy version of a connection request, identifying an absence of the connection request or an inability to decode a payload of the first random access message based on the monitoring, transmitting, in response to the first random access message, a second random access message indicating a switch from the first random access procedure to a second random access procedure, receiving a third random access message in response to the indicated switch from the first random access procedure to the second random access procedure, the third random access message including at least one of a new data indicator or a second redundancy version of the connection request, and transmitting a fourth random access message in response to the third random access message, the fourth random access message including a connection setup message in response to the connection request.

Another innovative aspect of the subject matter described in this disclosure can be implemented in an apparatus for wireless communication at a base station. The apparatus may include a processor, memory in electronic communication with the processor, and instructions stored in the memory. The instructions may be executable by the processor to cause the apparatus to monitor a channel for receiving, from a UE, a first random access message of a first random access procedure, the first random access message including a random access preamble and a first redundancy version of a connection request, identify an absence of the connection request or an inability to decode a payload of the first random access message based on the monitoring, transmit, in response to the first random access message, a second random access message indicating a switch from the first random access procedure to a second random access procedure, receive a third random access message in response to the indicated switch from the first random access procedure to a second random access procedure, the third random access message including at least one of a new data indicator or a second redundancy version of the connection request, and transmit a fourth random access message in response to the third random access message, the fourth random access message including a connection setup message in response to the connection request.

Another innovative aspect of the subject matter described in this disclosure can be implemented in an apparatus for wireless communication at a base station. The apparatus may include means for monitoring a channel for receiving, from a UE, a first random access message of a first random access procedure, the first random access message including a random access preamble and a first redundancy version of a connection request, identifying an absence of the connection request or an inability to decode a payload of the first random access message based on the monitoring, transmitting, in response to the first random access message, a second random access message indicating a switch from the first random access procedure to a second random access procedure, receiving a third random access message in response to the indicated switch from the first random access procedure to the second random access procedure, the third random access message including at least one of a new data indicator or a second redundancy version of the connection request, and transmitting a fourth random access message in response to the third random access message, the fourth random access message including a connection setup message in response to the connection request.

Another innovative aspect of the subject matter described in this disclosure can be implemented in a non-transitory computer-readable medium storing code for wireless communication at a base station. The code may include instructions executable by a processor to monitor a channel for receiving, from a UE, a first random access message of a first random access procedure, the first random access message including a random access preamble and a first redundancy version of a connection request, identify an absence of the connection request or an inability to decode a payload of the first random access message based on the monitoring, transmit, in response to the first random access message, a second random access message indicating a switch from the first random access procedure to a second random access procedure, receive a third random access message in response to the indicated switch from the first random access procedure to a second random access procedure, the third random access message including at least one of a new data indicator or a second redundancy version of the connection request, and transmit a fourth random access message in response to the third random access message, the fourth random access message including a connection setup message in response to the connection request.

In some implementations, the method, apparatuses, and non-transitory computer-readable medium can include operations, features, means, or instructions for establishing a connection with the base station based on the response to the connection request.

In some implementations, the method, apparatuses, and non-transitory computer-readable medium can include operations, features, means, or instructions for configuring a subset of a set of supported redundancy versions, and indicating, in the second random access message, the second redundancy version of the connection request for the third random access message.

In some implementations, the method, apparatuses, and non-transitory computer-readable medium can include operations, features, means, or instructions for transmitting, to the UE, a remaining system information transmission including the subset of the set of supported redundancy versions.

In some implementations, the method, apparatuses, and non-transitory computer-readable medium can include operations, features, means, or instructions for configuring a set of supported redundancy versions, and transmitting a broadcast of system information prior to transmitting the first random access message, the system information identifying the set of supported redundancy versions for the first random access message or the third random access message.

In some implementations, the method, apparatuses, and non-transitory computer-readable medium can include that the second random access message includes a medium access control protocol data unit including at least an uplink grant, a timing advance command, a network identifier, and a reserved bit.

In some implementations, the method, apparatuses, and non-transitory computer-readable medium can include that the first random access procedure can be a two-step random access procedure and the second random access procedure can be a four-step random access procedure.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
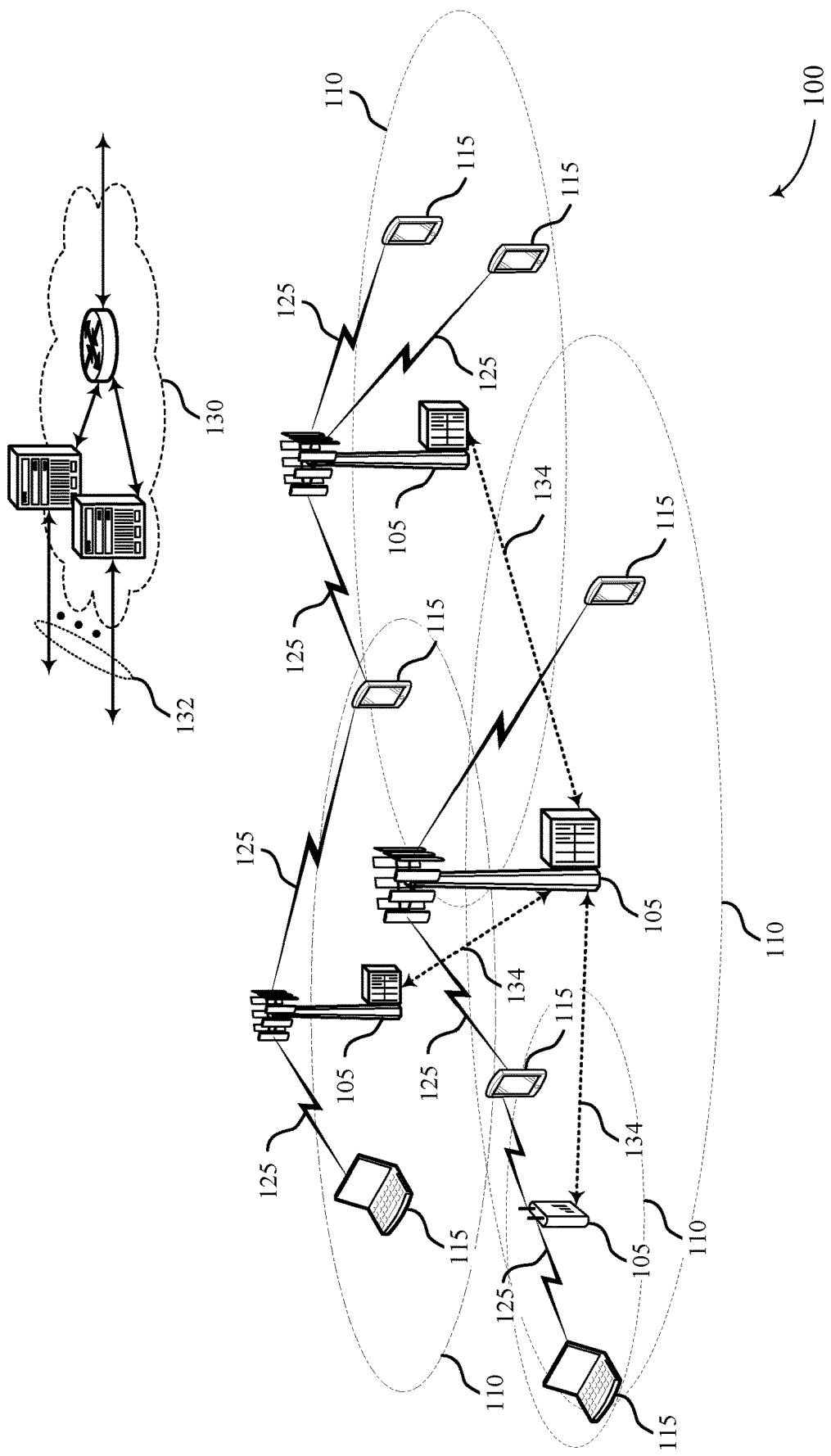
FIG. 1 illustrates an example of a wireless communications system that supports random access procedure fallback.

The following description is directed to implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the 3GPP standards, or any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), New Radio (NR), AMPS, or other known signals that are used to communicate within a wireless, cellular or internet of things (IOT) network, such as a system utilizing 3G, 4G or 5G, or further implementations thereof, technology.

A user equipment (UE) and a base station (such as a eNodeB (eNB), a next-generation NodeB or giga-NodeB (either of which may be referred to as a gNB)) may establish a connection using a random access procedure. The random access procedure may include a series of handshake messages carrying information that facilitates establishing the connection between the UE and the base station. In some implementations, a random access procedure may be a 2-step random access procedure, which may reduce latency compared to other random access procedures that use a greater number of handshake messages (such as a 4-step random access procedure). The 2-step random access procedure may include a first random access message (message A (msgA)) transmitted by the UE. The msgA transmission may include a random access channel (RACH) preamble and a physical uplink shared channel (PUSCH) payload that includes a message. In some implementations, the content of the message of the PUSCH payload may be based on a use case associated with the RACH, such as a connection setup procedure (RRC_IDLE to RRC_CONNECTED), a connection reestablishment procedure, a handover procedure, a buffer status report (BSR), or a request for system information (for example, other system information). For example, the PUSCH payload may include one or more of a connection request, such as a radio resource control (RRC) setup request (for a connection setup procedure), an RRC reestablishment request (for a connection reestablishment procedure), and a UE identification (ID) (for a handover procedure). In response, the base station may transmit a second random access message (message B (msgB)) that includes contents associated with a random access response and a connection setup based on the use case associated with the RACH. For example, the msgB may include a response to one or more of the connection request, the RRC reestablishment request, and the UE ID.

In some implementations, a base station may fail to receive or decode the PUSCH payload of the msgA transmission due to signal interference or traffic intensity on resources of the channel. For example, as part of a contention-based procedure the UE may transmit the preamble associated with msgA but fail to transmit the PUSCH payload due to a loss of contention (such as due to a signal gap between preamble and PUSCH payload transmission). In some other examples, the PUSCH payload may suffer from low signal to noise ratios due to interference or UE collision where multiple UEs transmit the PUSCH payload on overlapping resources. The random access procedure may benefit from utilizing the received preamble information instead of performing msgA retransmission.

Accordingly, the UE may fallback from a 2-step random access procedure to a 4-step random access procedure when the 2-step random access procedure is unsuccessful. Because the base station and the UE may support multiple random access procedures (such as 2-step and 4-step random access procedures), the base station may configure transmission of random access messages to enable the UE to differentiate between random access messages of different types of random access procedures (such as 2-step and 4-step random access procedures). In some implementations, the configuration may include a formatting of the msgB transmission to support multiple response types based on the msgA reception. In some other implementations, the configuration may include indicating a new data indicator or one or more redundancy versions associated with a potential msg3 transmission, as part of the fallback to the 4-step random access procedure. The msg3 transmission may include a PUSCH payload that includes a connection request, as well as a UE identifier for contention resolution. Additionally, or alternatively, the UE may support one or more response windows for monitoring the channel. The one or more response windows may be configured for identifying at least one of a msgB transmission or a msg2 transmission as part of the fallback to the 4-step random access procedure.

Particular implementations of the subject matter described in this disclosure may be implemented to realize one or more of the following potential advantages. For example, a 2-step random access procedure may be performed to reduce delay in establishing communication between a base station and a UE. The 2-step random access procedure may include support for fallback communications to a 4-step random access procedure. Fallback communication may benefit random access procedure when signal attenuation or delays in signaling impede connection establishment between a base station and a UE. As part of the fallback communication, a base station may receive and detect a preamble transmission without receiving or decoding a PUSCH payload associated with a connection request. The base station may utilize the received preamble for continued handshake exchange associated with the fallback to a 4-step random access procedure rather than performing retransmission. By utilizing the received preamble, the base station may reduce signaling overhead. In addition, a lower RACH latency may be achieved by the fallback procedure without the UE retransmitting the preamble in the msgA because the preamble has already been received by the base station successfully. In particular, the UE can be scheduled to perform msg3 transmission by a msg2 reception, instead of waiting for a msgB response expiration and attempting another 2-step random access procedure.

FIG. 1 illustrates an example of a wireless communications system 100 that supports random access procedure fallback. The wireless communications system 100 includes base stations 105, UEs 115, and a core network 130. In some implementations, the wireless communications system 100 may be an LTE network, an LTE-Advanced (LTE-A) network, an LTE-A Pro network, or an NR network. In some implementations, wireless communications system 100 may support enhanced broadband communications, ultra-reliable (such as mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation NodeB or giga-NodeB (either of which may be referred to as a gNB), a Home NodeB, a Home eNodeB, or some other suitable terminology. Wireless communications system 100 may include base stations 105 of different types (such as macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions also may be called forward link transmissions while uplink transmissions also may be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some implementations, a base station 105 may be movable and therefore provide communication coverage for a moving geographic coverage area 110. In some implementations, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (such as over a carrier), and may be associated with an identifier for distinguishing neighboring cells (such as a physical cell identifier (PCID), a virtual cell identifier (VCID)) operating via the same or a different carrier. In some implementations, a carrier may support multiple cells, and different cells may be configured according to different protocol types (such as machine-type communication (MTC), narrowband IoT (NB-IoT), enhanced mobile broadband (eMBB), or others) that may provide access for different types of devices. In some examples, the term "cell" may refer to a portion of a geographic coverage area 110 (such as a sector) over which the logical entity operates.

UEs 115 may be dispersed throughout the wireless communications system 100, and each UE 115 may be stationary or mobile. A UE 115 also may be referred to as a mobile device, a wireless device, a remote device, a handheld device, or a subscriber device, or some other suitable terminology, where the "device" also may be referred to as a unit, a station, a terminal, or a client. A UE 115 also may be a personal electronic device such as a cellular phone, a personal digital assistant (PDA), a tablet computer, a laptop computer, or a personal computer. In some implementations, a UE 115 also may refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (such as via Machine-to-Machine (M2M) communication). M2M communication or MTC may refer to data communication technologies that allow devices to communicate with one another or a base station 105 without human intervention. In some implementations, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception simultaneously). In some implementations half-duplex communications may be performed at a reduced peak rate. Other power conservation techniques for UEs 115 include entering a power saving "deep sleep" mode when not engaging in active communications, or operating over a limited bandwidth (such as according to narrowband communications). In some implementations, UEs 115 may be designed to support critical functions (such as mission critical functions), and a wireless communications system 100 may be configured to provide ultra-reliable communications for these functions.

In some examples, a UE 115 also may be able to communicate directly with other UEs 115 (such as using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In some other cases, D2D communications are carried out between UEs 115 without the involvement of a base station 105.

Base stations 105 may communicate with the core network 130 and with one another. For example, base stations 105 may interface with the core network 130 through backhaul links 132 (such as via an S1, N2, N3, or another interface). Base stations 105 may communicate with one another over backhaul links 134 (such as via an X2, Xn, or other interface) either directly (such as directly between base stations 105) or indirectly (such as via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (such as control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (such as radio heads and access network controllers) or consolidated into a single network device (such as a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (such as less than 100 km) compared to transmission using the smaller frequencies and longer waves of the high frequency (HF) or very high frequency (VHF) portion of the spectrum below 300 MHz.

Wireless communications system 100 also may operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 also may operate in an extremely high frequency (EHF) region of the spectrum (such as from 30 GHz to 300 GHz), also known as the millimeter band. In some implementations, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (such as LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some implementations, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (such as a base station 105) and a receiving device (such as a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (such as the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which also may be referred to as spatial filtering, directional transmission, or directional reception, is a signal processing technique that may be used at a transmitting device or a receiving device (such as a base station 105 or a UE 115) to shape or steer an antenna beam (such as a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (such as with respect to the antenna array of the transmitting device or receiving device, or with respect to some other orientation).

In one example, a base station 105 may use multiple antennas or antenna arrays to conduct beamforming operations for directional communications with a UE 115. For instance, some signals (such as synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (such as by the base station 105 or a receiving device, such as a UE 115) a beam direction for subsequent transmission or reception by the base station 105.

Some signals, such as data signals associated with a particular receiving device, may be transmitted by a base station 105 in a single beam direction (such as a direction associated with the receiving device, such as a UE 115). In some implementations, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (such as for identifying a beam direction for subsequent transmission or reception by the UE 115), or transmitting a signal in a single direction (such as for transmitting data to a receiving device).

A receiving device (such as a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some implementations a receiving device may use a single receive beam to receive along a single beam direction (such as when receiving a data signal). The single receive beam may be aligned in a beam direction determined based at least in part on listening according to different receive beam directions (such as a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The media access control (MAC) layer also may use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as signal-to-noise conditions). In some examples, a wireless device may support same-slot HARQ feedback, where the device may provide HARQ feedback in a specific slot for data received in a previous symbol in the slot. In some other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (such as depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In some other cases, a smallest scheduling unit of the wireless communications system 100 may be shorter than a subframe or may be dynamically selected (such as in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (such as an evolved universal mobile telecommunication system terrestrial radio access (E-UTRA) absolute radio frequency channel number (EARFCN)), and may be positioned according to a channel raster for discovery by UEs 115. Carriers may be downlink or uplink (such as in an FDD mode), or be configured to carry downlink and uplink communications (such as in a TDD mode). In some implementations, signal waveforms transmitted over a carrier may be made up of multiple sub-carriers (such as using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (such as LTE, LTE-A, LTE-A Pro, NR). For example, communications over a carrier may be organized according to TTIs or slots, each of which may include user data as well as control information or signaling to support decoding the user data. A carrier also may include dedicated acquisition signaling (such as synchronization signals or system information, etc.) and control signaling that coordinates operation for the carrier. In some implementations (such as in a carrier aggregation configuration), a carrier also may have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some implementations, control information transmitted in a physical control channel may be distributed between different control regions in a cascaded manner (such as between a common control region or common search space and one or more UE-specific control regions or UE-specific search spaces).

A carrier may be associated with a particular bandwidth of the radio frequency spectrum, and In some implementations the carrier bandwidth may be referred to as a "system bandwidth" of the carrier or the wireless communications system 100. For example, the carrier bandwidth may be one of a number of predetermined bandwidths for carriers of a particular radio access technology (such as 1.4, 3, 5, 10, 15, 20, 40, or 80 MHz). In some implementations, each served UE 115 may be configured for operating over portions or all of the carrier bandwidth. In some other implementations, some UEs 115 may be configured for operation using a narrowband protocol type that is associated with a pre-defined portion or range (such as set of subcarriers or RBs) within a carrier (such as "in-band" deployment of a narrowband protocol type).

In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (such as spatial layers), and the use of multiple spatial layers may further increase the data rate for communications with a UE 115.

Devices of the wireless communications system 100 (such as base stations 105 or UEs 115) may have a hardware configuration that supports communications over a particular carrier bandwidth, or may be configurable to support communications over one of a set of carrier bandwidths. In some implementations, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (such as when multiple serving cells have a suboptimal or non-ideal backhaul link). An eCC also may be configured for use in unlicensed spectrum or shared spectrum (such as where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (such as to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (such as according to frequency channel or carrier bandwidths of 20, 40, 60, 80 MHz, etc.) at reduced symbol durations (such as 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some implementations, NR shared spectrum may increase spectrum utilization and spectral efficiency, specifically through dynamic vertical (such as across the frequency domain) and horizontal (such as across the time domain) sharing of resources.

A base station may perform a connection procedure (such as an RRC procedure, a cell acquisition procedure, a random access procedure, an RRC connection procedure, an RRC configuration procedure) with a UE 115. For example, a base station 105 and a UE 115 may perform a random access procedure to establish a connection. In some other implementations, a base station 105 and a UE 115 may perform a random access procedure to re-establish a connection after a connection failure (such as a radio-link failure) with the base station 105, or to establish a connection for handover to another base station, or the like. As part of the random access procedure, a UE 115 may transmit a RACH preamble. This may enable the base station 105 to distinguish between multiple UEs 115 attempting to access the wireless communications system 100 simultaneously.

The base station 105 may respond with a random access response that provides an uplink resource grant, a timing advance, and a temporary cell-specific radio network temporary identifier (C-RNTI). The UE 115 may transmit an RRC connection request along with a temporary mobile subscriber identity (TMSI) (if the UE 115 has previously been connected to the same wireless network) or a random identifier. The RRC connection request also may indicate the reason the UE 115 is connecting to the network (emergency, signaling, or data exchange, among other examples). The base station 105 may respond to the connection request with a contention resolution message addressed to the UE 115, which may provide a new C-RNTI. If the UE 115 receives a contention resolution message with the correct identification, it may proceed with RRC connection setup. If the UE 115 does not, however, receive a contention resolution message (if there is a conflict with another UE 115) the UE 115 may repeat the RACH process by transmitting a new RACH preamble. As described, the exchange of messages between the UE 115 and the base station 105 for random access may be referred to as a 4-step random access procedure.

In some other implementations, a 2-step random access procedure may be performed for random access. UEs 115 that operate in licensed or unlicensed spectrum within the wireless communications system 100 may participate in a 2-step random access procedure to reduce delay in establishing communication with a base station 105 (such as compared to a 4-step random access procedure). In some implementations, the 2-step random access procedure may operate regardless of whether a UE 115 has a valid timing advance parameter. For example, a UE 115 may use a valid timing advance parameter to coordinate the timing of its transmissions to a base station 105 (to account for propagation delay) and may receive the valid timing advance parameter as part of the 2-step random access procedure. Additionally, the 2-step random access procedure may be applicable to any cell size, may work regardless of whether the random access procedure is contention-based or contention-free, and may combine multiple random access messages from a 4-step random access procedure.

For example, a first random access message (msgA), sent from a UE 115 to a base station 105 may combine the contents of a random access message 1 (msg1) and message 3 (msg3) from 4-step RACH. Additionally, msgA may consist of a RACH preamble and a PUSCH carrying a payload with the contents of the message (equivalent to msg3), where the preamble and the payload may be transmitted on separate waveforms. In some implementations, the base station 105 may transmit a downlink control channel (such as a physical downlink control channel (PDCCH)) and a corresponding second random access message (such as a msgB) to the UE 115, where msgB may combine the equivalent contents of a random access message 2 and message 4 from 4-step RACH. In some implementations of 2-step RACH, a base station 105 may transmit msgB using either broadcast methods (for example, targeting multiple UEs 115) or unicast methods (for example, targeting a specific UE 115).

In some implementations, a 2-step random access procedure may include support for fallback communications to a 4-step random access procedure. Fallback communication may benefit random access procedure when signal attenuation or delays in signaling impede connection establishment between a base station 105 and a UE 115. For example, a UE 115 may transmit a first random access message (such as a msgA) to a base station 105 as part of a 2-step random access procedure. The base station 105 may receive and detect the preamble included in the msgA, but may fail to decode the included PUSCH payload. In some other implementations, the random access procedure may be contention-based. The UE 115 may transmit the preamble associated with the msgA, but may experience intermittence in transmitting the PUSCH payload based on data traffic on the channel. The base station 105 may receive and detect the preamble without receiving the PUSCH payload associated with the random access procedure. It may be advantageous for the base station 105 to utilize the received preamble for continued handshake message exchange associated with a fallback to a 4-step random access procedure, rather than performing retransmission of the msgA associated with the 2-step random access procedure. Specifically, by utilizing the received preamble, the base station 105 may reduce signaling overhead.

As described herein, In some implementations, the base station 105 may configure different formats for a second random access message (such as a msgB). The different formats may correspond to response types of the msgB transmission and include message payloads based on the contents of the received msgA. For example, the base station 105 may configure a first response type for 2-step random access procedure. In some other implementations, the base station 105 may configure a second response type for fallback from the 2-step to a 4-step random access procedure. In some other implementations, the base station 105 may provide distinct response messages based on the received payload associated with the msgA transmission. Specifically, the base station 105 may provide a msg2 response (for example, as part of a 4-step random access procedure) following unsuccessful msgA reception and decoding, and as part of a fallback procedure. Alternatively, the base station 105 may provide a msgB response following a successful msgA response for 2-step random access procedure. In some other implementations, the base station 105 may configure a set of redundancy versions for fallback response based on an unsuccessful msgA reception or decoding. The base station 105 may indicate a new data indication or a redundancy version as part of an uplink grant included in a msg2 response and based on the fallback to a 4-step random access procedure.

A UE 115 may differentiate between the configured response types of a received msgB response. Additionally, or alternatively, the UE 115 may monitor the channel for reception according to one or more response windows. Each of the one or more response windows may be configured for msgB reception for 2-step random access procedure or msg2 reception for fallback from a 2-step to a 4-step random access procedure. Based on a fallback from a 2-step to a 4-step random access procedure, the UE 115 may retransmit the PUSCH payload of msgA in a third random access message (such as a msg3 for 4-step RACH). Following the msg3 transmission the UE 115 may receive a fourth random access message (such as a message 4 (msg4)) including a connection setup message in response to the connection request. As a result, UEs 115 may be capable of establishing a connection with one or more base stations 105 via fallback methods to a 4-step random access procedure in the circumstance of transmission failure associated with a 2-step random access procedure.

Figure 2A:
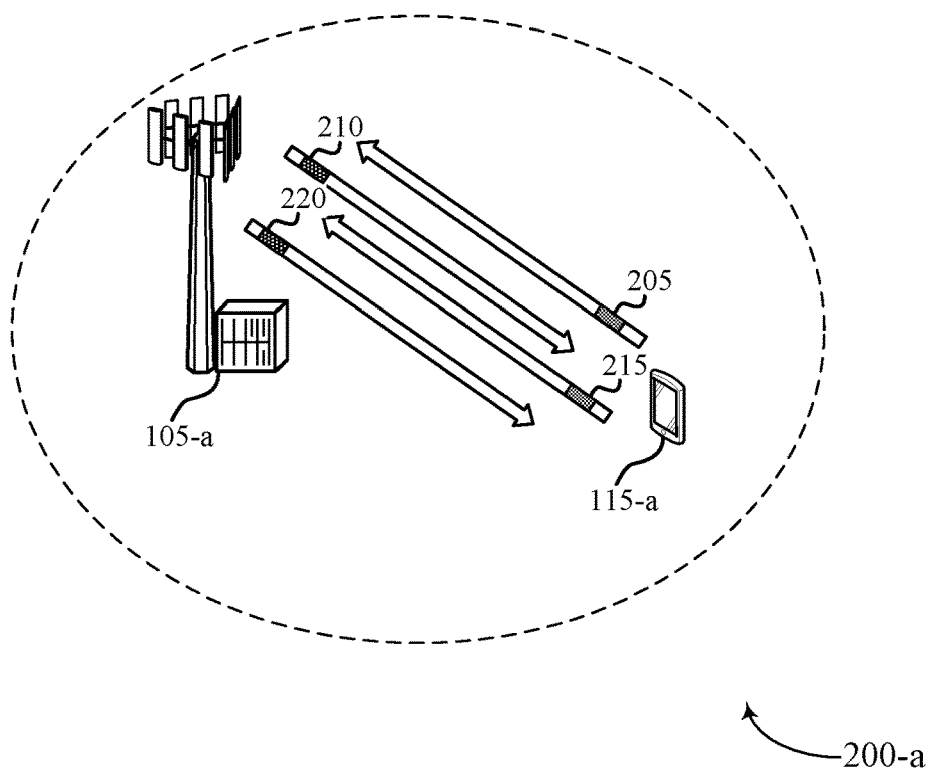
FIGS. 2A and 2B illustrate examples of wireless communications systems that support random access procedure fallback.

FIG. 2A illustrates an example of a wireless communications system 200-a that supports random access procedure fallback. The wireless communications system 200-a may include a base station 105-a and a UE 115-a, which may be examples of the corresponding devices described with reference to FIG. 1. In some implementations, the wireless communications system 200-a may implement aspects of the wireless communications system 100. For example, the base station 105-a and the UE 115-a may perform connectivity establishment via random access procedure.

The base station 105-a may perform a connection procedure (such as an RRC procedure, such as a cell acquisition procedure, a random access procedure, an RRC connection procedure, an RRC configuration procedure) with the UE 115-a. For example, base station 105-a and UE 115-a may perform a random access procedure to establish a connection for wired or wireless communication. In some other implementations, base station 105-a and UE 115-a may perform a random access procedure to re-establish a connection after a connection failure (such as a radio-link failure) with the base station 105-a, or to establish a connection for handover to another base station, or the like. The base station 105-a and the UE 115-a also may support multiple radio access technologies including 4G systems such as LTE systems, LTE-A systems, or LTE-A Pro systems, and 5G systems which may be referred to as NR systems.

The connection procedure (such as random access procedure) between the base station 105-a and the UE 115-a may correspond to, for example, at least one of the above example radio access technologies. By way of example, in FIG. 2A, a random access procedure may be related to 4G systems and may be referred to as a 4-step random access procedure. As part of the 4-step random access procedure, base station 105-a and UE 115-a may transmit one or more messages (handshake messages), such as a random access message 205 (also referred to herein as msg1), a random access message 210 (also referred to herein as msg2), a random access message 215 (also referred to herein as msg3), and a random access message 220 (also referred to herein as msg4).

The UE 115-a may initiate the random access procedure by transmitting the random access message 205, which may include a preamble (also referred to a RACH preamble, a physical random access channel (PRACH) preamble, or a sequence) that may carry information, such as a UE identifier. The purpose of the preamble transmission may be to provide an indication to the base station 105-a presence of a random access attempt, and to allow the base station 105-a to determine a delay (such as a timing delay) between the base station 105-a and the UE 115-a. The UE 115-a may transmit the random access message 205 to the base station 105-a on a PRACH, for example.

The preamble of the random access message 205 may, in some implementations, be defined by a preamble sequence and a cyclic prefix. A preamble sequence may be defined based in part on a Zadoff-Chu sequence. The UE 115-a may additionally, or alternatively, use a guard period to handle timing uncertainty of the random access message 205 transmission. For example, before beginning the random access procedure, the UE 115-a may obtain downlink synchronization with the base station 105-a based in part on a cell-search procedure. However, because the UE 115-a has not yet obtained uplink synchronization with the base station 105-a, there may be an uncertainty in uplink timing due to the location of the UE 115-a in the cell (such as geographic coverage area of base station 105-a) not being known. In some implementations, the uncertainty in uplink timing may be based in part on a dimension (such as a size or area) of the cell. Therefore, including a cyclic prefix to the random access message 205 may be beneficial, in some implementations, for handling the uncertainty in uplink timing.

Per cell, there may be a number of preamble sequences (such as 64 preamble sequences). The UE 115-a may select a preamble sequence from a set of sequences in a cell (for example, geographic coverage area of base station 105-a) based in part on a random selection. In some implementations, the UE 115-a may select a preamble sequence based in part on an amount of traffic that the UE 115-a has for transmission on an uplink shared channel (UL-SCH). From the preamble sequence that the UE 115-a selected, the base station 105-a may determine the amount of uplink resources to be granted to the UE 115-a.

Some implementations of a random access procedure may be contention-based or contention-free. When performing a contention-based random access procedure, the UE 115-a may select a preamble sequence from a set of sequences. That is, as long as other UEs (not shown) are not performing a random access attempt using the same sequence at a same temporal instance, no collisions will occur and the random access attempt may be detected by the base station 105-a. If the UE 115-a is performing a contention-free random access attempt, for example, for a handover to a new cell, the preamble sequence to use may be explicitly signaled (in control information) by the base station 105-a. To avoid collisions or interference, the base station 105-a may select a contention-free preamble sequence from sequences not associated with the contention-based random access attempt.

Upon receiving the random access message 205, the base station 105-a may respond appropriately with a random access message 210. For example, the base station 105-a may transmit the random access message 210 to the UE 115-a on a downlink shared channel (DL-SCH) or a PDCCH. In some implementations, the random access message 210 may have a same or a different configuration (format) compared to the random access message 205. The random access message 210 may carry information for the UE 115-a, where the information is determined by the base station 105-a based in part on information carried in the random access message 205. For example, the information in the random access message 210 may include an index of a preamble sequence detected and for which the response is valid, a timing advance parameter determined based in part on the preamble sequence detected, a scheduling grant indicating time and frequency resources for the UE 115-a to use for transmission of a next random access message transmission by the UE 115-a, or a network identifier (such as a random access RNTI (RA-RNTI)) for further communication with the UE 115-a, or the like.

In some implementations, if the base station 105-a detects multiple random access attempts (from the UE 115-a and other UEs (not shown)), the base station 105-a may combine individual response messages of multiple UEs in a single transmission (such as a MAC protocol data unit (PDU)), as described herein. As such, the random access message 210 may be scheduled on a PDCCH using an identity reserved for random access messaging, for example, an RA-RNTI. The UE 115-a (and additional UEs (not shown)) may monitor the PDCCH to detect and receive a random access message (such as the random access message 210). In some implementations, the UE 115-a may monitor the PDCCH for a random access message transmission from the base station 105-a during a random access response window, which may be fixed or variable in size. For example, if the UE 115-a does not detect and receive a random access message transmission from the base station 105-a, the random access attempt may be as associated with a failure and the random access procedure in FIG. 2A may repeat. However, in the subsequent attempt, the random access response window may be adjusted (such as increased or decreased in length (duration)).

Once the UE 115-a successfully receives the random access message 210, the UE 115-a may obtain uplink synchronization with the base station 105-a. In some implementations, before data transmission from the UE 115-a, a unique identifier within the cell (such as a C-RNTI) may be assigned to the UE 115-a. In some implementations, depending on a state (such as a connected_state, ideal_state) of the UE 115-a there may be a need for additional message (such as a connection request message) exchange for setting up the connection between the base station 105-a and the UE 115-a. The UE 115-a may transmit any additional messages, for example, the random access message 215 to the base station 105-a using the UL-SCH resources (or PUSCH resources) assigned in the random access message 210. The random access message 210 may include a UE identifier for contention resolution. If the UE 115-a is in a connected_state, for example, the UE identifier may be a C-RNTI. Otherwise, the UE identifier may be specific to the UE 115-a.

The base station 105-a may receive the random access message 215 and may respond properly, for example, by transmitting the random access message 220, which may be a contention resolution message. When multiple UEs (including UE 115-a) are simultaneously performing random access attempts using a same preamble sequence, the multiple UEs may listen for a same response message (such as a random access message 220). Each UE (including UE 115-a) may receive the random access message 220 and compare an identifier (such as a network identifier) in the random access message 220 to the identifier specified in the random access message 215. When the identifiers match, the corresponding UE (such as UE 115-a) may declare the random access procedure successful. UEs that do not identify a match between the identifiers are considered to have failed the random access procedure and may repeat the random access procedure with the base station 105-a. As a result of the connection procedure, the base station 105-a and the UE 115-a may establish a connection for wired or wireless communication.

Although the connection procedure (such as the random access procedure) in FIG. 2A may be effective for facilitating random access for the UE 115-a, there may be unnecessary latencies associated with this procedure. For example, latencies related to contention-based protocol of random access messaging may exhaust additional resources of the UE 115-*a*. The techniques described herein may provide efficacy to the UE 115-*a* by reducing or eliminating latencies associated with processes related to initial channel access (such as minimizing delay due to contention-based protocol for RACH messaging), and more specifically to constructing a random access message (msgB) transmission for a 2-step random access procedure that combines aspects of random access messages (msg2,4) associated with a 4-step random access procedure. The described techniques also provide for enabling a UE (such as the UE 115-*a*) and a base station (such as the base station 105-*a*) to support fallback communication from 2-step to 4-step random access procedures.

Figure 2B:
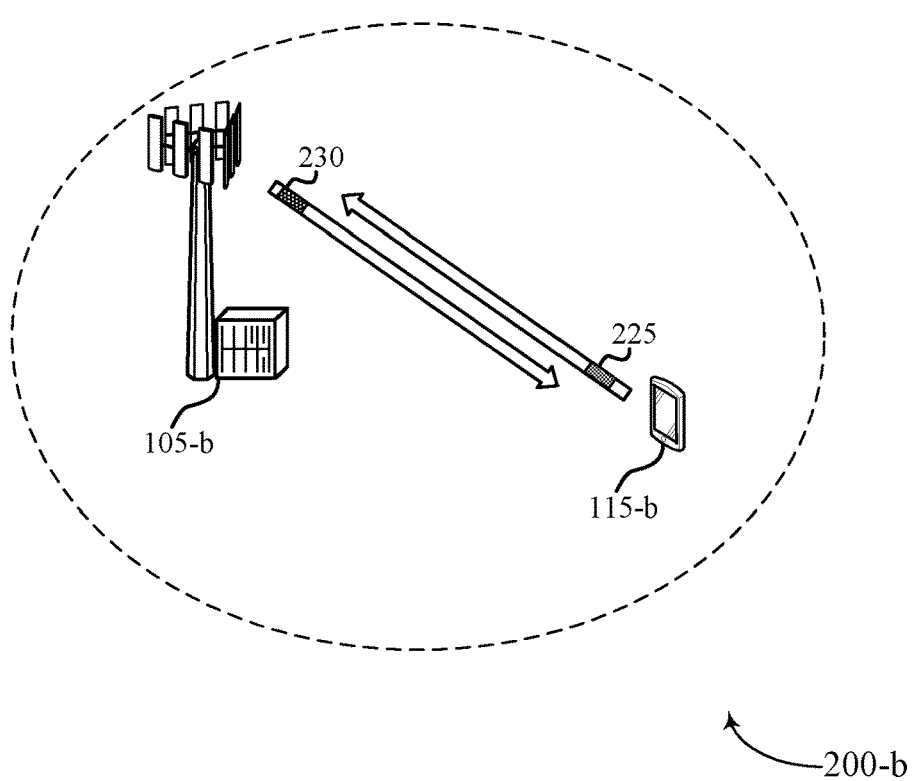

FIG. 2B illustrates an example of a wireless communications system 200-*b* that supports random access procedure fallback. The wireless communications system 200-*b* may include a base station 105-*b* and a UE 115-*b*, which may be examples of the corresponding devices described with reference to FIGS. 1 and 2A. In some implementations, the wireless communications system 200-*b* may implement aspects of the wireless communications system 100 or the wireless communications system 200-*a*. For example, the base station 105-*b* may perform connectivity establishment (such as a random access procedure) with the UE 115-*b* to establish a connection, or the like. The base station 105-*b* and the UE 115-*b* may, as explained with reference to FIG. 2A, support multiple radio access technologies including 4G systems such as LTE systems, LTE-A systems, or LTE-A Pro systems, and 5G systems which may be referred to as NR systems. The connection procedure (random access procedure) between the base station 105-*b* and the UE 115-*b* may correspond to, for example, at least one of these example radio access technologies.

For example, in FIG. 2B, the random access procedure may be related to 5G systems and may be referred to as a 2-step random access procedure. As part of a 2-step random access procedure, to decrease latencies related to contention-based procedure, the base station 105-*b* and the UE 115-*b* may exchange fewer messages (handshake messages) compared to a 4-step random access procedure. For example, the UE 115-*b* may transmit a single message, such as a random access message 225 (also referred to herein as msgA), and the base station 105-*b* may transmit a single message, such as a random access response message 230 (also referred to herein as msgB) in response to the random access message 225. The random access message 225 (msgA) may combine parts of msgs1,3 of a 4-step random access procedure, while the random access response message 230 (msgB) may combine aspects of msgs2,4 of the 4-step random access procedure. When supporting both 2-step and 4-step random access procedures, it may be important for the UE 115-*b* to be configured to differentiate between random access message formats (such as msgA, msgB, and msgs1,2,3,4).

When supporting both 2-step and 4-step random access procedures, in some implementations, base station 105-*b* and UE 115-*b* may commence with one random access procedure (such as a 2-step random access procedure) and may, in some implementations, fallback to another random access procedure (such as a 4-step random access procedure). In some implementations, the base station 105-*b* may select or assign a priority to a random access procedure based in part on a parameter (such as a traffic type or a network load). For example, the base station 105-*b* may be configured to use a 4-step random access procedure over a 2-step random access procedure in certain scenarios (such as based on a traffic load) to reduce an overhead. For example, because the base station 105-*b* may have to provision for msgA resources for 2-step RACH, which may involve a larger overhead compared to msg1 transmissions with 4-step RACH, the base station 105-*b* may select a 4-step random access procedure to maintain a lower overhead or to reduce an overhead in scenarios associated with high traffic loads. Additionally, or alternatively, the base station 105-*b* may select a random access procedure based in part on a UE 115-*b* capability to support the random access procedure. For example, if the UE 115-*b* supports both 2-step and 4-step random access procedures, the base station 105-*b* may select the 2-step or the 4-step random access procedure to commence the initial access procedure. Otherwise, the base station 105-*b* may select the random access procedure supported by the UE 115-*b*.

In some implementations, UE 115-*b* may transmit the random access message 225 to the base station 105-*b*. The random access message 225 may include a preamble and a PUSCH carrying a payload, where information in the random access message 225 (msgA) may include the equivalent contents or aspects of random access message 215 (msg3 of a 4-step random access procedure). An advantage of the 2-step random access procedure relative to the 4-step random access procedure is that the UE 115-*b* may be capable of transmitting data (such as a payload in PUSCH) to the base station 105-*b* without requiring a connected_state for data transmission. The base station 105-*b* may monitor a PUSCH for a random access preamble or a payload of the random access message 225. In some implementations, the payload may carry a connection request.

In some specific implementations, the base station 105-*b* may determine an absence of the random access preamble or the payload of the random access message 225 based in part on the monitoring. For random access procedures in the unlicensed spectrum, the absence may be due to a gap between the preamble transmission and PUSCH transmission carrying a payload and UE may perform LBT between the preamble transmission and the PUSCH transmission. For example, the UE 115-*b* may perform carrier sensing during the gap as part of an LBT procedure and fail to acquire resources of the contention for transmission of the payload. In some other implementations, the base station 105-*b* may fail to decode the random access preamble or the payload of the random access message 225 due to signal attenuation or interference. Absence of or an inability to decode one or both of the random access preamble or the payload of the random access message 225 may result in a random access procedure failure for the 2-step random access procedure.

For example, the base station 105-*b* may receive and detect the preamble included in the random access message 225 but may fail to receive or decode the PUSCH transmission carrying the payload. It may be advantageous for the base station 105-*b* to utilize the received preamble for continued handshake message exchange associated with a fallback to 4-step random access procedure, rather than performing retransmission of the random access message 225 associated with the 2-step random access procedure. Specifically, by utilizing the received preamble, the base station 105-*b* may reduce signaling overhead and potential for continued signaling corruption or interference.

After receiving the random access message 225, the base station 105-*b* may construct and transmit the random access response message 230 to the UE 115-*b*. In some implementations, the random access response message 230 may be based on the received and decoded contents of the random access message 225, including at least the preamble transmission and the PUSCH transmission carrying the payload. For example, the base station 105-*b* may transmit the random access response message 230 to the UE 115-*b* on a DL-SCH, PDSCH, or a PDCCH. The random access response message 230 may include at least one of a network identifier of the UE 115-*b*, a timing advance parameter, or a backoff indication for the UE 115-*b*.

As described herein, in some implementations, the base station 105-*b* may configure different formats for the random access response message 230. The different formats may correspond to response types of the random access response message 230, and include message payloads based on the contents of the received random access message 225 (for example, whether the payload was received and decoded). For example, the base station 105 may configure a first response type for 2-step random access procedure, as described. In some other implementations, the base station 105-*b* may configure a second response type for fallback from the 2-step to a 4-step random access procedure, as described with reference to FIG. 2A.

In some other implementations, the base station 105 may provide a distinct response message based on the fallback from the 2-step random access procedure to the 4-step random access procedure. For example, the base station 105-*b* may transmit an alternative response message (including contents or aspects of random access message 210) rather than the random access response message 230. Additionally, or alternatively, the base station 105-*b* may configure a set of redundancy versions for fallback response. The base station 105-*b* may indicate a new data indicator or a redundancy version as part of an uplink grant included in a random access response message (random access message 210) and based on the fallback to a 4-step random access procedure.

The UE 115-*b* may monitor one or more response windows associated with the present random access procedure (such as 2-step random access procedure) or a fallback to an alternative random access procedure (such as 4-step random access procedure). For example, the UE 115-*b* may monitor at least one response window for receiving the random access response message 230. Additionally, or alternatively, the UE 115-*b* may monitor at least one response window for receiving an alternative random access response (random access message 210). In some other implementations, the UE 115-*b* may differentiate between the configured response types of a received random access response message 230.

As part of a fallback communication from a 2-step to a 4-step random access procedure, the UE 115-*b* may retransmit the PUSCH payload in a third random access message (contents or aspects of random access message 215 (msg3)). Following the retransmission, the UE 115-*b* may receive a fourth random access message (contents or aspects of random access message 220 (msg4)) as part of a random access response. The response may include at least one of a network identifier of the UE 115-*b*, a timing advance parameter, or a backoff indication for the UE 115-*b*. The backoff indication may include a timing backoff indication or a random access procedure backoff indication, or both. The timing backoff indication may be associated with a timing of the random access procedure and the random access procedure backoff indication may be associated with the fallback from the 2-step random access procedure to an alternative random access procedure (such as 4-step random access procedure).

The techniques described herein for 2-step random access procedure may reduce or eliminate latencies associated with processes related to initial channel access and connectivity establishment between the UE 115-*b* and the base station 105-*b*. Specifically, the UE 115-*b* may construct a random access message (random access message 225) that combines aspects of random access messages (msg1,3) including a preamble and PUSCH payload for a connectivity request. Similarly, the base station 105-*b* may construct a random access message (random access response message 230) that combines aspects of random access messages (msg2, 4) configured for single message transmission. The described techniques also may provide support and configuration for fallback to a 4-step RACH due to reception or decoding failure at the base station 105-*b*. As part of the configuration, the base station 105-*b* may utilize received message contents for fallback procedure and reduce signaling overhead. The described techniques also provide for enabling a UE 115 to differentiate random access messages related to different types of random access procedures (such as a 2-step random access procedure, 4-step random access procedure) and act appropriately.

Figure 3A:
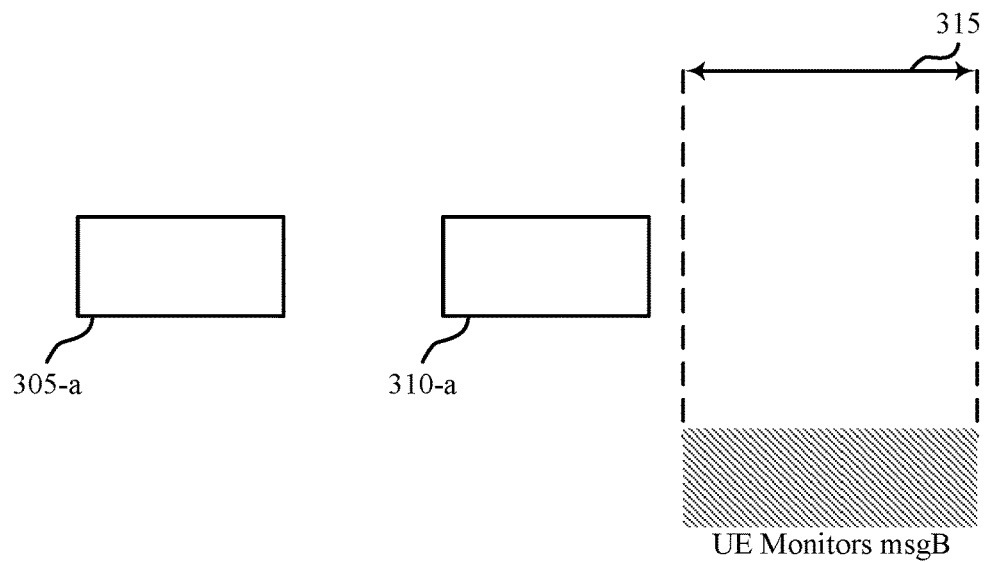
FIGS. 3A and 3B illustrate examples of transmission schemes that support random access procedure fallback.
Figure 3B:
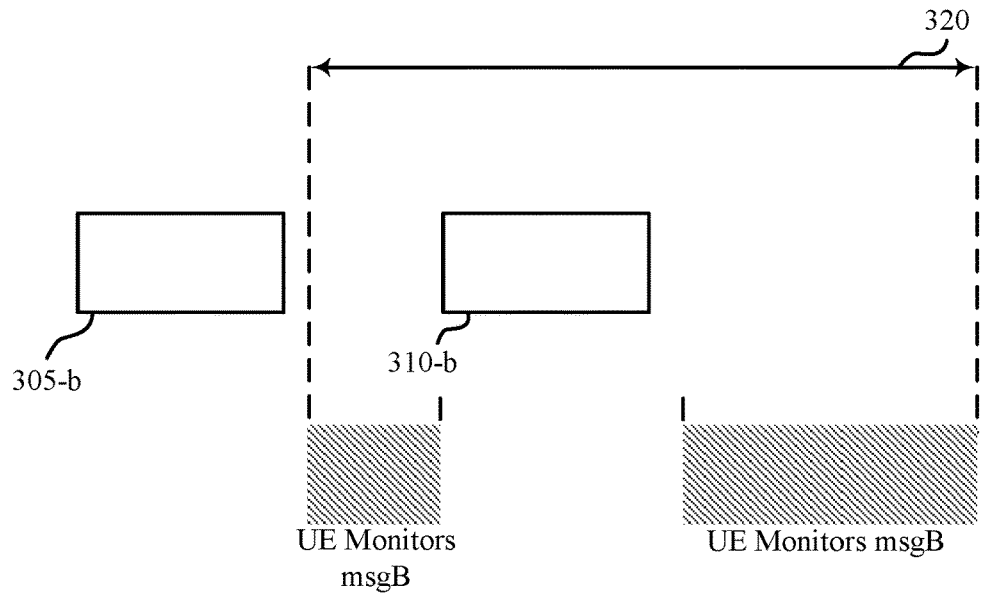

FIGS. 3A and 3B illustrate examples of transmission schemes 300-*a* and 300-*b* that support random access procedure fallback. The transmission schemes 300-*a* and 300-*b* may be implemented for connectivity establishment between a UE and a base station, as described with reference to FIGS. 1, 2A, and 2B. The transmission schemes 300-*a* and 300-*b* may include a configuration for random access response message (msgB) transmission by a base station, and a configured channel monitoring for reception by the UE.

As described herein, the transmission schemes 300-*a* and 300-*b* may support connectivity establishment between a base station and a UE according to both a 2-step random access procedure and fallback from a 2-step to a 4-step random access procedure. When supporting both 2-step and 4-step random access procedures, in some implementations, the base station and the UE may commence with one random access procedure (such as 2-step random access procedure) and may, in some implementations, fallback to another random access procedure (such as 4-step random access procedure). Additionally, the base station may support different response formats for random access response message (msgB) transmission according to the configuration. The response formats may correspond to different response types and may be based on detecting a PUSCH transmission associated with a prior random access message (msgA) reception at the base station.

For example, the base station may configure a first payload type of the random access response message (msgB) based on a reception and decoding of a PUSCH transmission, including a payload. The first response type may include an identifier indication (for example, a name) associated with the corresponding UE and may be based on the received payload of the random access message (msgA). In some other implementations, the base station may configure a second payload type of the random access response message (msgB) based on a failure to receive or decode the preceding transmission associated with the random access procedure. The second response type may include a preamble index identifier and an uplink grant for fallback transmission associated with a switch to a 4-step random access procedure.

Based on the one or more transmissions associated with the random access message (msgA), the UE may monitor the channel for reception of the configured random access response message (msgB). The UE may monitor the channel according to a response window (such as a response window 315 or a response window 320) and the response window may be configured according to a timer. In some implementations, the timer may be based on one or more transmission instances by the UE in association with the random access procedure. For example, in FIG. 3A, the UE may sense the channel for initiating random access message (msgA) transmission. Based on an identification of available channel resources, the UE may transmit a preamble transmission 305-*a* carrying information, such as a UE identifier. The UE may subsequently transmit a PUSCH transmission 310-*a* carrying a payload including a connection request. Based on the response window 315, the UE may initiate a response window following the PUSCH occasion and monitor channel resources for a random access response message (msgB).

In some other implementations, such as FIG. 3B, the UE may sense the channel for initiating random access message (msgA) transmission. Based on an identification of available channel resources, the UE may transmit a preamble transmission 305-*b* carrying information. The UE may initiate a response window 320 following the preamble transmission and monitor channel resources for a random access response message (msgB). By monitoring the channel following the preamble transmission 305-*b*, the UE may receive a msgB configured for a fallback response prior to PUSCH transmission. As such, in some implementations, a msgB may be configured for both successful random access response (RAR) and fallback RAR for a 2-step random access procedure. Such reception may enhance communication between the base station and the UE, particularly when a PUSCH transmission 310-*b* may not be proximal to the preamble transmission 305-*b* (such as when there is a significant timing gap between the PUSCH transmission 310-*b* and the preamble transmission 305-*b*).

The UE may transmit the PUSCH transmission 310-*b* carrying a payload, including a connection request. Following the PUSCH transmission, the UE may continue to monitor the channel as part of the initiated response window 320, as shown. The response window 320 may exclude the temporal duration corresponding to the PUSCH transmission 310-*b*, in order to avoid signaling interference at the UE.

Figure 4:
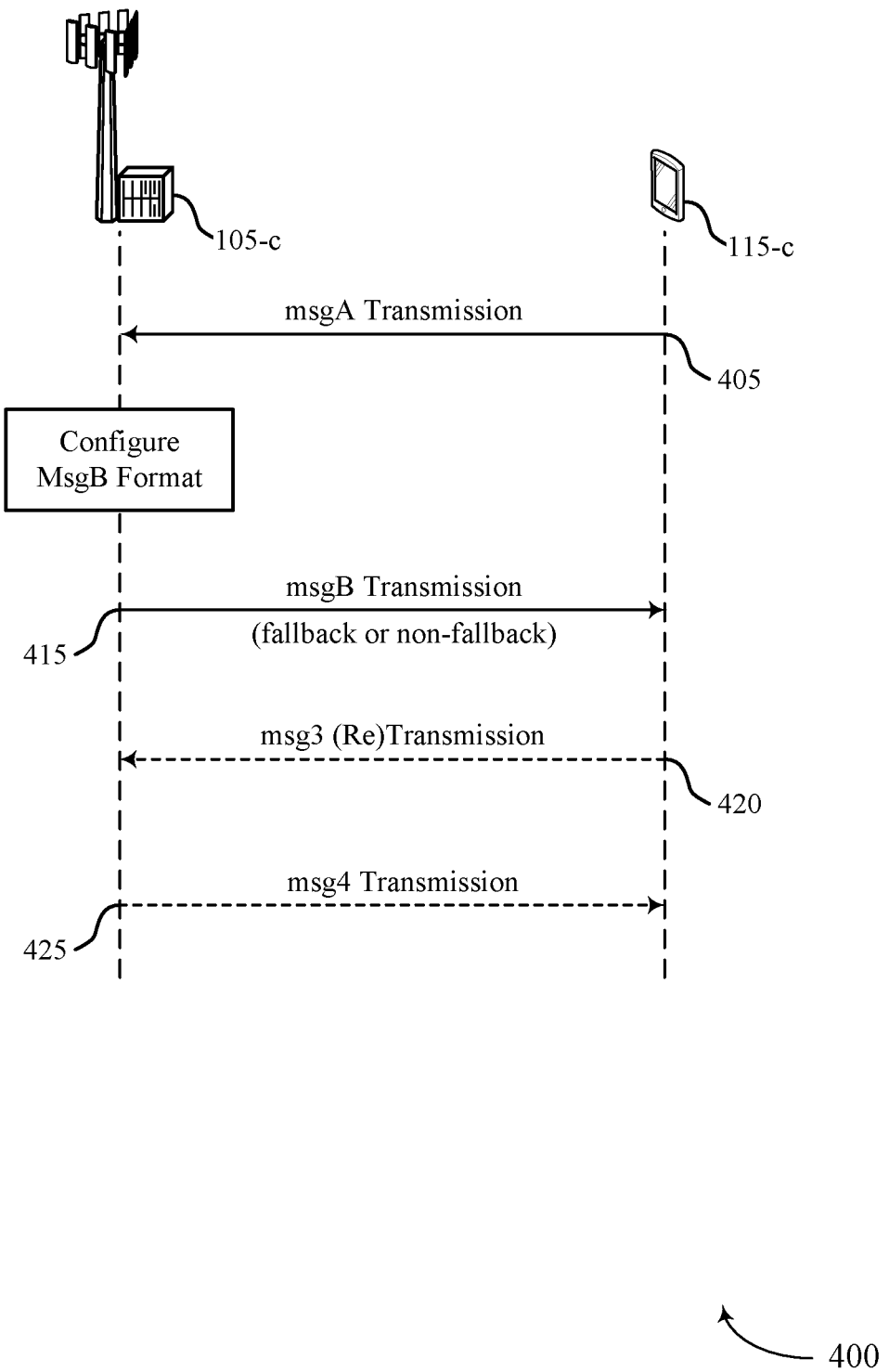
FIG. 4 illustrates an example of a process flow that supports random access procedure fallback.

FIG. 4 illustrates an example of a process flow 400 that supports random access procedure fallback. The process flow 400 may include a UE 115-*c* and a base station 105-*c* which may be examples of the corresponding devices described with reference to FIGS. 1-3. The process flow 400 may include aspects for configuring a random access response message (msgB) at the base station 105-*c* and monitoring channel resources at the UE 115-*c* according to a configured response window. Alternative examples of the following may be implemented, where some steps may be performed in a different order than described or not performed at all. In some implementations, steps may include additional features not mentioned below, or further steps may be added.

At 405, the UE 115-*c* may transmit a random access message to the base station 105-*c* for connection establishment associated with a random access procedure. The random access message (msgA) may be associated with a 2-step random access procedure. For example, the msgA transmission may include a preamble transmission and a PUSCH transmission carrying a payload that includes the equivalent contents or aspects of a connectivity request (msg3 of a 4-step random access procedure). In some implementations, the UE 115-*c* may transmit the preamble and the payload on separate waveforms. The base station 105-*c* may receive at least a portion of the msgA transmission at 405 and may attempt to decode the included payload. In some implementations, the base station 105-*c* may receive the preamble transmission and the subsequent PUSCH transmission associated with the msgA transmission at 405.

At 410, the base station 105-*c* may format a random access response message (msgB) according to the received preamble and PUSCH transmission. Alternatively, in some other implementations, the base station 105-*c* may fail to receive or decode at least one of the preamble transmission or the PUSCH transmission associated with the msgA transmission 405. For example, the base station 105-*c* may receive the preamble transmission but may fail to receive the PUSCH transmission due to signaling delay associated with contention on the channel. At 410, the base station 105-*c* may format a random access response message (msgB) based on the inability to receive or decode at least a portion of the msgA transmission 405. The configured format of the msgB transmission may be based on one or more supported response types, including a response for a 2-step random access procedure and a response for fallback from the 2-step to a 4-step random access procedure.

At 415, the base station 105-*c* may transmit the formatted msgB transmission to the UE 115-*c*. The formatted msgB transmission may correspond to a response type for a 2-step random access transmission or a response type for fallback to a 4-step random access transmission. The UE 115-*c* may monitor the channel for reception of the msgB transmission 415 according to a configured response window. In some implementations, the UE 115-*c* may initiate the response window following the PUSCH transmission associated with the msgA transmission 405. In some other implementations, the UE 115-*c* may initiate the response window following the preamble transmission associated with the msgA transmission 405. The response window may exclude the time corresponding to subsequent PUSCH transmission by the UE 115-*c*. Based on format of the received msgB transmission 415, the UE 115-*c* may determine a connectivity establishment according to the 2-step random access procedure or an indication of fallback to a 4-step random access procedure.

As part of a fallback communication from a 2-step to a 4-step random access procedure, the UE 115-*c* may identify an uplink grant of the msgB transmission 415 and perform retransmission via a msg3 transmission 420. The msg3 transmission 420 may include a UE identifier for contention resolution. If the UE 115-*c* is in a connected_state, for example, the UE identifier may be a C-RNTI. Otherwise, the UE identifier may be specific to the UE 115-*c*.

The base station 105-*c* may receive the msg 3 retransmission 420 and, in response, transmit a msg4 transmission 425. The response may include at least one of a network identifier of the UE 115-*c*, a timing advance parameter, or a backoff indication for the UE 115-*c*. The backoff indication may include a timing backoff indication or a random access procedure backoff indication, or both. The timing backoff indication may be associated with a timing of the random access procedure and the random access procedure backoff indication may be associated with the fallback from the 2-step random access procedure to an alternative random access procedure (such as a 4-step random access procedure).

Figure 5A:
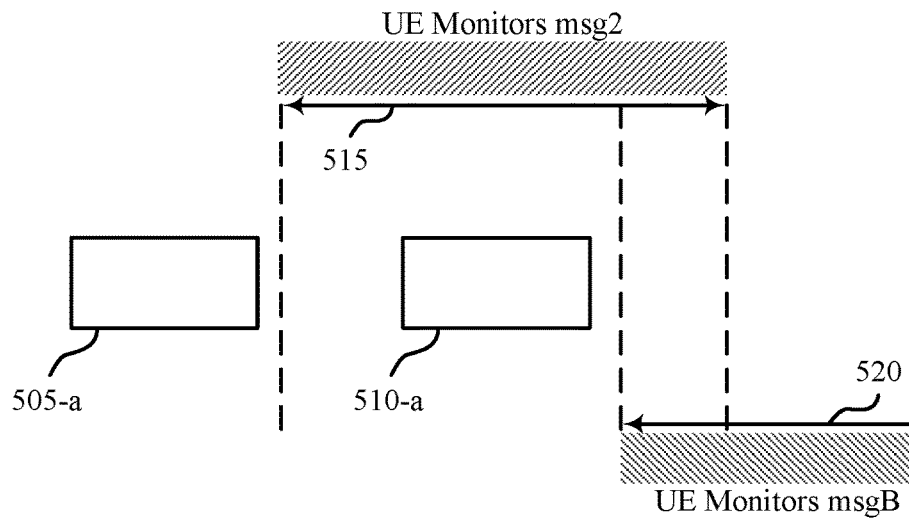
FIGS. 5A and 5B illustrate examples of transmission schemes that support random access procedure fallback.
Figure 5B:
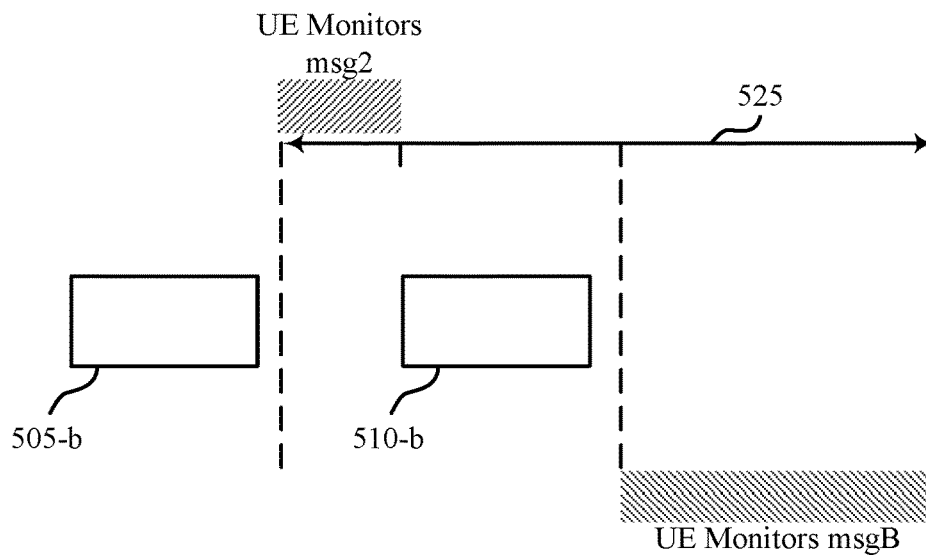

FIGS. 5A and 5B illustrate examples of transmission schemes 500-*a* and 500-*b* that support random access procedure fallback. The transmission schemes 500-*a* and 500-*b* may be implemented for connectivity establishment between a UE and a base station, as described with reference to FIGS. 1-4. The transmission schemes 500-*a* and 500-*b* may include support for random access response message (msgB) or fallback response (msg2) transmission by a base station, as well as support at the UE for fallback and non-fallback channel response monitoring.

As described herein, the transmission schemes 500-*a* and 500-*b* may support connection establishment between a base station and a UE according to both a 2-step random access procedure and fallback from a 2-step to a 4-step random access procedure. When supporting both 2-step and 4-step random access procedures, in some implementations, the base station and the UE may commence with one random access procedure (such as a 2-step random access procedure) and may, in some implementations, fallback to another random access procedure (such as 4-step random access procedure). For example, the base station may support fallback from a 2-step random access procedure via a msg2 transmission as used in a 4-step random access procedure. Additionally, the base station may multiplex the fallback response with one or more additional msg2 transmissions associated with legacy 4-step random access procedures (such as for additional potentially supported UEs).

Based on the capability for msg2 transmission as a fallback response, the UE may monitor the channel for both msgB reception associated with a 2-step random access procedure and msg2 reception associated with a fallback to a 4-step random access procedure. The UE may monitor the channel according to one or more response windows (such as response windows 515, 520, and 525) and the one or more response windows may be configured according to timers. In some implementations, such as a contention-based random access procedure, the UE may transmit the preamble associated with msgA but fail to transmit the PUSCH payload due to a loss of contention (due to a signal gap between preamble and PUSCH payload transmission). As a result, the UE may monitor the one or more response windows for reception of a msg2 transmission associated with a fallback response. Alternatively, the UE may transmit the contents or aspects of a msgA transmission for 2-step random access. The UE may monitor the one or more response windows for reception of a msgB transmission or a msg2 transmission (as a fallback response due to decoding failure at the base station).

In some implementations, the UE may maintain separate timers associated with distinct response windows for monitoring msgB reception and monitoring msg2 reception. For example, in FIG. 5A, the UE may sense the channel for initiating random access message (msgA) transmission. Based on an identification of available channel resources, the UE may transmit a preamble transmission 505-*a* carrying information, such as a UE identifier. The UE may initiate a response window 515 following the preamble transmission 505-*a*. The response window 515 may be configured for monitoring the channel for reception of a msg2 transmission associated with fallback response. Within or subsequent to the response window 515, the UE may transmit a PUSCH transmission 510-*a* carrying a payload including a connection request. Following the PUSCH transmission 510-*a*, the UE may initiate a response window 520. The response window 520 may be configured for monitoring the channel for reception of a msgB transmission associated with a 2-step random access procedure.

The response windows 515 and 520 may be configured to overlap over a temporal duration, as part of the channel monitoring. For example, the response window 515 may terminate following the initialization of the response window 520. Additionally, or alternatively, the response window 515 and the response window 520 may be configured to span different temporal durations (lengths).

In some implementations, such as FIG. 5B, the UE may maintain a single timer associated with a single response window. The response window may be configured for monitoring both msgB reception and msg2 reception. As described herein, the UE may sense the channel for initiating random access message (msgA) transmission. Based on an identification of available channel resources, the UE may transmit a preamble transmission 505-*b* carrying information. The UE may initiate a response window 525 following the preamble transmission 505-*b*. Prior to the PUSCH transmission 510-*b*, the UE may monitor the channel for reception of a msg2 transmission associated with a fallback response. The UE may transmit the PUSCH transmission 510-*b* carrying a payload, including a connection request. Following the PUSCH transmission 510-*b*, the UE may monitor the channel for reception of a msg2 transmission associated with a fallback response or a msgB transmission associated with the 2-step random access procedure.

In some other implementations, the UE may maintain a single timer associated with a single response window that follows the PUSCH transmission 510-*b*. The response window may be configured for monitoring both msgB reception and msg2 reception. Additionally, or alternatively, the UE may start and stop monitoring the channel for msg2 reception earlier than msgB reception.

Figure 6:
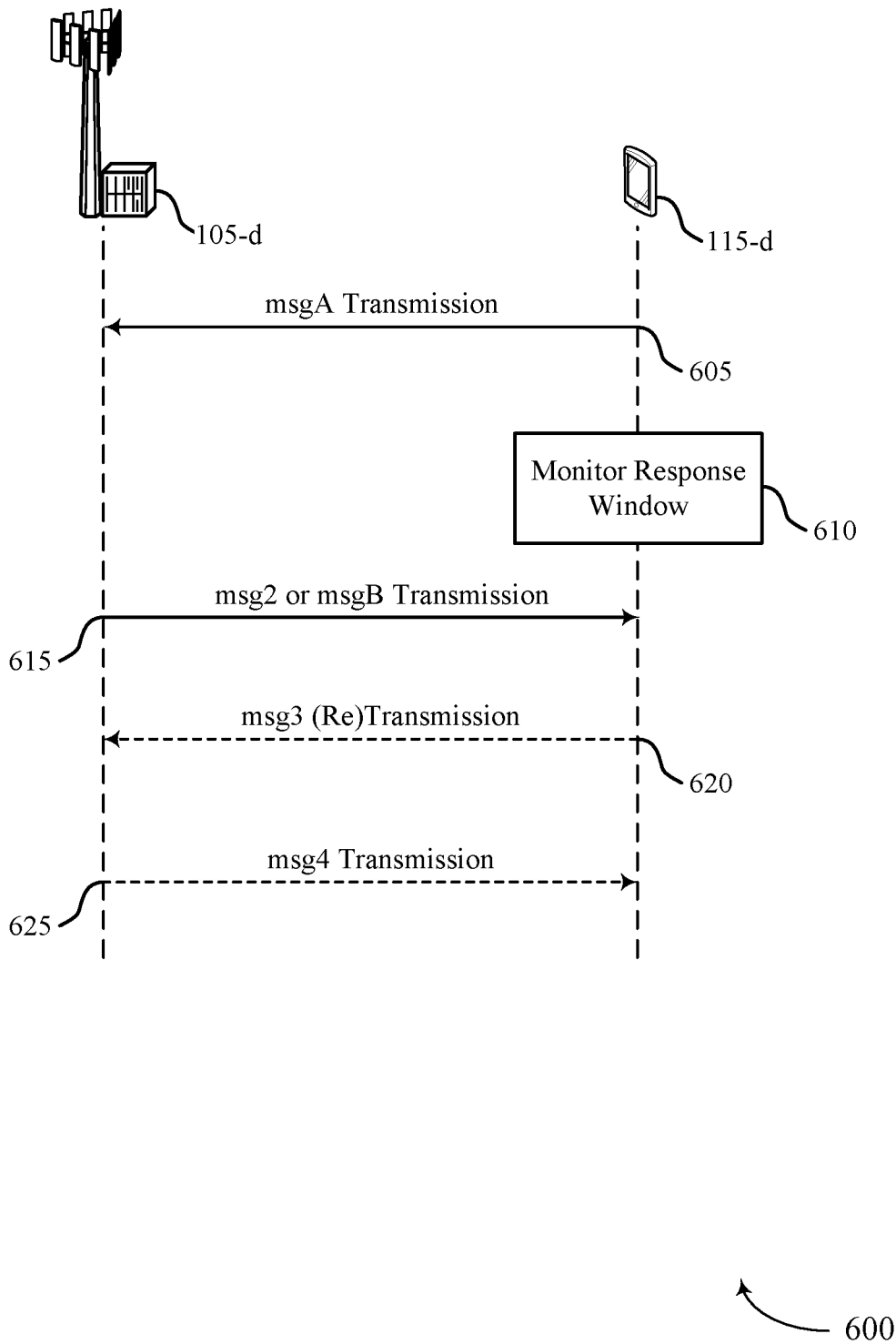
FIG. 6 illustrates an example of a process flow that supports random access procedure fallback.

FIG. 6 illustrates an example of a process flow 600 that supports random access procedure fallback. The process flow 600 may include a UE 115-*d* and a base station 105-*d* which may be examples of the corresponding devices described with reference to FIGS. 1-5. The process flow 600 may include aspects for maintaining one or more response windows at the UE 115-*d*, as part of a support for a 2-step random access procedure or a fallback from a 2-step to a 4-step random access procedure.

At 605, the UE 115-*d* may transmit a random access message to the base station 105-*d* for connectivity establishment associated with a random access procedure. The random access message (msgA) may be associated with a 2-step random access procedure. For example, the msgA transmission may include a preamble transmission and a PUSCH transmission carrying a payload that includes the equivalent contents or aspects of a connectivity request (msg3 of 4-step random access procedure). In some implementations, the UE 115-*d* may transmit the preamble and the payload on separate waveforms.

At 610, the UE 115-*d* may monitor the one or more response windows for receiving a response message following the msgA transmission at 605. The one or more response windows may be maintained according to configured timers and based on the contents or aspects of the msgA transmission at 605. In some implementations, the UE 115-*d* may maintain a first response window for monitoring the channel for msgB reception associated with the 2-step random access procedure and a second response window for msg2 reception associated with a fallback response. The one or more response windows may be configured to span distinct temporal durations and may overlap. In some other implementations, the UE 115-*d* may maintain a single response window for monitoring both msgB reception associated with the 2-step random access procedure and msg2 reception associated with a fallback response.

In some implementations, the base station 105-*d* may receive at least a portion of the msgA transmission at 405 and attempt to decode the included payload. In some implementations, the base station 105-*d* may receive the preamble transmission and the subsequent PUSCH transmission associated with the msgA transmission at 605.

Alternatively, in some other implementations, the base station 105-*d* may fail to receive or decode at least one of the preamble transmission or the PUSCH transmission associated with the msgA transmission 405. For example, the base station 105-*d* may receive the preamble transmission but may fail to receive the PUSCH transmission due to a signaling delay associated with the contention on the channel.

Based on the reception, at 615, the base station 105-*d* may perform either msg2 transmission or msgB transmission directed to the UE 115-*d*. The msgB transmission may be associated with a 2-step random access procedure and may be based on successfully receiving the preamble and PUSCH transmissions associated with msgA transmission 605. The msg2 transmission may be associated with a fallback procedure and include an uplink grant for subsequent PUSCH payload retransmission.

As part of a fallback communication from a 2-step to a 4-step random access procedure, the UE 115-*d* may identify an uplink grant of the msg2 transmission 615 and perform retransmission via a msg3 transmission 620. The msg3 transmission 620 may include a UE identifier for contention resolution. If the UE 115-*d* is in a connected_state, for example, the UE identifier may be a C-RNTI. Otherwise, the UE identifier may be specific to the UE 115-*d*.

The base station 105-*d* may receive the msg 3 retransmission 620 and, in response, transmit a msg4 transmission 625. The response may include at least one of a network identifier of the UE 115-*d*, a timing advance parameter, or a backoff indication for the UE 115-*d*. The backoff indication may include a timing backoff indication or a random access procedure backoff indication, or both. The timing backoff indication may be associated with a timing of the random access procedure and the random access procedure backoff indication may be associated with the fallback from the 2-step random access procedure to an alternative random access procedure (such as a 4-step random access procedure).

When supporting both 2-step and 4-step random access procedures, in some implementations, a base station and a UE may commence with one random access procedure (such as a 2-step random access procedure) and may, in some implementations, fallback to another random access procedure (such as 4-step random access procedure). For example, the base station may support fallback from a 2-step random access procedure via msg2 transmission as used in a 4-step random access procedure.

For a 4-step random access procedure, the random access response message (msg2) may have a same or a different configuration (format) compared to the preceding random access message (msg1). The msg2 transmission may carry information for the UE via a MAC PDU. The MAC PDU may include an index of a detected preamble sequence and for which the response is valid, a timing advance parameter determined based in part on the preamble sequence, a scheduling grant (such as an uplink grant) indicating time and frequency resources for the UE to use for transmission, and an assigned network identifier (such as a temporary C-RNTI) for further communication. In addition, the MAC PDU may include a single reserved bit that is set to 0.

The uplink grant included in the MAC PDU may span multiple bits and include one or more indications for subsequent random access message (msg3) transmission. The uplink grant may include one or more RAR grant fields, including a frequency hopping flag, a msg3 PUSCH frequency resource allocation, a msg3 PUSCH time resource allocation, a modulation and coding scheme (MCS), a transmit power control (TPC) command for msg3 PUSCH, and a channel state information (CSI) request, as shown in Table 1, reproduced below:

TABLE 1

| RAR grant field | Number of bits |
| --- | --- |
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |

For 4-step random access procedure, the msg3 transmission is the first PUSCH transmission of the random access procedure. As a result, a statically configured redundancy version (for example, redundancy version 0) may be used for the PUSCH transmission.

Alternatively, for fallback from a 2-step to a 4-step random access procedure, the UE may have already transmitted a PUSCH payload as part a random access message (msgA). Based on the transmission, the uplink grant included in the msg2 transmission (such as for fallback response) may indicate new data indicator or a redundancy version to benefit from the incremental redundancy in PUSCH retransmission.

Figure 7:
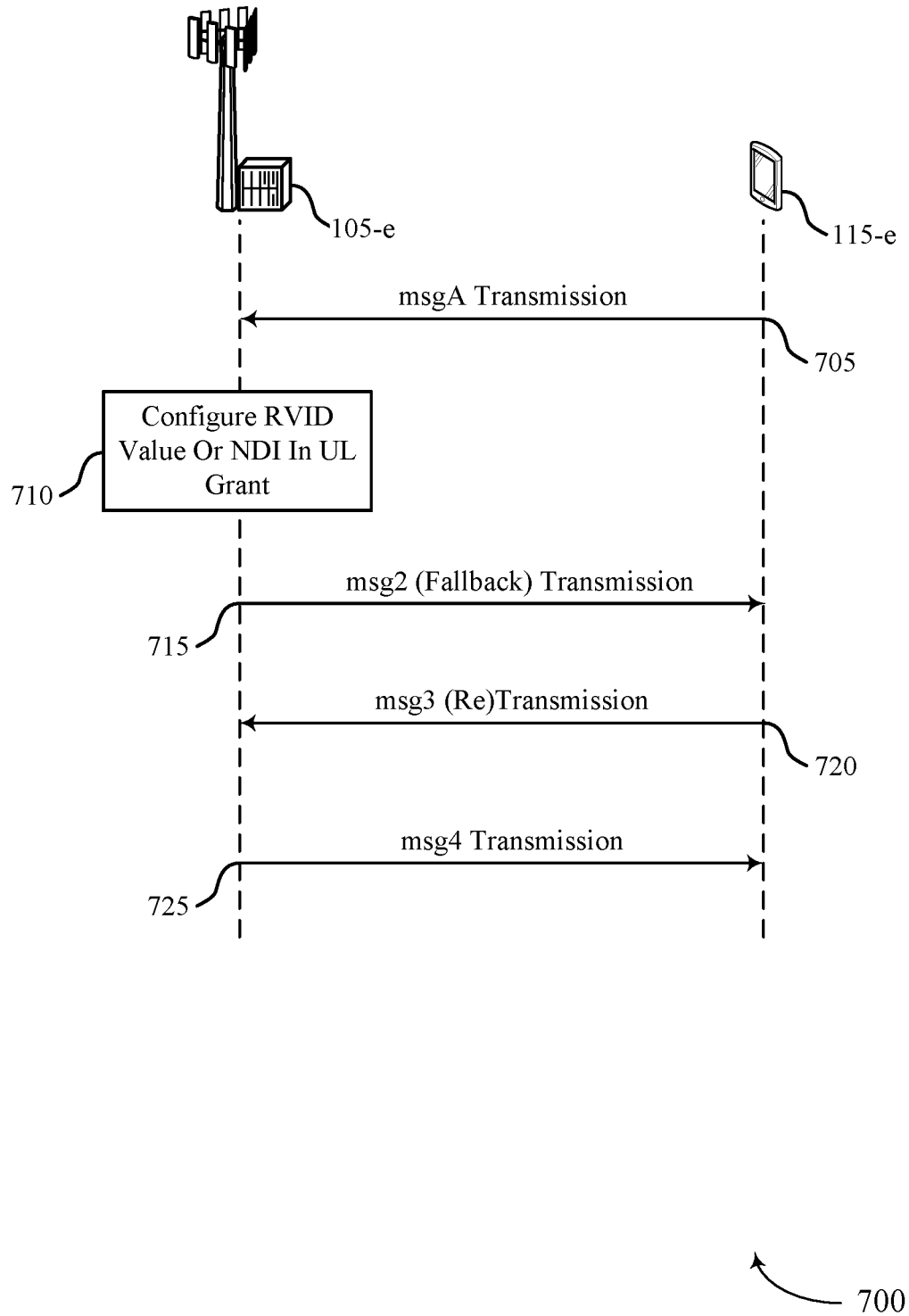
FIGS. 7 and 8 illustrate examples of process flows that support random access procedure fallback.

FIG. 7 illustrates an example of a process flow 700 that supports random access procedure fallback. The process flow 700 may include a UE 115-*e* and a base station 105-*e* which may be examples of the corresponding devices described with reference to FIGS. 1-6. The process flow 700 may include aspects for configuring a set of redundancy versions, and indicating a redundancy version for msg3 transmission as part of a fallback from a 2-step to a 4-step random access procedure.

In some implementations, the base station 105-*e* may configure a set of redundancy versions for a new data transmission or retransmission associated with a fallback response. The configured set of new data indications or redundancy versions may be indicated via a system information indication a master information block (MIB) or system information block (SIB) of an acquisition process, or a remaining minimum system information (RMSI) indication. In some implementations, the set of redundancy versions may span the full set of allowed redundancy versions. In some other implementations, the set may correspond to a subset of the allowed redundancy versions. For example, the system information may indicate the redundancy versions (0,3) associated with more systematic bits and fewer parity bits relative to the alternative (such as (1,2)) redundancy versions. The increased number of systematic bits may aid in functionality for self-decoding.

At 705, the UE 115-*e* may transmit a random access message to the base station 105-*e* for connectivity establishment associated with a random access procedure. The random access message (msgA) may be associated with a 2-step random access procedure. For example, the msgA transmission may include a preamble transmission and a PUSCH transmission carrying a payload that includes the equivalent contents or aspects of a connectivity request (msg3 of a 4-step random access procedure). In some implementations, the preamble and the payload may be transmitted on separate waveforms.

The base station 105-*e* may receive at least a portion of the msgA transmission 705, and attempt to decode the included payload. In some implementations, the base station 105-*e* may fail to receive or decode at least one of the preamble transmission or the PUSCH transmission associated with the msgA transmission 705. For example, the base station 105-*e* may receive the preamble transmission but may fail to receive the PUSCH transmission due to signaling delay associated with contention on the channel. In some other implementations, the base station 105-*e* may receive the msgA transmission 705 and decode the preamble transmission but fail to decode the included PUSCH transmission due to signal attenuation or interference. Based on the failure to receive or the failure to decode, the base station 105-*e* may configure a msg2 transmission associated with a fallback from a 2-step to a 4-step random access procedure.

For example, at 710, the base station 105-*e* may determine a redundancy version indication for performing PUSCH payload retransmission. The base station 105-*e* may include the indication in a single reserved bit of the MAC PDU for the msg2 transmission. Due to the formatting of the MAC PDU including to a single bit, the base station 105-*e* may indicate a selected redundancy version (0 or 3) of the subset of configured redundancy versions. That is, the base station 105-*d* may use the reserved bit of the fallback response to indicate a redundancy version for retransmission. By using the supported MAC PDU format for a 4-step random access procedure, the base station 105-*e* may multiplex the fallback response with one or more additional msg2 transmissions associated with legacy 4-step random access procedures.

In some other implementations, at 710, the base station 105-*e* may include a set of redundancy versions for performing PUSCH payload retransmission. The base station 105-*e* may include the set of allowed redundancy versions in the uplink grant configured for the MAC PDU of the msg2 transmission. By including the set of allowed redundancy versions, the base station 105-*e* may change the design of the msg2 transmission for random access response. Additionally, or alternatively, the base station 105-*e* and may configure one or more new data indicator values as part of the formatted msg2 transmission. For example, the base station 105-*e* may provide a new MAC PDU structure for the msg2 transmission to support indication for the set of allowed redundancy versions along with a new data indicator.

At 715, the base station 105-*e* may perform msg2 transmission as a fallback response associated with the fallback from a 2-step to a 4-step random access procedure. The msg2 transmission may include at least an index of a preamble sequence detected at the base station 105-*e* for the msgA transmission 705, a timing advance parameter determined based in part on the preamble sequence detected, and scheduling grant (an uplink grant) indicating time and frequency resources for the UE 115-*e* to use for PUSCH retransmission via a msg3 transmission. As described herein, the reserved bit included in a MAC PDU associated with the msg2 transmission 715 may include an indication of a redundancy version for performing msg3 transmission. Additionally, or alternatively, the uplink grant of the msg2 transmission 715 may signal the set of allowed redundancy versions.

As part of a fallback communication from a 2-step to a 4-step random access procedure, the UE 115-*e* may identify the uplink grant of the msg2 transmission 715 and perform retransmission via a msg3 transmission 720. The msg3 transmission 720 may be formatted according to an indicated redundancy version included in the msg2 transmission 715. By using the indicated redundancy version, the msg3 transmission 720 may promote incremental redundancy and enhance capability for potential decoding at the base station 105-*e*. The msg3 transmission 720 also may include a UE identifier for contention resolution. If the UE 115-*e* is in a connected_state, for example, the UE identifier may be a C-RNTI. Otherwise, the UE identifier may be specific to the UE 115-*e*.

Additionally, or alternatively, the msg3 transmission 720 may include a new data indicator. The new data indicator may include a bit indication as part of a format for the msg3 transmission 720. In some implementations, the new data indicator may include a notification of the indicated redundancy version associated with retransmission and as part of the fallback from a 2-step to a 4-step random access procedure. In some other implementations, the new data indicator may include a notification of a new data transmission associated with the msg3 transmission 720 between the UE 115-*e* and the base station 105-*e*.

The base station 105-*e* may receive the msg 3 retransmission 720 and, in response, transmit a msg4 transmission 725. The response may include at least one of a network identifier of the UE 115-*e*, a timing advance parameter, or a backoff indication for the UE 115-*e*. The backoff indication may include a timing backoff indication or a random access procedure backoff indication, or both. The timing backoff indication may be associated with a timing of the random access procedure and the random access procedure backoff indication may be associated with the fallback from the 2-step random access procedure to an alternative random access procedure (such as 4-step random access procedure).

Figure 8:
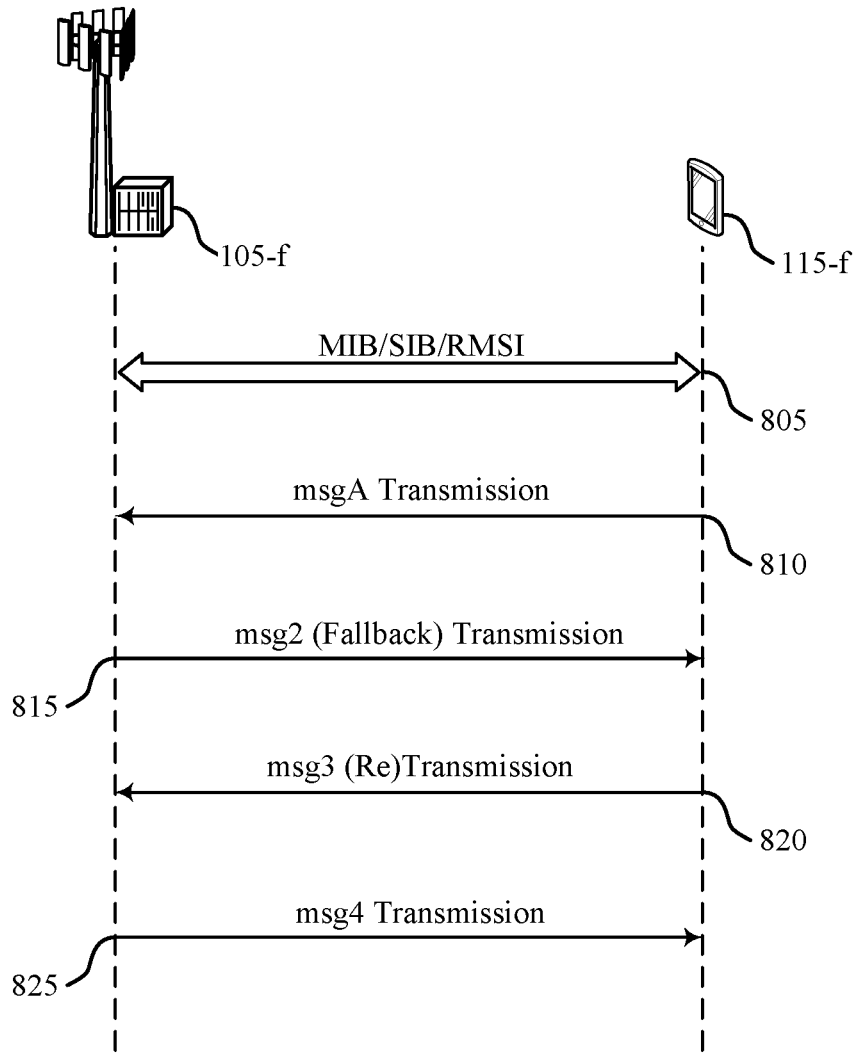

FIG. 8 illustrates an example of a process flow 800 that supports random access procedure fallback. The process flow 800 may include a UE 115-*f* and a base station 105-*f* which may be examples of the corresponding devices described with reference to FIGS. 1-7. The process flow 800 may include aspects for configuring a set of redundancy versions, and indicating a redundancy version for msg3 transmission as part of a fallback from a 2-step to a 4-step random access procedure.

In some implementations, at 805, the base station 105-*f* may configure a redundancy version for a new data transmission or retransmission associated with a fallback response. The configured redundancy version may be indicated via a system information indication a MIB or SIB of an acquisition process, or an RMSI indication. In some other implementations, a redundancy version may be statically configured at the base station 105-*f* and the UE 115-*f* based on a standard configuration or other specified context.

At 810, the UE 115-*f* may transmit a random access message to the base station 105-*f* for connectivity establishment associated with a random access procedure. The random access message (msgA) may be associated with a 2-step random access procedure. For example, the msgA transmission may include a preamble transmission and a PUSCH transmission carrying a payload that includes the equivalent contents or aspects of a connectivity request (msg3 of 4-step random access procedure). In some implementations, the preamble and the payload may be transmitted on separate waveforms.

The base station 105-*f* may receive at least a portion of the msgA transmission at 805 and attempt to decode the included payload. In some implementations, the base station 105-*f* may fail to receive or decode at least one of the preamble transmission or the PUSCH transmission associated with the msgA transmission at 805. For example, the base station 105-*f* may receive the preamble transmission but may fail to receive the PUSCH transmission due to signaling delay associated with contention on the channel. In some other implementations, the base station 105-*f* may receive the msgA transmission at 805 and decode the preamble transmission but fail to decode the included PUSCH transmission due to signal attenuation or interference.

At 815, the base station 105-f may perform msg2 transmission as a fallback response associated with the fallback from a 2-step to a 4-step random access procedure. The msg2 transmission may include at least an index of a preamble sequence detected at the base station 105-f for the msgA transmission 805, a timing advance parameter determined based in part on the preamble sequence detected, and scheduling grant (an uplink grant) indicating time and frequency resources for the UE 115-f to use for PUSCH retransmission via a msg3 transmission.

As part of a fallback communication from a 2-step to a 4-step random access procedure, the UE 115-f may identify the uplink grant of the msg2 transmission at 815 and perform retransmission via a msg3 transmission at 820. The msg3 transmission at 820 may be formatted according to the redundancy version indicated or configured (according to a standard configuration) for fallback response. The msg3 transmission at 820 also may include a UE identifier for contention resolution. If the UE 115-f is in a connected_state, for example, the UE identifier may be a C-RNTI. Otherwise, the UE identifier may be specific to the UE 115-f.

Additionally, or alternatively, the msg3 transmission at 820 may include a new data indicator. The new data indicator may include a bit indication as part of a format for the msg3 transmission at 820. In some implementations, the new data indicator may include a notification of the indicated redundancy version associated with retransmission and as part of the fallback from a 2-step to a 4-step random access procedure. In some other implementations, the new data indicator may include a notification of a new data transmission associated with the msg3 transmission at 820. The new data transmission may include a new preamble transmission for random access procedure between the UE 115-f and the base station 105-f.

The base station 105-f may receive the msg3 retransmission at 820 and, in response, may transmit a msg4 transmission at 825. The response may include at least one of a network identifier of the UE 115-f, a timing advance parameter, or a backoff indication for the UE 115-f. The backoff indication may include a timing backoff indication or a random access procedure backoff indication, or both. The timing backoff indication may be associated with a timing of the random access procedure and the random access procedure backoff indication may be associated with the fallback from the 2-step random access procedure to an alternative random access procedure (such as 4-step random access procedure).

Figure 9:
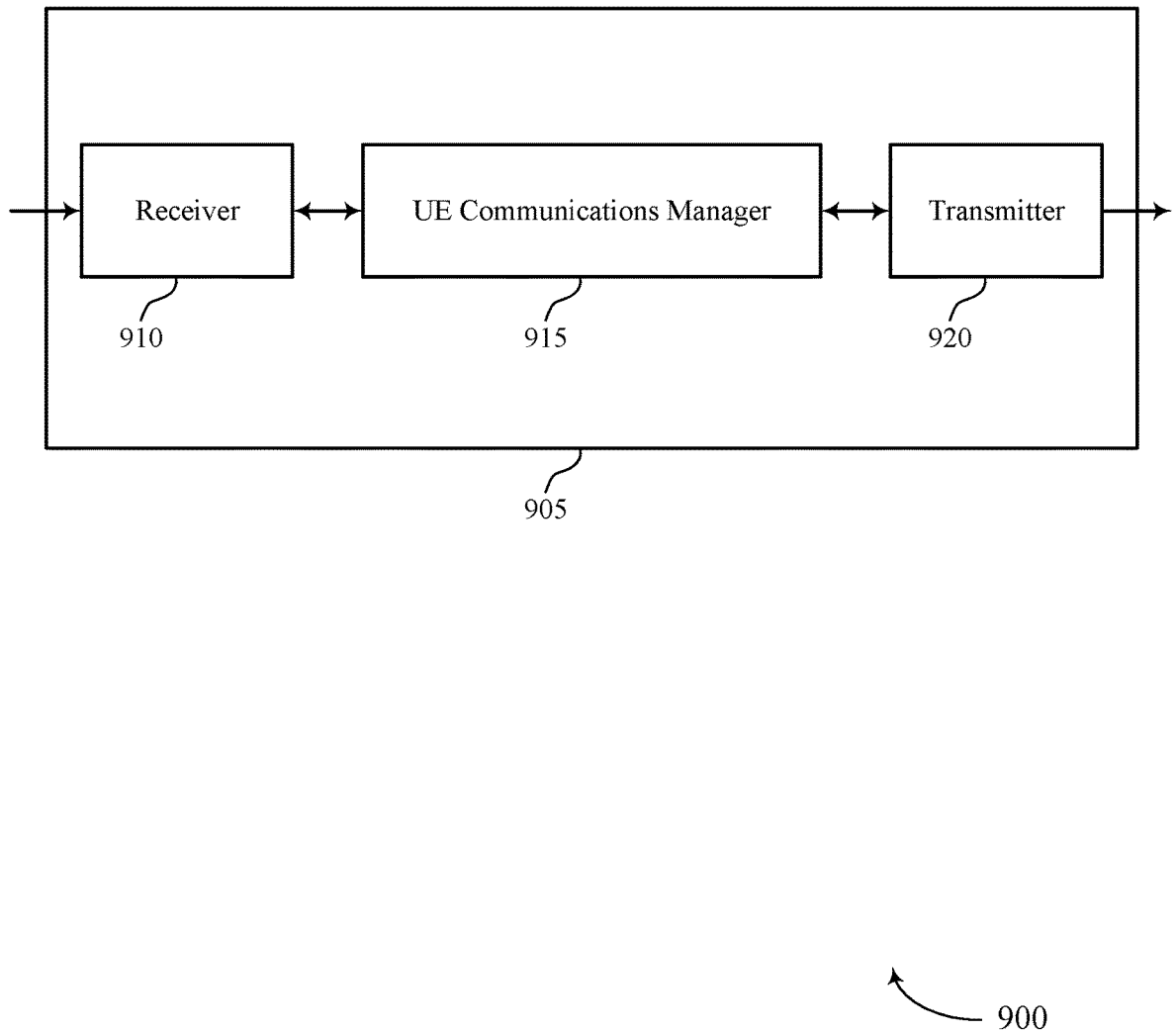
FIGS. 9 and 10 illustrate block diagrams of example devices that support random access procedure fallback.

FIG. 9 illustrates a block diagram 900 of an example device 905 that supports random access procedure fallback. The device 905 may be an example of aspects of a UE 115 as described herein. The device 905 may include a receiver 910, a communications manager 915, and a transmitter 920. The device 905 also may include a processor. Each of these components may be in communication with one another (such as via one or more buses).

The receiver 910 may receive information such as packets, user data, or control information associated with various information channels (such as control channels, data channels, and information related to random access procedure fallback, etc.). Information may be passed on to other components of the device 905. The receiver 910 may be an example of aspects of the transceiver 1220 described with reference to FIG. 12. The receiver 910 may utilize a single antenna or a set of antennas.

In some implementations, the UE communications manager 915 may transmit, to a base station, a first random access message of a first random access procedure, the first random access message including a random access preamble and a connection request, and monitor a response window of a channel to receive a second random access message in response to the first random access message, the response window based on a configured timer. In some implementations, the UE communications manager 915 may identify a format of the second random access message based on the receiving, where the format of the second random access message indicates one of: the first random access procedure or a second random access procedure, and establish a connection with the base station based on the first random access message, the second random access message, and the indicated one of the first random access procedure or the second random access procedure. The UE communications manager 915 may be an example of aspects of the UE communications manager 1210 described herein.

In some implementations, the UE communications manager 915 may transmit, to a base station, a first random access message of a first random access procedure, the first random access message including a random access preamble and a connection request, and monitor one or more response windows of a channel to receive a second random access message in response to the first random access message. In some implementations, the UE communications manager 915 may select one of the first random access procedure or a second random access procedure, where the selection is based on a response window of the one or more response windows over which the second random access message is received, and establish a connection with the base station based on the first random access message, the second random access message, and the selected one of the first random access procedure or the second random access procedure. The UE communications manager 915 may be an example of aspects of the UE communications manager 1210 described herein.

In some implementations, the UE communications manager 915 may transmit, to a base station, a first random access message of a first random access procedure, the first random access message including a random access preamble and a first redundancy version of a connection request, and transmit a third random access message in response to the indicated switch from the first random access procedure to the second random access procedure, the third random access message including at least one of a new data indicator or a second redundancy version of the connection request. In some implementations, the UE communications manager 915 may receive a fourth random access message from the base station in response to the third random access message, the fourth random access message including a connection setup message in response to the connection request, and receive, in response to the first random access message, a second random access message indicating a switch from the first random access procedure to a second random access procedure. The UE communications manager 915 may be an example of aspects of the UE communications manager 1210 described herein.

The UE communications manager 915, or its sub-components, may be implemented in hardware, code (such as software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some implementations, the UE communications manager 915, or its sub-components, may be a separate and distinct component in accordance with various aspects of the present disclosure. In some implementations, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some implementations, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the UE communications manager 915 may be implemented as an integrated circuit or chipset for a mobile device modem, and the receiver 910 and transmitter 920 may be implemented as analog components (such as amplifiers, filters, antennas) coupled with the mobile device modem to enable wireless transmission and reception over one or more bands.

The UE communications manager 915 as described herein may be implemented to realize one or more potential advantages. One implementation may allow the device 905 reduce delay in establishing communication with a base station and avoid prolonged connection procedures, which may result in fewer transmissions and monitoring occasions.

Based on techniques for efficiently establishing communication with the base station, the UE communications manager 915 may turn off one or more processing units of device 905 for transmitting and receiving messages with the base station, reducing the number of computations the UE communications manager 915 may perform and therefore increasing power savings and increasing the battery life of the device 905.

Figure 10:
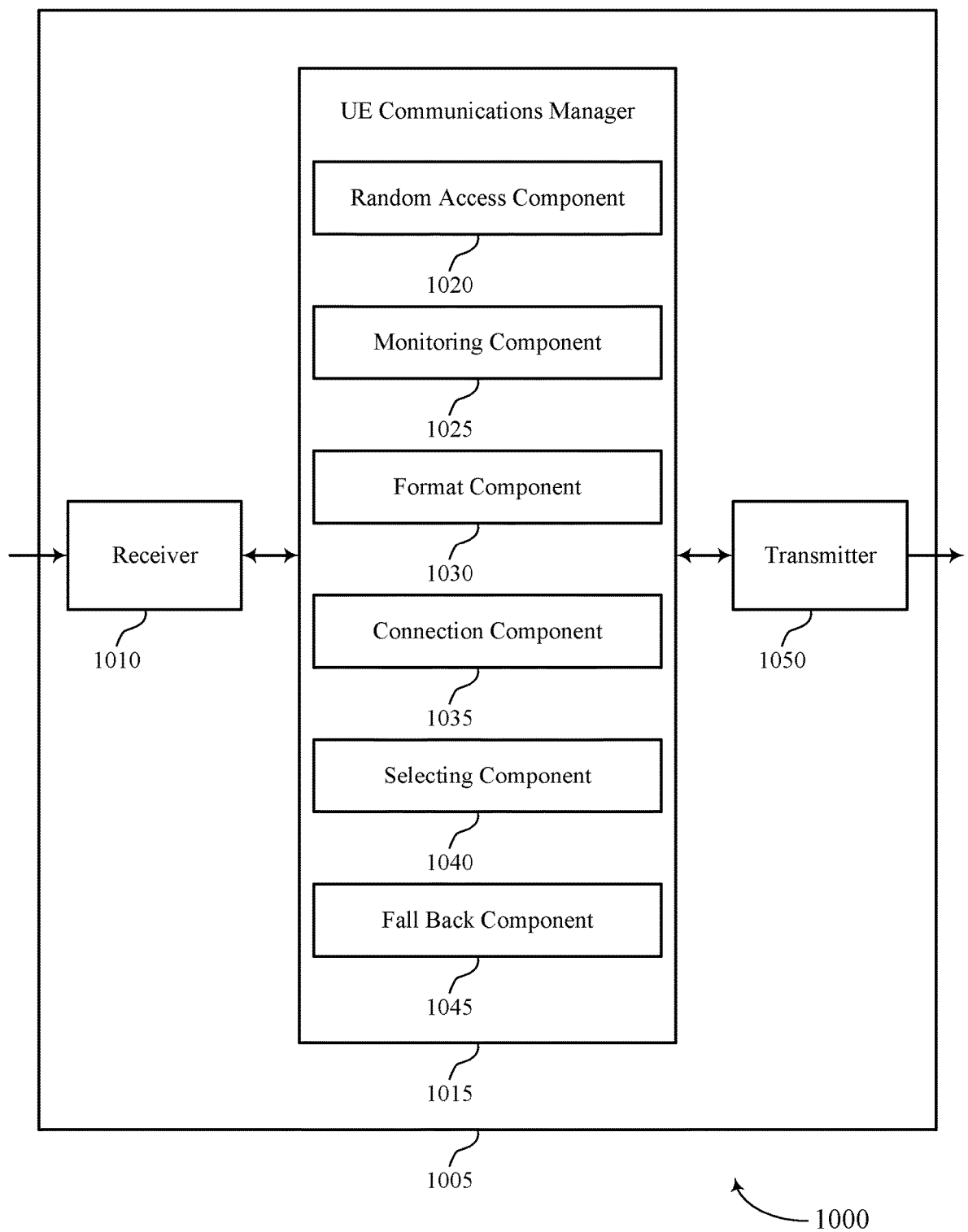

FIG. 10 illustrates a block diagram 1000 of an example device 1005 that supports random access procedure fallback. The device 1005 may be an example of aspects of a device 905, or a UE 115 as described herein. The device 1005 may include a receiver 1010, a UE communications manager 1015, and a transmitter 1050. The device 1005 also may include a processor. Each of these components may be in communication with one another (such as via one or more buses).

The receiver 1010 may receive information such as packets, user data, or control information associated with various information channels (such as control channels, data channels, and information related to random access procedure fallback, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a random access component 1020, a monitoring component 1025, a format component 1030, a connection component 1035, a selecting component 1040, and a fallback component 1045. The UE communications manager 1015 may be an example of aspects of the UE communications manager 1210 described herein.

The random access component 1020 may transmit, to a base station, a first random access message of a first random access procedure, the first random access message including a random access preamble and a connection request.

The random access component 1020 may transmit a third random access message in response to an indicated switch from the first random access procedure to the second random access procedure, the third random access message including at least one of a new data indicator or a second redundancy version of the connection request, and receive a fourth random access message from the base station in response to the third random access message, the fourth random access message including a connection setup message in response to the connection request.

In some implementations, the monitoring component 1025 may monitor a response window of a channel to receive a second random access message in response to the first random access message, the response window based on a configured timer.

In some other implementations, the monitoring component 1025 may monitor one or more response windows of a channel to receive a second random access message in response to the first random access message.

The format component 1030 may identify a format of the second random access message based on the receiving, where the format of the second random access message indicates one of: the first random access procedure or a second random access procedure.

The connection component 1035 may establish a connection with the base station based on the first random access message, the second random access message, and the indicated one of the first random access procedure or the second random access procedure.

The selecting component 1040 may select one of the first random access procedure or a second random access procedure, where the selection is based on a response window of the one or more response windows over which the second random access message is received.

The fallback component 1045 may receive, in response to the first random access message, a second random access message indicating a switch from the first random access procedure to a second random access procedure.

The transmitter 1050 may transmit signals generated by other components of the device 1005. In some implementations, the transmitter 1050 may be collocated with a receiver 1010 in a transceiver module. For example, the transmitter 1050 may be an example of aspects of the transceiver 1220 described with reference to FIG. 12. The transmitter 1050 may utilize a single antenna or a set of antennas.

Figure 11:
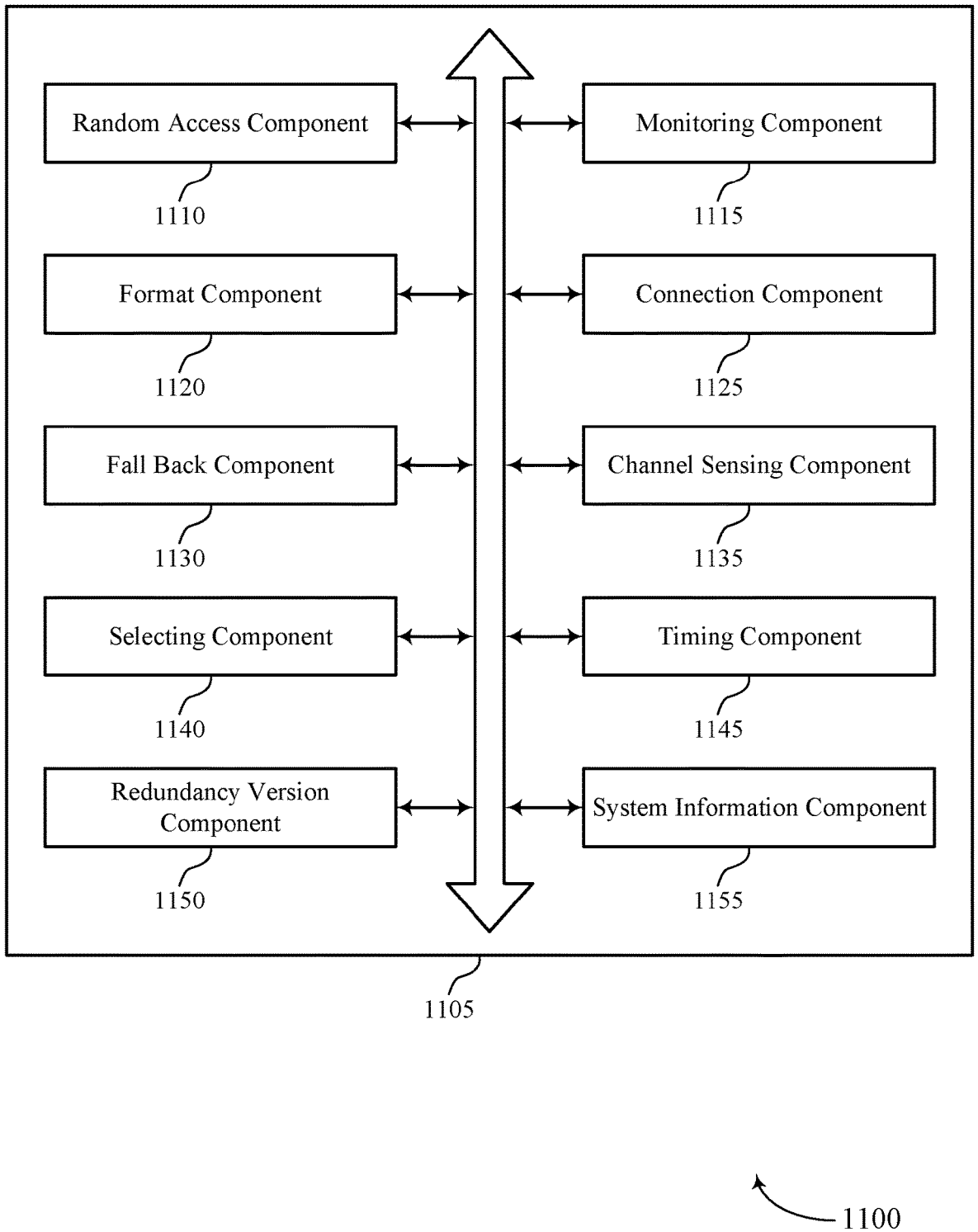
FIG. 11 illustrates a block diagram of an example user equipment (UE) communications manager that supports random access procedure fallback.

FIG. 11 illustrates a block diagram 1100 of an example UE communications manager 1105 that supports random access procedure fallback. The UE communications manager 1105 may be an example of aspects of a UE communications manager 915, a UE communications manager 1015, or a UE communications manager 1210 described herein. The UE communications manager 1105 may include a random access component 1110, a monitoring component 1115, a format component 1120, a connection component 1125, a fallback component 1130, a channel sensing component 1135, a selecting component 1140, a timing component 1145, a redundancy version component 1150, and a system information component 1155. Each of these modules may communicate, directly or indirectly, with one another (such as via one or more buses).

The random access component 1110 may transmit, to a base station, a first random access message of a first random access procedure, the first random access message including a random access preamble and a connection request.

In some implementations, the random access component 1110 may transmit, to a base station, a first random access message of a first random access procedure, the first random access message including a random access preamble and a connection request.

In some implementations, the random access component 1110 may transmit a third random access message in response to the indicated switch from the first random access procedure to the second random access procedure, the third random access message including at least one of a new data indicator or a second redundancy version of the connection request.

In some implementations, the random access component 1110 may receive a fourth random access message from the base station in response to the third random access message, the fourth random access message including a connection setup message in response to the connection request.

The monitoring component 1115 may monitor a response window of a channel to receive a second random access message in response to the first random access message, the response window based on a configured timer.

In some implementations, the monitoring component 1115 may monitor one or more response windows of a channel to receive a second random access message in response to the first random access message.

In some implementations, the monitoring component 1115 may initiate the response window of the channel following the connection request. In some implementations, the monitoring component 1115 may initiate the response window of the channel following the random access preamble and prior to the connection request. In some implementations, the monitoring component 1115 may initiate, following the random access preamble, a first response window of the one or more response windows.

In some implementations, the monitoring component 1115 may monitor, following the connection request, the response window for receiving the second random access message as part of the first random access procedure or the second random access procedure. In some implementations, the monitoring component 1115 may monitor the response window for receiving the second random access message as part of the first random access procedure or the second random access procedure.

In some implementations the first response window and the second response window span different temporal durations. In some implementations, the first response window and the second response window overlap during a temporal duration.

The format component 1120 may identify a format of the second random access message based on the receiving, where the format of the second random access message indicates one of: the first random access procedure or a second random access procedure.

In some implementations, determining the second random access message includes at least a random access response and a connection setup message for the first random access procedure. In some implementations, determining the second random access message includes at least a preamble index and an uplink grant indicating a switch from the first random access procedure to the second random access procedure.

The connection component 1125 may establish a connection with the base station based on the first random access message, the second random access message, and the indicated one of the first random access procedure or the second random access procedure. In some implementations, the connection component 1125 may establish a connection with the base station based on the response to the connection request.

The fallback component 1130 may receive, in response to the first random access message, a second random access message indicating a switch from the first random access procedure to a second random access procedure. In some implementations, the fallback component 1130 may determine that establishing the connection is further based on the third random access message and the fourth random access message.

In some implementations, the first random access procedure is a two-step random access procedure and the second random access procedure is a four-step random access procedure. In some implementations, the second random access message includes a medium access control protocol data unit including at least an uplink grant, a timing advance command, a network identifier, and a reserved bit.

The channel sensing component 1135 may sense the channel prior to at least one of the random access preamble or the connection request. In some implementations, the channel sensing component 1135 may determine transmitting is based on sensing the channel, the transmitting spanning one or more physical uplink shared channel transmit occasions.

The selecting component 1140 may select one of the first random access procedure or a second random access procedure, where the selection is based on a response window of the one or more response windows over which the second random access message is received.

The timing component 1145 may determine the first response window is based on a first configured timer and the second response window is based on a second configured timer.

The redundancy version component 1150 may receive an indication of the second redundancy version in the second random access message.

In some implementations, the redundancy version component 1150 may select the second redundancy version of the connection request for the third random access message based on the indication. In some implementations, the redundancy version component 1150 may identify the second redundancy version of the connection request based on a standard configuration.

The system information component 1155 may identify a subset of a set of supported redundancy version identification values is based on a received remaining minimum system information transmission. In some implementations, the system information component 1155 may receive a broadcast of system information prior to transmitting the first random access message, the system information identifying a set of supported redundancy versions for the first random access message or the third random access message.

Figure 12:
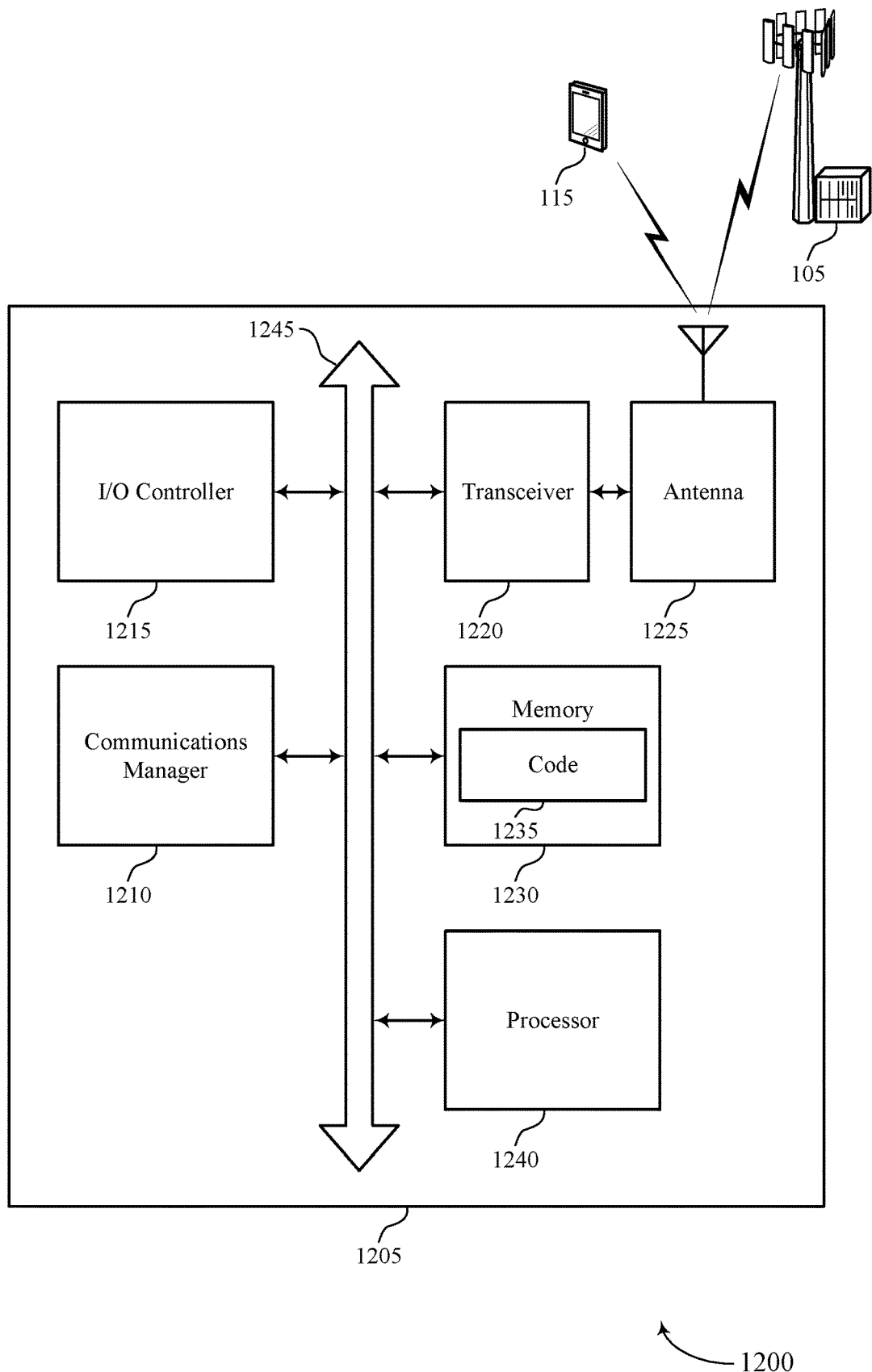
FIG. 12 illustrates a diagram of an example system including a device that supports random access procedure fallback.

FIG. 12 illustrates a diagram of an example system 1200 including a device 1205 that supports random access procedure fallback. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (such as bus 1245).

In some implementations, the UE communications manager 1210 may transmit, to a base station, a first random access message of a first random access procedure, the first random access message including a random access preamble and a connection request, and monitor a response window of a channel to receive a second random access message in response to the first random access message, the response window based on a configured timer. In some implementations, the UE communications manager 1210 may identify a format of the second random access message based on the receiving, where the format of the second random access message indicates one of: the first random access procedure or a second random access procedure, and establish a connection with the base station based on the first random access message, the second random access message, and the indicated one of the first random access procedure or the second random access procedure.

In some implementations, the UE communications manager 1210 may transmit, to a base station, a first random access message of a first random access procedure, the first random access message including a random access preamble and a connection request, and monitor one or more response windows of a channel to receive a second random access message in response to the first random access message. In some implementations, the UE communications manager 1210 may select one of the first random access procedure or a second random access procedure, where the selection is based on a response window of the one or more response windows over which the second random access message is received, and establish a connection with the base station based on the first random access message, the second random access message, and the selected one of the first random access procedure or the second random access procedure.

In some implementations, the UE communications manager 1210 may transmit, to a base station, a first random access message of a first random access procedure, the first random access message including a random access preamble and a first redundancy version of a connection request, and transmit a third random access message in response to the indicated switch from the first random access procedure to the second random access procedure, the third random access message including at least one of a new data indicator or a second redundancy version of the connection request. In some implementations, the UE communications manager 1210 may receive a fourth random access message from the base station in response to the third random access message, the fourth random access message including a connection setup message in response to the connection request, and receive, in response to the first random access message, a second random access message indicating a switch from the first random access procedure to a second random access procedure.

The I/O controller 1215 may manage input and output signals for the device 1205. The I/O controller 1215 also may manage peripherals not integrated into the device 1205. In some examples, the I/O controller 1215 may represent a physical connection or port to an external peripheral. In some examples, the I/O controller 1215 may utilize an operating system such as iOS®, ANDROID®, MS-DOS®, MS-WINDOWS®, OS/2®, UNIX®, LINUX®, or another known operating system. In some other cases, the I/O controller 1215 may represent or interact with a modem, a keyboard, a mouse, a touchscreen, or a similar device. In some examples, the I/O controller 1215 may be implemented as part of a processor. In some examples, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 also may include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some examples, the memory 1230 may contain, among other things, a basic I/O system (BIOS) which may control basic hardware or software operation such as the interaction with peripheral components or devices.

The processor 1240 may include an intelligent hardware device, (such as a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some other cases, a memory controller may be integrated into the processor 1240. The processor 1240 may be configured to execute computer-readable instructions stored in a memory (such as the memory 1230) to cause the device 1205 to perform various functions (such as functions or tasks supporting random access procedure fallback).

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (such as when compiled and executed) to perform functions described herein.

Figure 13:
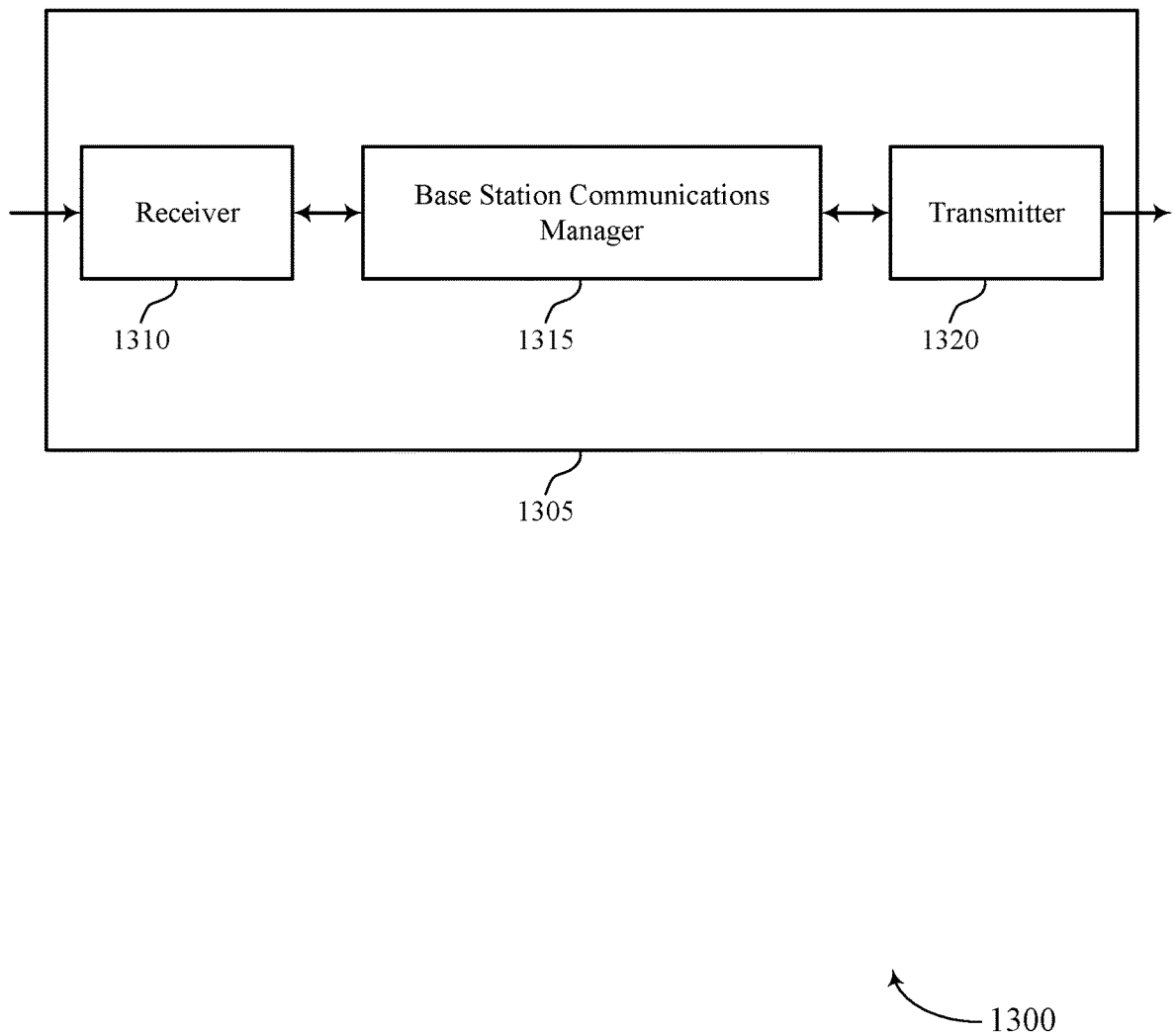
FIGS. 13 and 14 illustrate block diagrams of example devices that support random access procedure fallback.

FIG. 13 illustrates a block diagram 1300 of an example device 1305 that supports random access procedure fallback. The device 1305 may be an example of aspects of a base station 105 as described herein. The device 1305 may include a receiver 1310, a base station communications manager 1315, and a transmitter 1320. The device 1305 also may include a processor. Each of these components may be in communication with one another (such as via one or more buses).

The receiver 1310 may receive information such as packets, user data, or control information associated with various information channels (such as control channels, data channels, and information related to random access procedure fallback, etc.). Information may be passed on to other components of the device 1305. The receiver 1310 may be an example of aspects of the transceiver 1620 described with reference to FIG. 16. The receiver 1310 may utilize a single antenna or a set of antennas.

In some implementations, the base station communications manager 1315 may monitor a channel for receiving, from a UE, a first random access message of a first random access procedure, the first random access message including a random access preamble and a connection request, and determine a format of a second random access message based on receiving the first random access message, where the format of the second random access message indicates one of: the first random access procedure or a second random access procedure, transmit, to the UE, the second random access message in response to the first random access message. In some implementations, the base station communications manager 1315 may establish a connection with the base station based on the first random access message, the second random access message, and the indicated one of the first random access procedure or the second random access procedure.

In some implementations, the base station communications manager 1315 may monitor a channel for receiving, from a UE, a first random access message of a first random access procedure, the first random access message including a random access preamble and a connection request, and determine a payload of the first random access message based on receiving the first random access message, transmit, based on the determining, a second random access message in response to the first random access message, where the second random access message is associated with one of: the first random access procedure or a second random access procedure. In some implementations, the base station communications manager 1315 may establish a connection with the base station based on the first random access message, the second random access message, and the associated one of the first random access procedure or the second random access procedure.

In some implementations, the base station communications manager 1315 may monitor a channel for receiving, from a UE, a first random access message of a first random access procedure, the first random access message including a random access preamble and a first redundancy version of a connection request, and identify an absence of the connection request or an inability to decode a payload of the first random access message based on the monitoring. In some implementations, the base station communications manager 1315 may transmit, in response to the first random access message, a second random access message indicating a switch from the first random access procedure to a second random access procedure, receive a third random access message in response to the indicated switch from the first random access procedure to a second random access procedure, the third random access message including at least one of a new data indicator or a second redundancy version of the connection request, and transmit a fourth random access message in response to the third random access message, the fourth random access message including a connection setup message in response to the connection request. The base station communications manager 1315 may be an example of aspects of the base station communications manager 1610 described herein.

The base station communications manager 1315, or its sub-components, may be implemented in hardware, code (such as software or firmware) executed by a processor, or any combination thereof. If implemented in code executed by a processor, the functions of the base station communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some implementations, the base station communications manager 1315, or its sub-components, may be a separate and distinct component in accordance with various aspects of the present disclosure. In some implementations, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some implementations, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
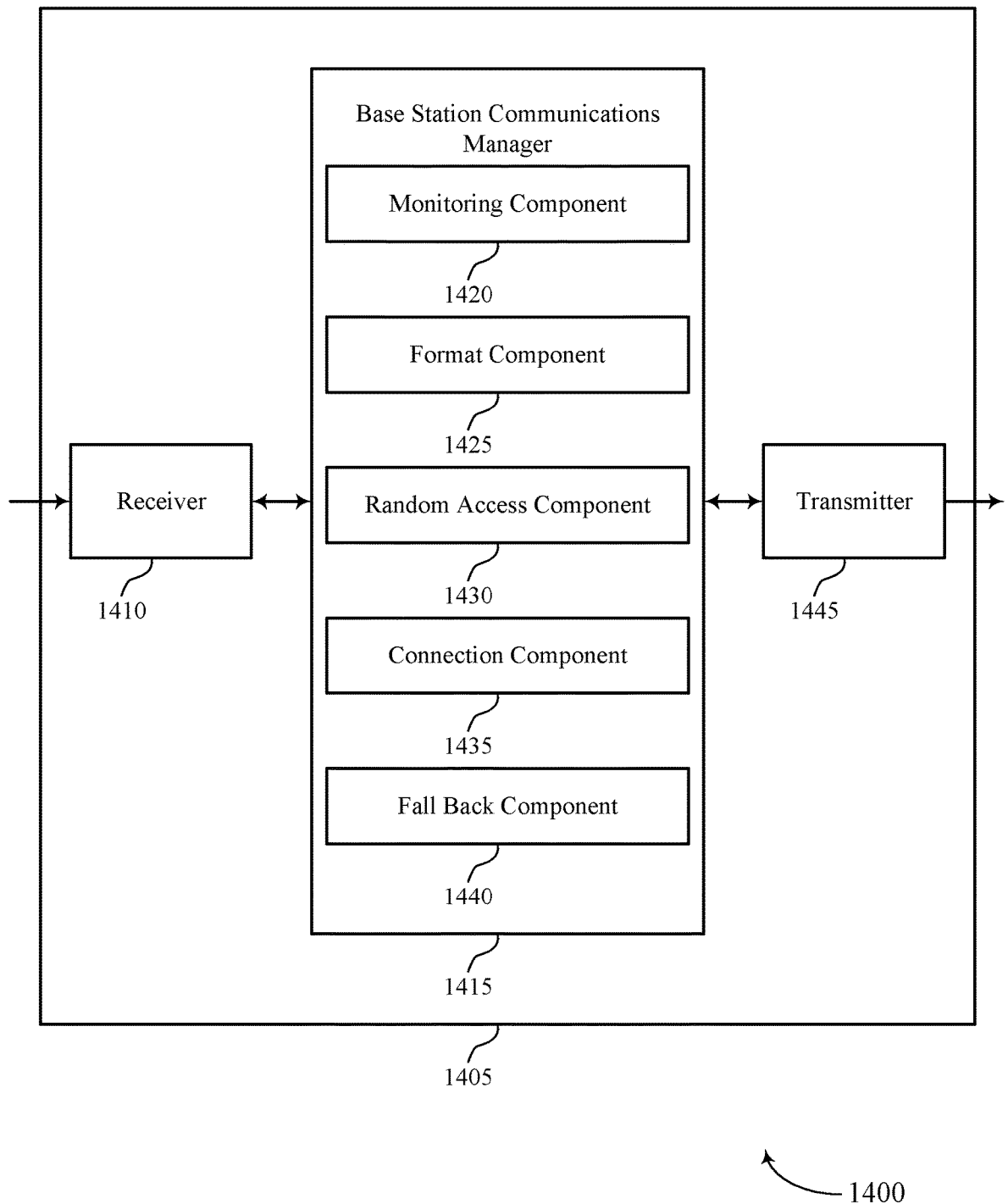

FIG. 14 illustrates a block diagram 1400 of an example device 1405 that supports random access procedure fallback. The device 1405 may be an example of aspects of a device 1305, or a base station 105 as described herein. The device 1405 may include a receiver 1410, a base station communications manager 1415, and a transmitter 1445. The device 1405 also may include a processor. Each of these components may be in communication with one another (such as via one or more buses).

The receiver 1410 may receive information such as packets, user data, or control information associated with various information channels (such as control channels, data channels, and information related to random access procedure fallback, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a monitoring component 1420, a format component 1425, a random access component 1430, a connection component 1435, and a fallback component 1440. The base station communications manager 1415 may be an example of aspects of the base station communications manager 1610 described herein.

In some implementations, the monitoring component 1420 may monitor a channel for receiving, from a UE, a first random access message of a first random access procedure, the first random access message including a random access preamble and a connection request.

In some other implementations, the monitoring component 1420 may monitor a channel for receiving, from a UE, a first random access message of a first random access procedure, the first random access message including a random access preamble and a first redundancy version of a connection request and identify an absence of the connection request or an inability to decode a payload of the first random access message based on the monitoring.

The format component 1425 may determine a format of a second random access message based on receiving the first random access message, where the format of the second random access message indicates one of: the first random access procedure or a second random access procedure.

The random access component 1430 may transmit, to the UE, the second random access message in response to the first random access message. In some implementations, the second random access message may be associated with one of: the first random access procedure or a second random access procedure.

The random access component 1430 may receive a third random access message in response to the indicated switch from the first random access procedure to a second random access procedure, the third random access message including at least one of a new data indicator or a second redundancy version of the connection request and transmit a fourth random access message in response to the third random access message, the fourth random access message including a connection setup message in response to the connection request.

The connection component 1435 may establish a connection with the base station based on the first random access message, the second random access message, and the indicated one of the first random access procedure or the second random access procedure.

The fallback component 1440 may transmit, in response to the first random access message, a second random access message indicating a switch from the first random access procedure to a second random access procedure.

The transmitter 1445 may transmit signals generated by other components of the device 1405. In some implementations, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
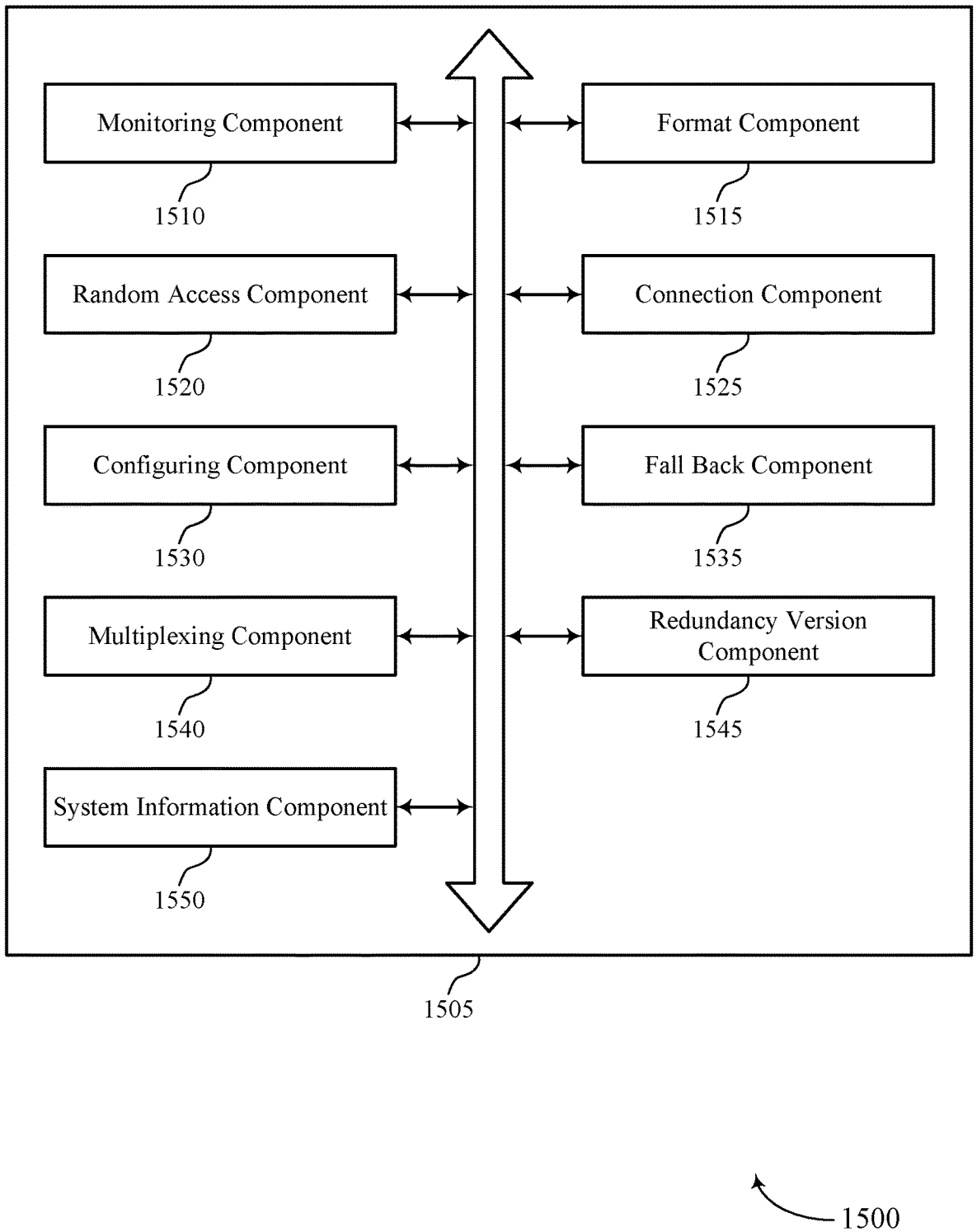
FIG. 15 illustrates a block diagram of an example base station communications manager that supports random access procedure fallback.

FIG. 15 illustrates a block diagram 1500 of an example base station communications manager 1505 that supports random access procedure fallback. The base station communications manager 1505 may be an example of aspects of a base station communications manager 1315, a base station communications manager 1415, or a base station communications manager 1610 described herein. The base station communications manager 1505 may include a monitoring component 1510, a format component 1515, a random access component 1520, a connection component 1525, a configuring component 1530, a fallback component 1535, a multiplexing component 1540, a redundancy version component 1545, and a system information component 1550. Each of these modules may communicate, directly or indirectly, with one another (such as via one or more buses).

The monitoring component 1510 may monitor a channel for receiving, from a UE, a first random access message of a first random access procedure, the first random access message including a random access preamble and a connection request.

In some implementations, the monitoring component 1510 may monitor a channel for receiving, from a UE, a first random access message of a first random access procedure, the first random access message including a random access preamble and a first redundancy version of a connection request. In some implementations, the monitoring component 1510 may determine a payload of the first random access message based on receiving the first random access message.

In some implementations, the monitoring component 1510 may identify the random access preamble and the connection request based on the monitoring. In some implementations, the monitoring component 1510 may identify an absence of the connection request or an inability to decode a payload of the first random access message based on the monitoring.

The format component 1515 may determine a format of a second random access message based on receiving the first random access message, where the format of the second random access message indicates one of: the first random access procedure or a second random access procedure.

The random access component 1520 may transmit, to the UE, the second random access message in response to the first random access message. In some implementations, the second random access message may be associated with one of: the first random access procedure or a second random access procedure.

In some implementations, the random access component 1520 may receive a third random access message in response to the indicated switch from the first random access procedure to a second random access procedure, the third random access message including at least one of a new data indicator or a second redundancy version of the connection request. In some implementations, the random access component 1520 may transmit a fourth random access message in response to the third random access message, the fourth random access message including a connection setup message in response to the connection request.

In some implementations, the random access component 1520 may receive, from the UE, a third random access message based on the switch from the first random access procedure to the second random access procedure, the third random access message including a retransmission of the connection request. In some implementations, the random access component 1520 may indicate, in the second random access message, the second redundancy version of the connection request for the third random access message.

The connection component 1525 may establish a connection with the base station based on the first random access message, the second random access message, and the indicated one of the first random access procedure or the second random access procedure. In some implementations, the connection component 1525 may establish a connection with the base station based on the response to the connection request.

The fallback component 1535 may transmit, in response to the first random access message, a second random access message indicating a switch from the first random access procedure to a second random access procedure.

In some implementations, the fallback component 1535 may determine that establishing the connection is further based on the third random access message and the fourth random access message. In some implementations, the first random access procedure is a two-step random access procedure and the second random access procedure is a four-step random access procedure. In some implementations, the second random access message includes a medium access control protocol data unit including at least an uplink grant, a timing advance command, a network identifier, and a reserved bit.

The configuring component 1530 may configure the second random access message to include a random access response and a connection setup message for the first random access procedure. In some implementations, the configuring component 1530 may configure the second random access message to include a preamble index and an uplink grant indicating a switch from the first random access procedure to the second random access procedure.

The multiplexing component 1540 may multiplex the second random access message with one or more additional random access messages for a random access response.

The redundancy version component 1545 may configure a subset of a set of supported redundancy versions. In some implementations, the redundancy version component 1545 may configure a set of supported redundancy versions.

The system information component 1550 may transmit, to the UE, a remaining system information transmission including the subset of the set of supported redundancy versions. In some implementations, the system information component 1550 may transmit a broadcast of system information prior to transmitting the first random access message, the system information identifying the set of supported redundancy versions for the first random access message or the third random access message.

Figure 16:
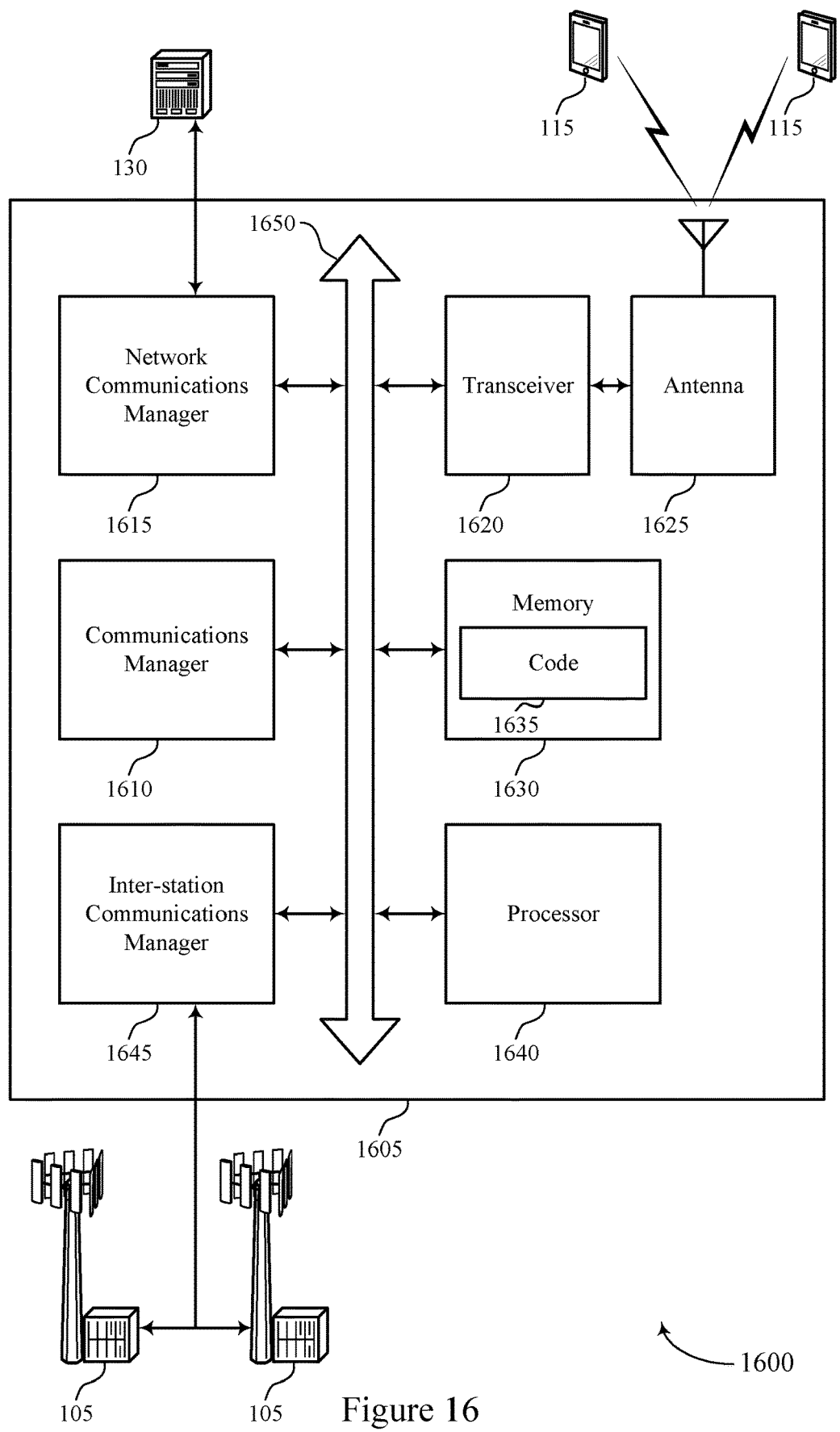
FIG. 16 illustrates a diagram of an example system including a device that supports random access procedure fallback.

FIG. 16 illustrates a diagram of an example system 1600 including a device 1605 that supports random access procedure fallback. The device 1605 may be an example of or include the components of device 1305, device 1405, or a base station 105 as described herein. The device 1605 may include components for bi-directional voice and data communications including components for transmitting and receiving communications, including a base station communications manager 1610, a network base station communications manager 1615, a transceiver 1620, an antenna 1625, memory 1630, a processor 1640, and an inter-station base station communications manager 1645. These components may be in electronic communication via one or more buses (such as bus 1650).

In some implementations, the base station communications manager 1610 may monitor a channel for receiving, from a UE, a first random access message of a first random access procedure, the first random access message including a random access preamble and a connection request, determine a format of a second random access message based on receiving the first random access message, where the format of the second random access message indicates one of: the first random access procedure or a second random access procedure, transmit, to the UE, the second random access message in response to the first random access message, and establish a connection with the base station based on the first random access message, the second random access message, and the indicated one of the first random access procedure or the second random access procedure.

In some implementations, the base station communications manager 1610 also may monitor a channel for receiving, from a UE, a first random access message of a first random access procedure, the first random access message including a random access preamble and a connection request, determine a payload of the first random access message based on receiving the first random access message, transmit, based on the determining, a second random access message in response to the first random access message, where the second random access message is associated with one of: the first random access procedure or a second random access procedure, and establish a connection with the base station based on the first random access message, the second random access message, and the associated one of the first random access procedure or the second random access procedure.

In some implementations, the base station communications manager 1610 also may monitor a channel for receiving, from a UE, a first random access message of a first random access procedure, the first random access message including a random access preamble and a first redundancy version of a connection request, identify an absence of the connection request or an inability to decode a payload of the first random access message based on the monitoring, transmit, in response to the first random access message, a second random access message indicating a switch from the first random access procedure to a second random access procedure, receive a third random access message in response to the indicated switch from the first random access procedure to a second random access procedure, the third random access message including at least one of a new data indicator or a second redundancy version of the connection request, and transmit a fourth random access message in response to the third random access message, the fourth random access message including a connection setup message in response to the connection request.

The network base station communications manager 1615 may manage communications with the core network (such as via one or more wired backhaul links). For example, the network base station communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 also may include a modem to modulate the packets and provide the modulated packets to the antennas for transmission, and to demodulate packets received from the antennas.

In some examples, the wireless device may include a single antenna 1625. However, in some examples the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (such as the processor 1640) cause the device to perform various functions described herein. In some examples, the memory 1630 may contain, among other things, a BIOS which may control basic hardware or software operation such as the interaction with peripheral components or devices.

The processor 1640 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory array using a memory controller. In some examples, a memory controller may be integrated into processor 1640. The processor 1640 may be configured to execute computer-readable instructions stored in a memory (such as the memory 1630) to cause the device 1605 to perform various functions (such as functions or tasks supporting random access procedure fallback).

The inter-station base station communications manager 1645 may manage communications with other base station 105, and may include a controller or scheduler for controlling communications with UEs 115 in cooperation with other base stations 105. For example, the inter-station base station communications manager 1645 may coordinate scheduling for transmissions to UEs 115 for various interference mitigation techniques such as beamforming or joint transmission. In some implementations, the inter-station base station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some examples, the code 1635 may not be directly executable by the processor 1640 but may cause a computer (such as when compiled and executed) to perform functions described herein.

Figure 17:
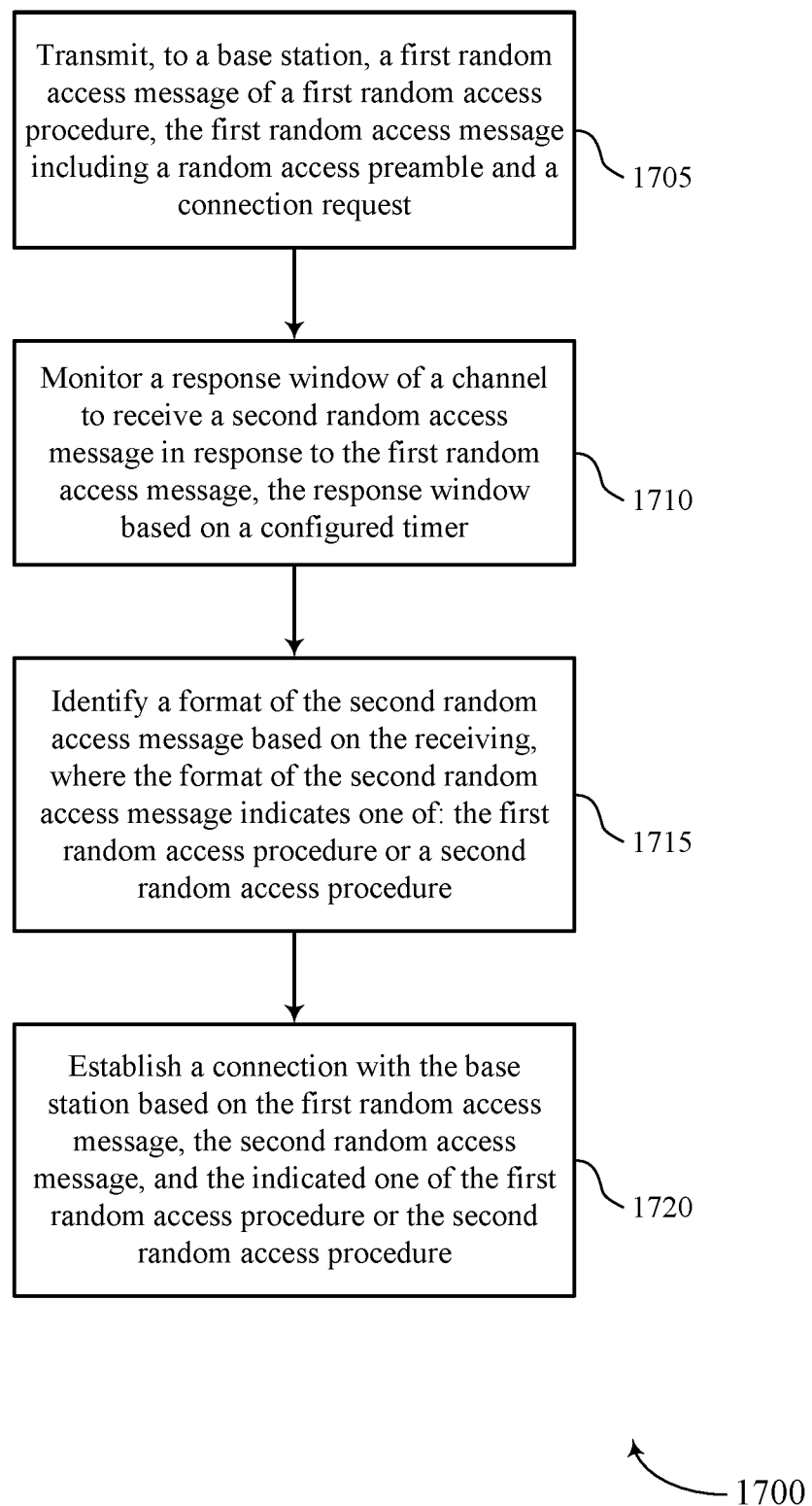
FIGS. 17-28 illustrate flowcharts illustrating example methods that support random access procedure fallback.

FIG. 17 illustrates a flowchart illustrating an example method 1700 that supports random access procedure fallback. The operations of method 1700 may be implemented by a UE 115 or its components as described herein. For example, the operations of method 1700 may be performed by a communications manager as described with reference to FIGS. 9-12. In some implementations, a UE may execute a set of instructions to control the functional elements of the UE to perform the functions described below. Additionally, or alternatively, a UE may perform aspects of the functions described below using special-purpose hardware.

At 1705, the UE may transmit, to a base station, a first random access message of a first random access procedure, the first random access message including a random access preamble and a connection request. The operations of 1705 may be performed according to the methods described herein. In some implementations, aspects of the operations of 1705 may be performed by a random access component as described with reference to FIGS. 9-12.

At 1710, the UE may monitor a response window of a channel to receive a second random access message in response to the first random access message, the response window based on a configured timer. The operations of 1710 may be performed according to the methods described herein. In some implementations, aspects of the operations of 1710 may be performed by a monitoring component as described with reference to FIGS. 9-12.

At 1715, the UE may identify a format of the second random access message based on the receiving, where the format of the second random access message indicates one of: the first random access procedure or a second random access procedure. The operations of 1715 may be performed according to the methods described herein. In some implementations, aspects of the operations of 1715 may be performed by a format component as described with reference to FIGS. 9-12.

At 1720, the UE may establish a connection with the base station based on the first random access message, the second random access message, and the indicated one of the first random access procedure or the second random access procedure. The operations of 1720 may be performed according to the methods described herein. In some implementations, aspects of the operations of 1720 may be performed by a connection component as described with reference to FIGS. 9-12.

Figure 18:
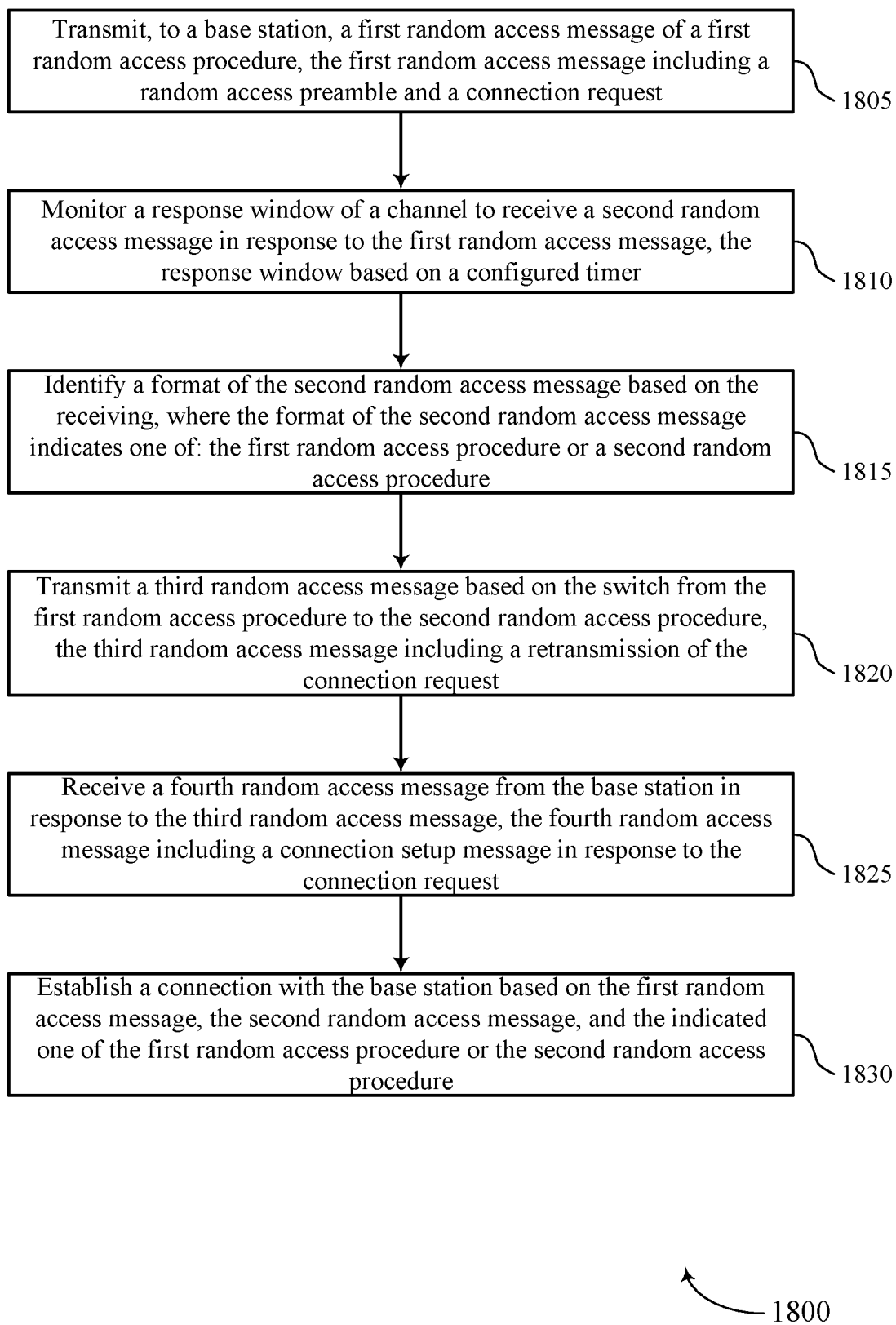

FIG. 18 illustrates a flowchart illustrating an example method 1800 that supports random access procedure fallback. The operations of method 1800 may be implemented by a UE 115 or its components as described herein. For example, the operations of method 1800 may be performed by a communications manager as described with reference to FIGS. 9-12. In some implementations, a UE may execute a set of instructions to control the functional elements of the UE to perform the functions described below. Additionally, or alternatively, a UE may perform aspects of the functions described below using special-purpose hardware.

At 1805, the UE may transmit, to a base station, a first random access message of a first random access procedure, the first random access message including a random access preamble and a connection request. The operations of 1805 may be performed according to the methods described herein. In some implementations, aspects of the operations of 1805 may be performed by a random access component as described with reference to FIGS. 9-12.

At 1810, the UE may monitor a response window of a channel to receive a second random access message in response to the first random access message, the response window based on a configured timer. The operations of 1810 may be performed according to the methods described herein. In some implementations, aspects of the operations of 1810 may be performed by a monitoring component as described with reference to FIGS. 9-12.

At 1815, the UE may identify a format of the second random access message based on the receiving, where the format of the second random access message indicates one of: the first random access procedure or a second random access procedure. The operations of 1815 may be performed according to the methods described herein. In some implementations, aspects of the operations of 1815 may be performed by a format component as described with reference to FIGS. 9-12.

At 1820, the UE may transmit a third random access message based on the switch from the first random access procedure to the second random access procedure, the third random access message including a retransmission of the connection request. The operations of 1820 may be performed according to the methods described herein. In some implementations, aspects of the operations of 1820 may be performed by a random access component as described with reference to FIGS. 9-12.

At 1825, the UE may receive a fourth random access message from the base station in response to the third random access message, the fourth random access message including a connection setup message in response to the connection request. The operations of 1825 may be performed according to the methods described herein. In some implementations, aspects of the operations of 1825 may be performed by a random access component as described with reference to FIGS. 9-12.

At 1830, the UE may establish a connection with the base station based on the first random access message, the second random access message, and the indicated one of the first random access procedure or the second random access procedure. The operations of 1830 may be performed according to the methods described herein. In some implementations, aspects of the operations of 1830 may be performed by a connection component as described with reference to FIGS. 9-12.

Figure 19:
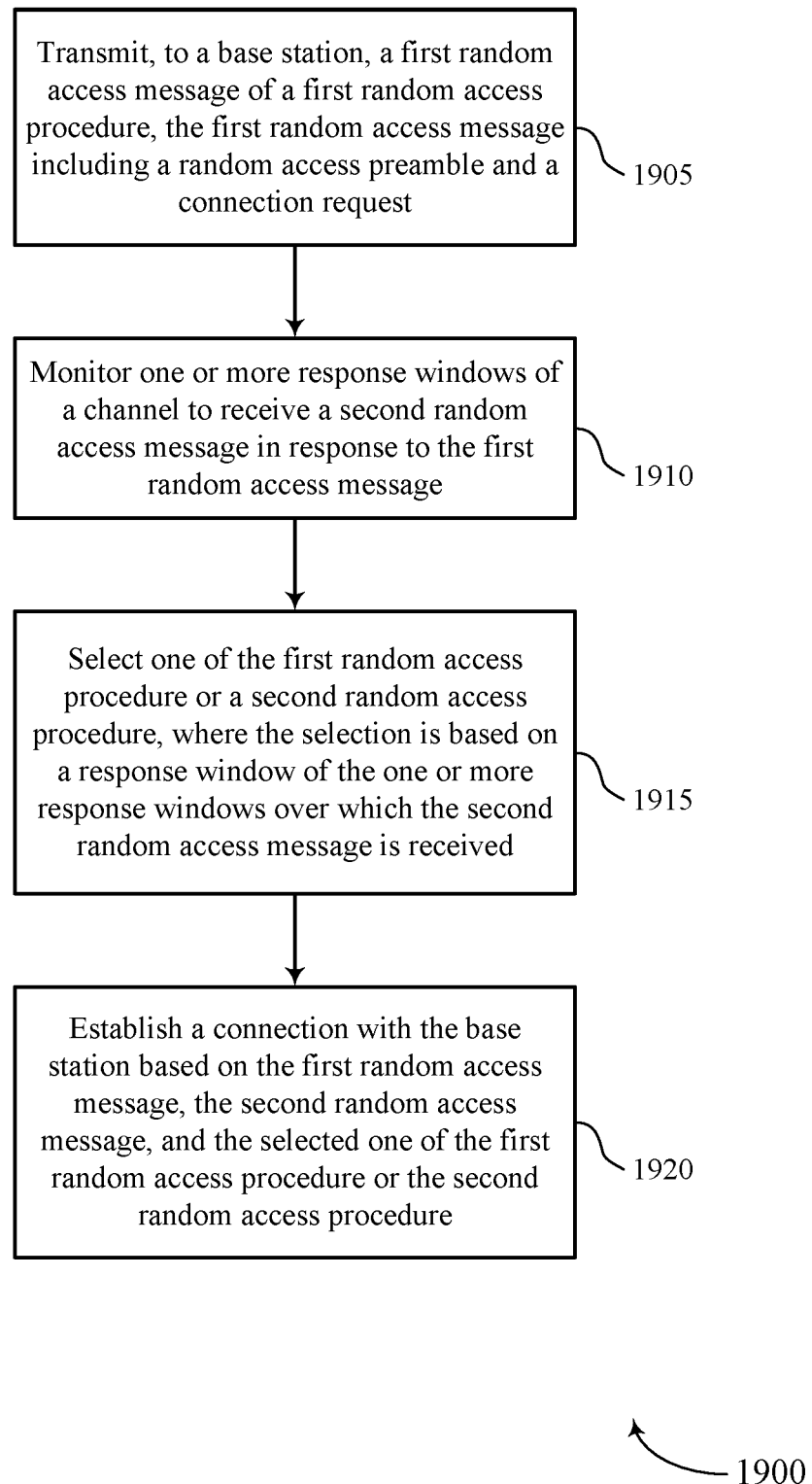

FIG. 19 illustrates a flowchart illustrating an example method 1900 that supports random access procedure fallback. The operations of method 1900 may be implemented by a UE 115 or its components as described herein. For example, the operations of method 1900 may be performed by a communications manager as described with reference to FIGS. 9-12. In some implementations, a UE may execute a set of instructions to control the functional elements of the UE to perform the functions described below. Additionally, or alternatively, a UE may perform aspects of the functions described below using special-purpose hardware.

At 1905, the UE may transmit, to a base station, a first random access message of a first random access procedure, the first random access message including a random access preamble and a connection request. The operations of 1905 may be performed according to the methods described herein. In some implementations, aspects of the operations of 1905 may be performed by a random access component as described with reference to FIGS. 9-12.

At 1910, the UE may monitor one or more response windows of a channel to receive a second random access message in response to the first random access message. The operations of 1910 may be performed according to the methods described herein. In some implementations, aspects of the operations of 1910 may be performed by a monitoring component as described with reference to FIGS. 9-12.

At 1915, the UE may select one of the first random access procedure or a second random access procedure, where the selection is based on a response window of the one or more response windows over which the second random access message is received. The operations of 1915 may be performed according to the methods described herein. In some implementations, aspects of the operations of 1915 may be performed by a selecting component as described with reference to FIGS. 9-12.

At 1920, the UE may establish a connection with the base station based on the first random access message, the second random access message, and the selected one of the first random access procedure or the second random access procedure. The operations of 1920 may be performed according to the methods described herein. In some implementations, aspects of the operations of 1920 may be performed by a connection component as described with reference to FIGS. 9-12.

Figure 20:
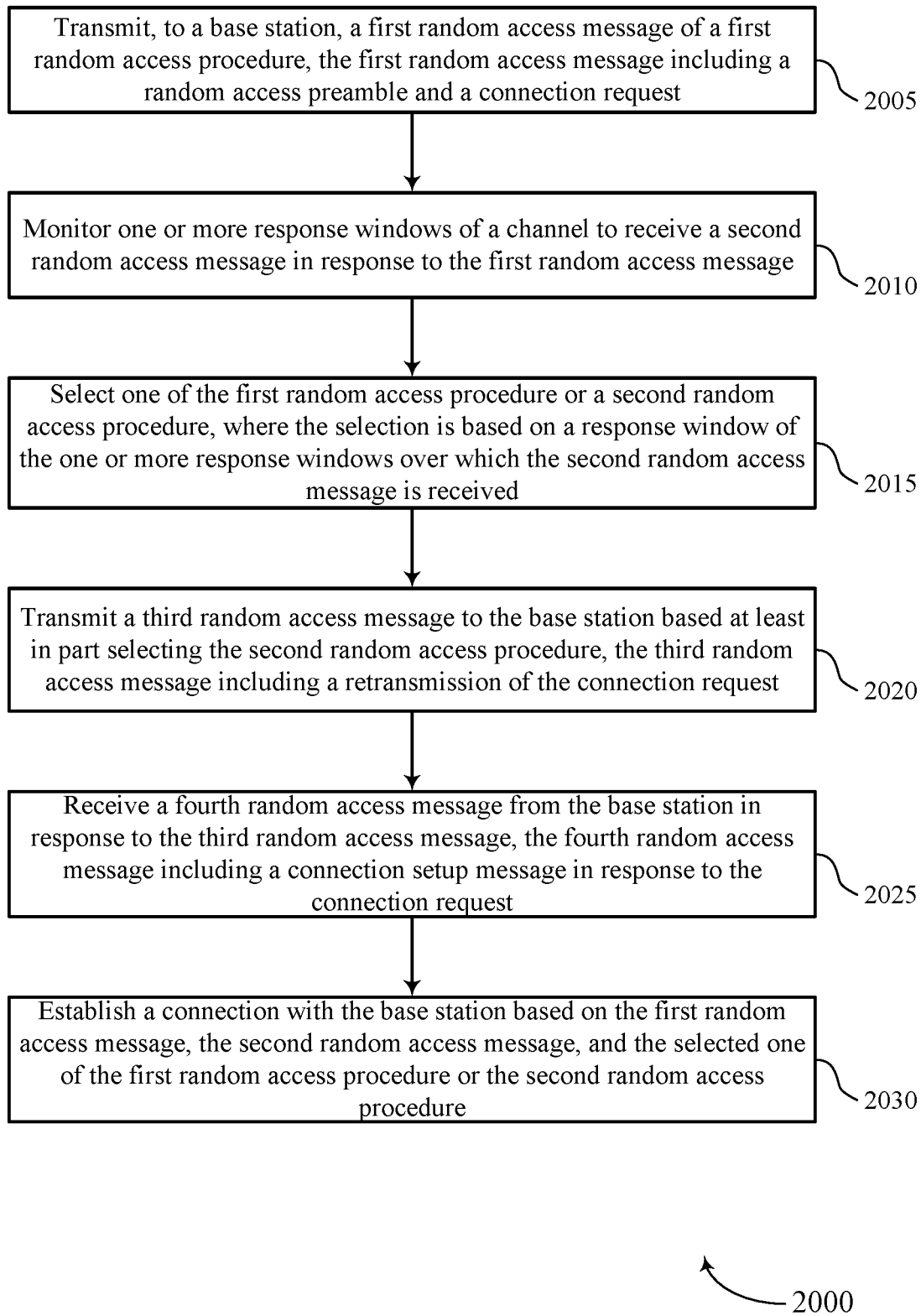

FIG. 20 illustrates a flowchart illustrating an example method 2000 that supports random access procedure fallback. The operations of method 2000 may be implemented by a UE 115 or its components as described herein. For example, the operations of method 2000 may be performed by a communications manager as described with reference to FIGS. 9-12. In some implementations, a UE may execute a set of instructions to control the functional elements of the UE to perform the functions described below. Additionally, or alternatively, a UE may perform aspects of the functions described below using special-purpose hardware.

At 2005, the UE may transmit, to a base station, a first random access message of a first random access procedure, the first random access message including a random access preamble and a connection request. The operations of 2005 may be performed according to the methods described herein. In some implementations, aspects of the operations of 2005 may be performed by a random access component as described with reference to FIGS. 9-12.

At 2010, the UE may monitor one or more response windows of a channel to receive a second random access message in response to the first random access message. The operations of 2010 may be performed according to the methods described herein. In some implementations, aspects of the operations of 2010 may be performed by a monitoring component as described with reference to FIGS. 9-12.

At 2015, the UE may select one of the first random access procedure or a second random access procedure, where the selection is based on a response window of the one or more response windows over which the second random access message is received. The operations of 2015 may be performed according to the methods described herein. In some implementations, aspects of the operations of 2015 may be performed by a selecting component as described with reference to FIGS. 9-12.

At 2020, the UE may transmit a third random access message to the base station based at least in part selecting the second random access procedure, the third random access message including a retransmission of the connection request. The operations of 2020 may be performed according to the methods described herein. In some implementations, aspects of the operations of 2020 may be performed by a random access component as described with reference to FIGS. 9-12.

At 2025, the UE may receive a fourth random access message from the base station in response to the third random access message, the fourth random access message including a connection setup message in response to the connection request. The operations of 2025 may be performed according to the methods described herein. In some implementations, aspects of the operations of 2025 may be performed by a random access component as described with reference to FIGS. 9-12.

At 2030, the UE may establish a connection with the base station based on the first random access message, the second random access message, and the selected one of the first random access procedure or the second random access procedure. The operations of 2030 may be performed according to the methods described herein. In some implementations, aspects of the operations of 2030 may be performed by a connection component as described with reference to FIGS. 9-12.

Figure 21:
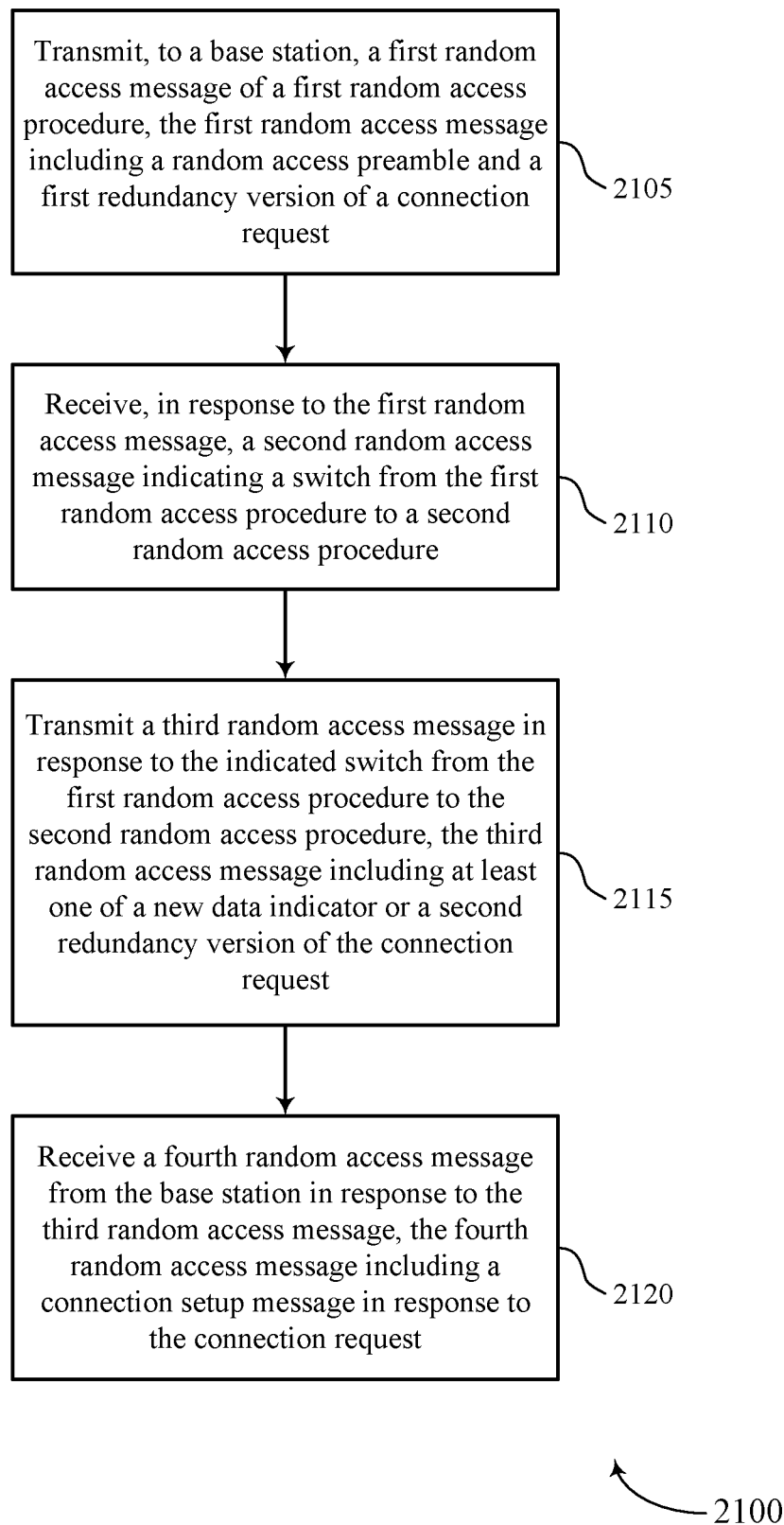

FIG. 21 illustrates a flowchart illustrating an example method 2100 that supports random access procedure fallback. The operations of method 2100 may be implemented by a UE 115 or its components as described herein. For example, the operations of method 2100 may be performed by a communications manager as described with reference to FIGS. 9-12. In some implementations, a UE may execute a set of instructions to control the functional elements of the UE to perform the functions described below. Additionally, or alternatively, a UE may perform aspects of the functions described below using special-purpose hardware.

At 2105, the UE may transmit, to a base station, a first random access message of a first random access procedure, the first random access message including a random access preamble and a first redundancy version of a connection request. The operations of 2105 may be performed according to the methods described herein. In some implementations, aspects of the operations of 2105 may be performed by a random access component as described with reference to FIGS. 9-12.

At 2110, the UE may receive, in response to the first random access message, a second random access message indicating a switch from the first random access procedure to a second random access procedure. The operations of 2110 may be performed according to the methods described herein. In some implementations, aspects of the operations of 2110 may be performed by a fallback component as described with reference to FIGS. 9-12.

At 2115, the UE may transmit a third random access message in response to the indicated switch from the first random access procedure to the second random access procedure, the third random access message including at least one of a new data indicator or a second redundancy version of the connection request. The operations of 2115 may be performed according to the methods described herein. In some implementations, aspects of the operations of 2115 may be performed by a random access component as described with reference to FIGS. 9-12.

At 2120, the UE may receive a fourth random access message from the base station in response to the third random access message, the fourth random access message including a connection setup message in response to the connection request. The operations of 2120 may be performed according to the methods described herein. In some implementations, aspects of the operations of 2120 may be performed by a random access component as described with reference to FIGS. 9-12.

Figure 22:
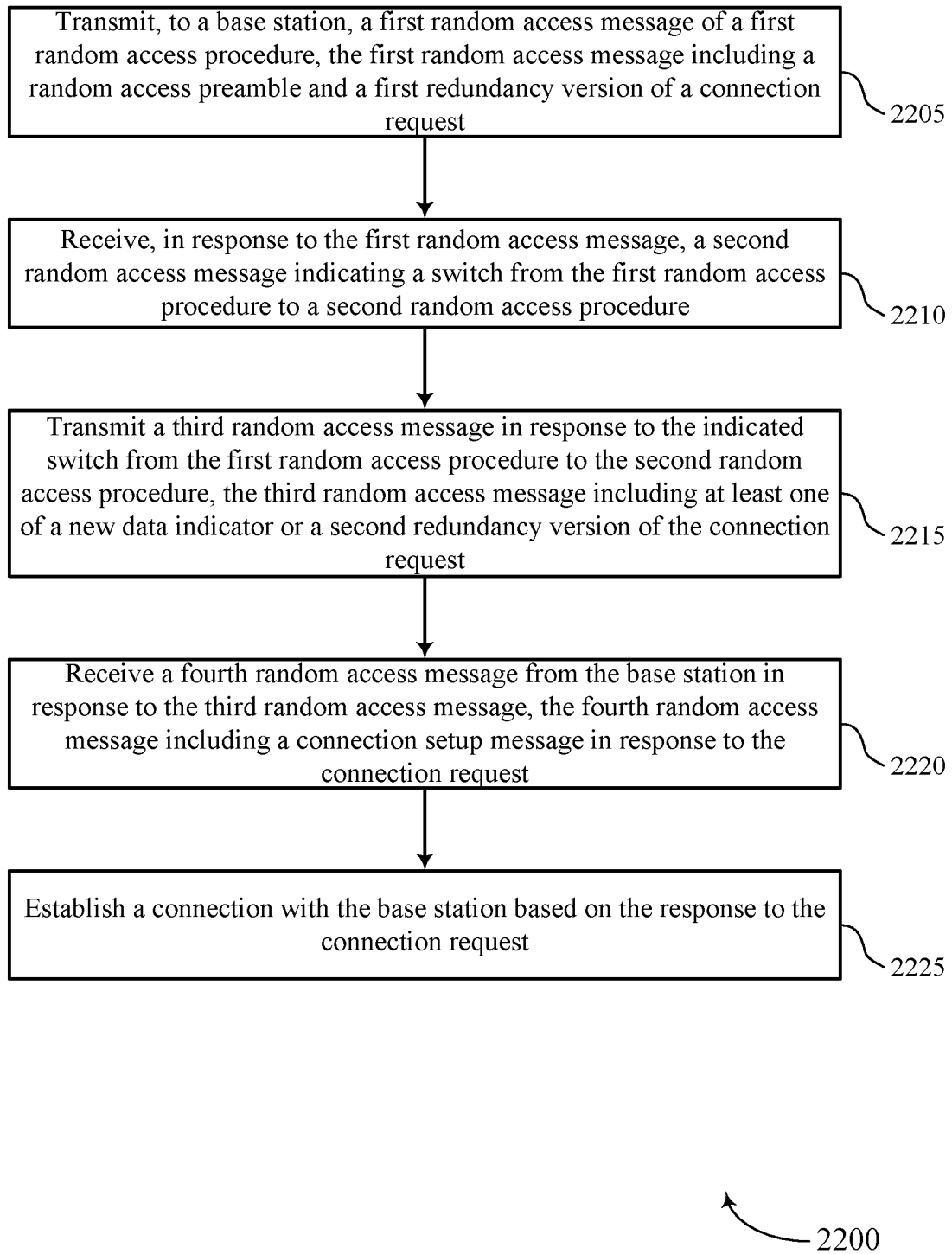

FIG. 22 illustrates a flowchart illustrating an example method 2200 that supports random access procedure fallback. The operations of method 2200 may be implemented by a UE 115 or its components as described herein. For example, the operations of method 2200 may be performed by a communications manager as described with reference to FIGS. 9-12. In some implementations, a UE may execute a set of instructions to control the functional elements of the UE to perform the functions described below. Additionally, or alternatively, a UE may perform aspects of the functions described below using special-purpose hardware.

At 2205, the UE may transmit, to a base station, a first random access message of a first random access procedure, the first random access message including a random access preamble and a first redundancy version of a connection request. The operations of 2205 may be performed according to the methods described herein. In some implementations, aspects of the operations of 2205 may be performed by a random access component as described with reference to FIGS. 9-12.

At 2210, the UE may receive, in response to the first random access message, a second random access message indicating a switch from the first random access procedure to a second random access procedure. The operations of 2210 may be performed according to the methods described herein. In some implementations, aspects of the operations of 2210 may be performed by a fallback component as described with reference to FIGS. 9-12.

At 2215, the UE may transmit a third random access message in response to the indicated switch from the first random access procedure to the second random access procedure, the third random access message including at least one of a new data indicator or a second redundancy version of the connection request. The operations of 2215 may be performed according to the methods described herein. In some implementations, aspects of the operations of 2215 may be performed by a random access component as described with reference to FIGS. 9-12.

At 2220, the UE may receive a fourth random access message from the base station in response to the third random access message, the fourth random access message including a connection setup message in response to the connection request. The operations of 2220 may be performed according to the methods described herein. In some implementations, aspects of the operations of 2220 may be performed by a random access component as described with reference to FIGS. 9-12.

At 2225, the UE may establish a connection with the base station based on the response to the connection request. The operations of 2225 may be performed according to the methods described herein. In some implementations, aspects of the operations of 2225 may be performed by a connection component as described with reference to FIGS. 9-12.

Figure 23:
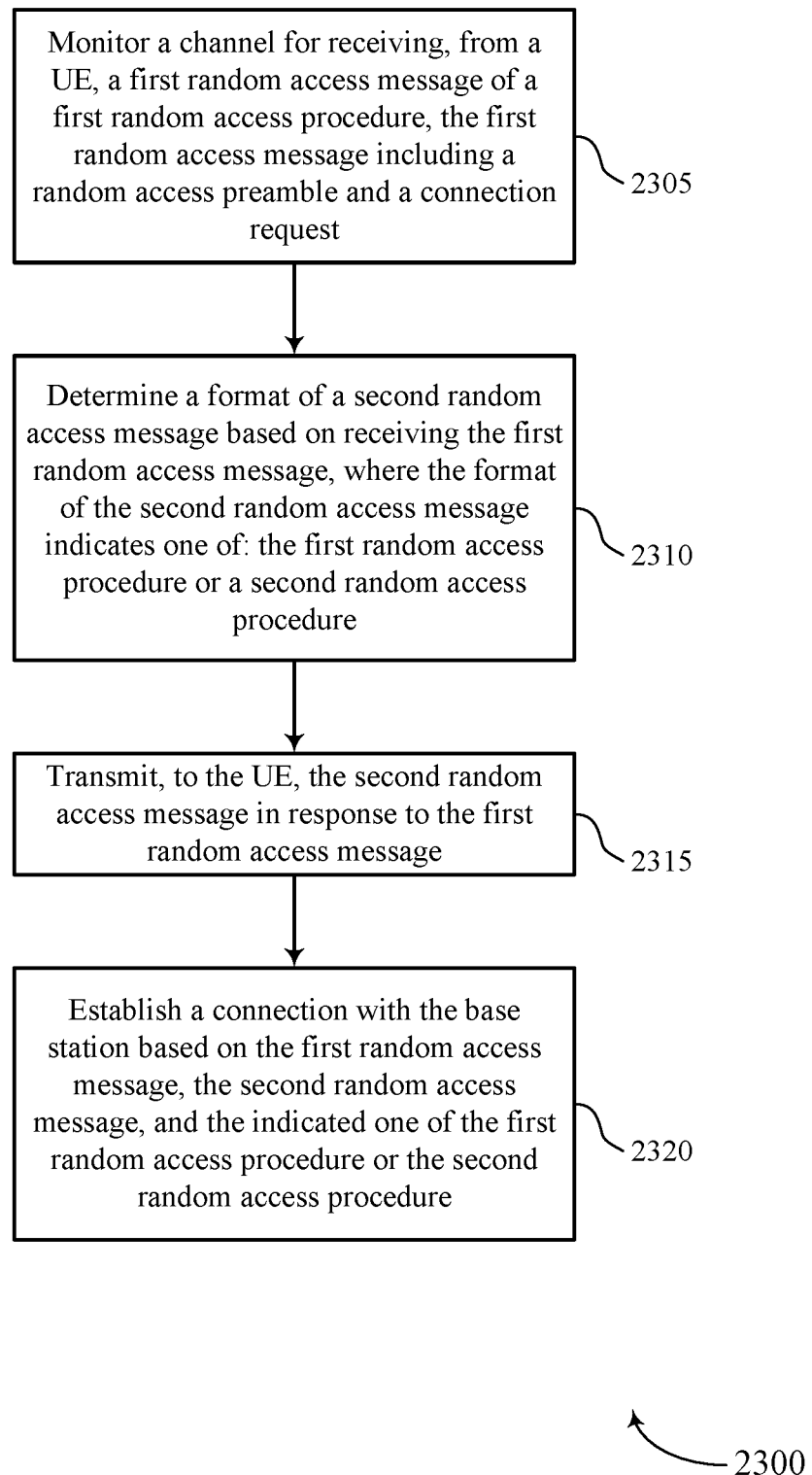

FIG. 23 illustrates a flowchart illustrating an example method 2300 that supports random access procedure fallback. The operations of method 2300 may be implemented by a base station 105 or its components as described herein. For example, the operations of method 2300 may be performed by a communications manager as described with reference to FIGS. 13-16. In some implementations, a base station may execute a set of instructions to control the functional elements of the base station to perform the functions described below. Additionally, or alternatively, a base station may perform aspects of the functions described below using special-purpose hardware.

At 2305, the base station may monitor a channel for receiving, from a UE, a first random access message of a first random access procedure, the first random access message including a random access preamble and a connection request. The operations of 2305 may be performed according to the methods described herein. In some implementations, aspects of the operations of 2305 may be performed by a monitoring component as described with reference to FIGS. 13-16.

At 2310, the base station may determine a format of a second random access message based on receiving the first random access message, where the format of the second random access message indicates one of: the first random access procedure or a second random access procedure. The operations of 2310 may be performed according to the methods described herein. In some implementations, aspects of the operations of 2310 may be performed by a format component as described with reference to FIGS. 13-16.

At 2315, the base station may transmit, to the UE, the second random access message in response to the first random access message. The operations of 2315 may be performed according to the methods described herein. In some implementations, aspects of the operations of 2315 may be performed by a random access component as described with reference to FIGS. 13-16.

At 2320, the base station may establish a connection with the base station based on the first random access message, the second random access message, and the indicated one of the first random access procedure or the second random access procedure. The operations of 2320 may be performed according to the methods described herein. In some implementations, aspects of the operations of 2320 may be performed by a connection component as described with reference to FIGS. 13-16.

Figure 24:
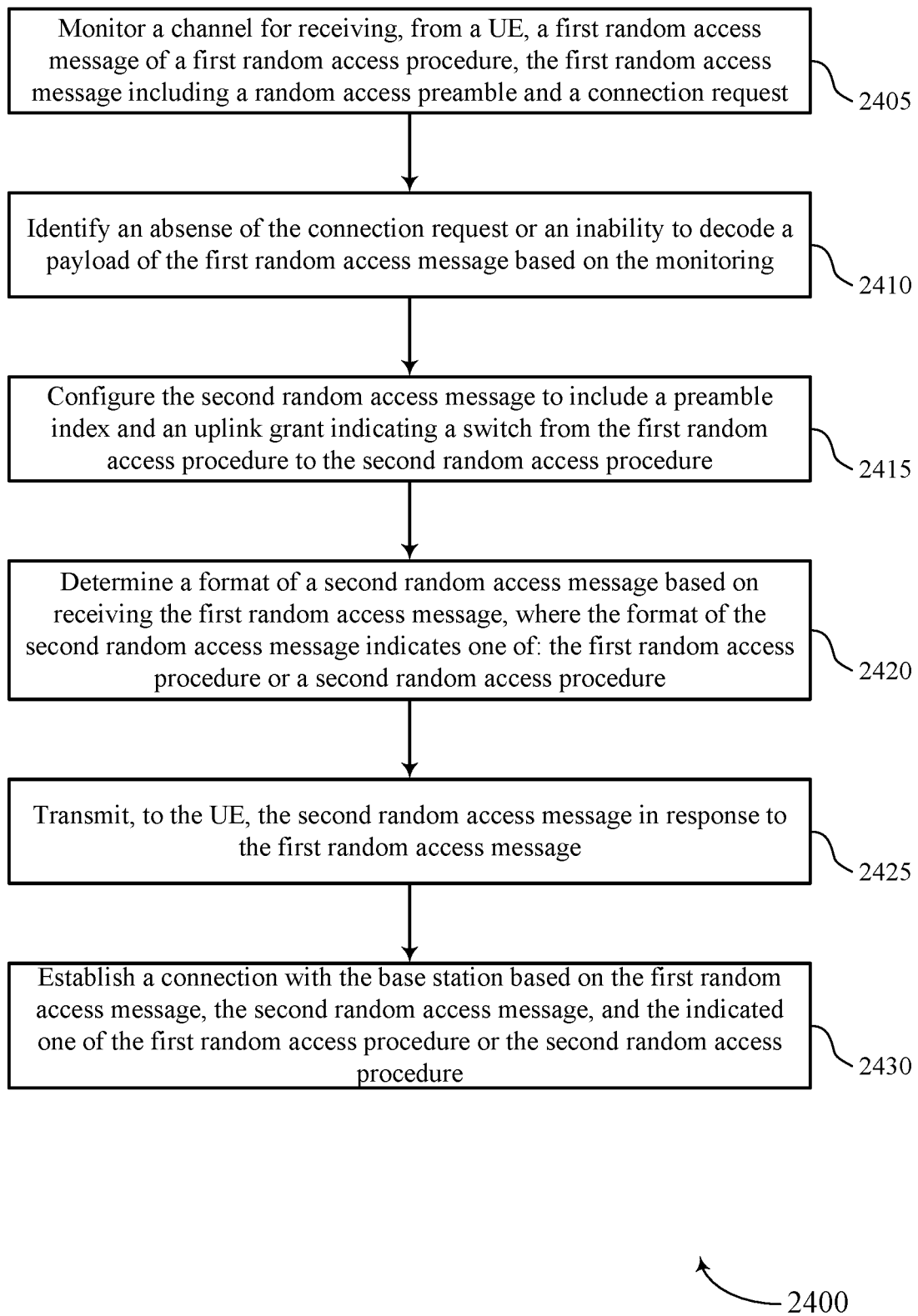

FIG. 24 illustrates a flowchart illustrating an example method 2400 that supports random access procedure fallback. The operations of method 2400 may be implemented by a base station 105 or its components as described herein. For example, the operations of method 2400 may be performed by a communications manager as described with reference to FIGS. 13-16. In some implementations, a base station may execute a set of instructions to control the functional elements of the base station to perform the functions described below. Additionally, or alternatively, a base station may perform aspects of the functions described below using special-purpose hardware.

At 2405, the base station may monitor a channel for receiving, from a UE, a first random access message of a first random access procedure, the first random access message including a random access preamble and a connection request. The operations of 2405 may be performed according to the methods described herein. In some implementations, aspects of the operations of 2405 may be performed by a monitoring component as described with reference to FIGS. 13-16.

At 2410, the base station may identify an absence of the connection request or an inability to decode a payload of the first random access message based on the monitoring. The operations of 2410 may be performed according to the methods described herein. In some implementations, aspects of the operations of 2410 may be performed by a monitoring component as described with reference to FIGS. 13-16.

At 2415, the base station may configure the second random access message to include a preamble index and an uplink grant indicating a switch from the first random access procedure to the second random access procedure. The operations of 2415 may be performed according to the methods described herein. In some implementations, aspects of the operations of 2415 may be performed by a configuring component as described with reference to FIGS. 13-16.

At 2420, the base station may determine a format of a second random access message based on receiving the first random access message, where the format of the second random access message indicates one of: the first random access procedure or a second random access procedure. The operations of 2420 may be performed according to the methods described herein. In some implementations, aspects of the operations of 2420 may be performed by a format component as described with reference to FIGS. 13-16.

At 2425, the base station may transmit, to the UE, the second random access message in response to the first random access message. The operations of 2425 may be performed according to the methods described herein. In some implementations, aspects of the operations of 2425 may be performed by a random access component as described with reference to FIGS. 13-16.

At 2430, the base station may establish a connection with the base station based on the first random access message, the second random access message, and the indicated one of the first random access procedure or the second random access procedure. The operations of 2430 may be performed according to the methods described herein. In some implementations, aspects of the operations of 2430 may be performed by a connection component as described with reference to FIGS. 13-16.

Figure 25:
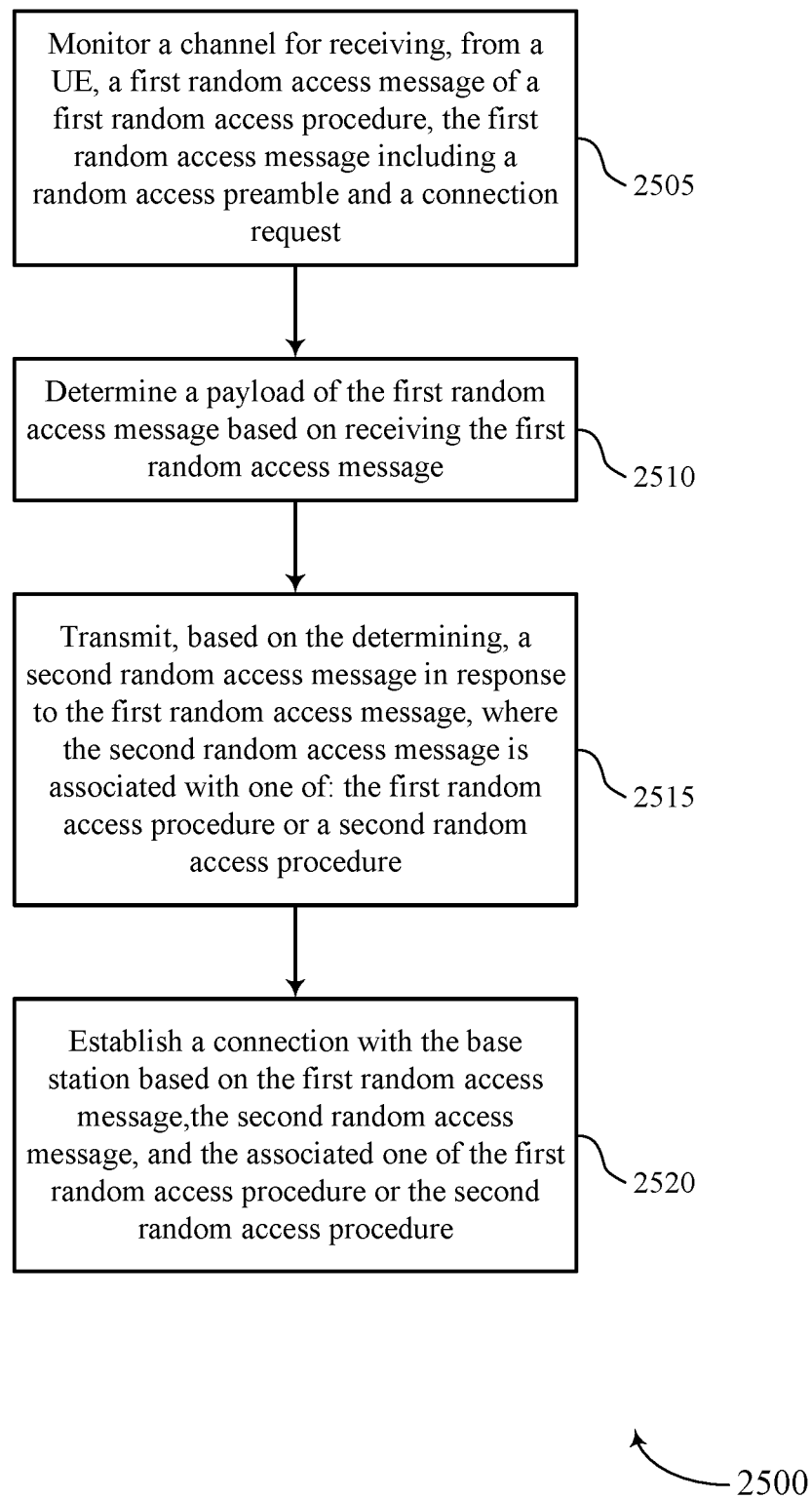

FIG. 25 illustrates a flowchart illustrating an example method 2500 that supports random access procedure fallback. The operations of method 2500 may be implemented by a base station 105 or its components as described herein. For example, the operations of method 2500 may be performed by a communications manager as described with reference to FIGS. 13-16. In some implementations, a base station may execute a set of instructions to control the functional elements of the base station to perform the functions described below. Additionally, or alternatively, a base station may perform aspects of the functions described below using special-purpose hardware.

At 2505, the base station may monitor a channel for receiving, from a UE, a first random access message of a first random access procedure, the first random access message including a random access preamble and a connection request. The operations of 2505 may be performed according to the methods described herein. In some implementations, aspects of the operations of 2505 may be performed by a monitoring component as described with reference to FIGS. 13-16.

At 2510, the base station may determine a payload of the first random access message based on receiving the first random access message. The operations of 2510 may be performed according to the methods described herein. In some implementations, aspects of the operations of 2510 may be performed by a monitoring component as described with reference to FIGS. 13-16.

At 2515, the base station may transmit, based on the determining, a second random access message in response to the first random access message, where the second random access message is associated with one of: the first random access procedure or a second random access procedure. The operations of 2515 may be performed according to the methods described herein. In some implementations, aspects of the operations of 2515 may be performed by a random access component as described with reference to FIGS. 13-16.

At 2520, the base station may establish a connection with the base station based on the first random access message, the second random access message, and the associated one of the first random access procedure or the second random access procedure. The operations of 2520 may be performed according to the methods described herein. In some implementations, aspects of the operations of 2520 may be performed by a connection component as described with reference to FIGS. 13-16.

Figure 26:
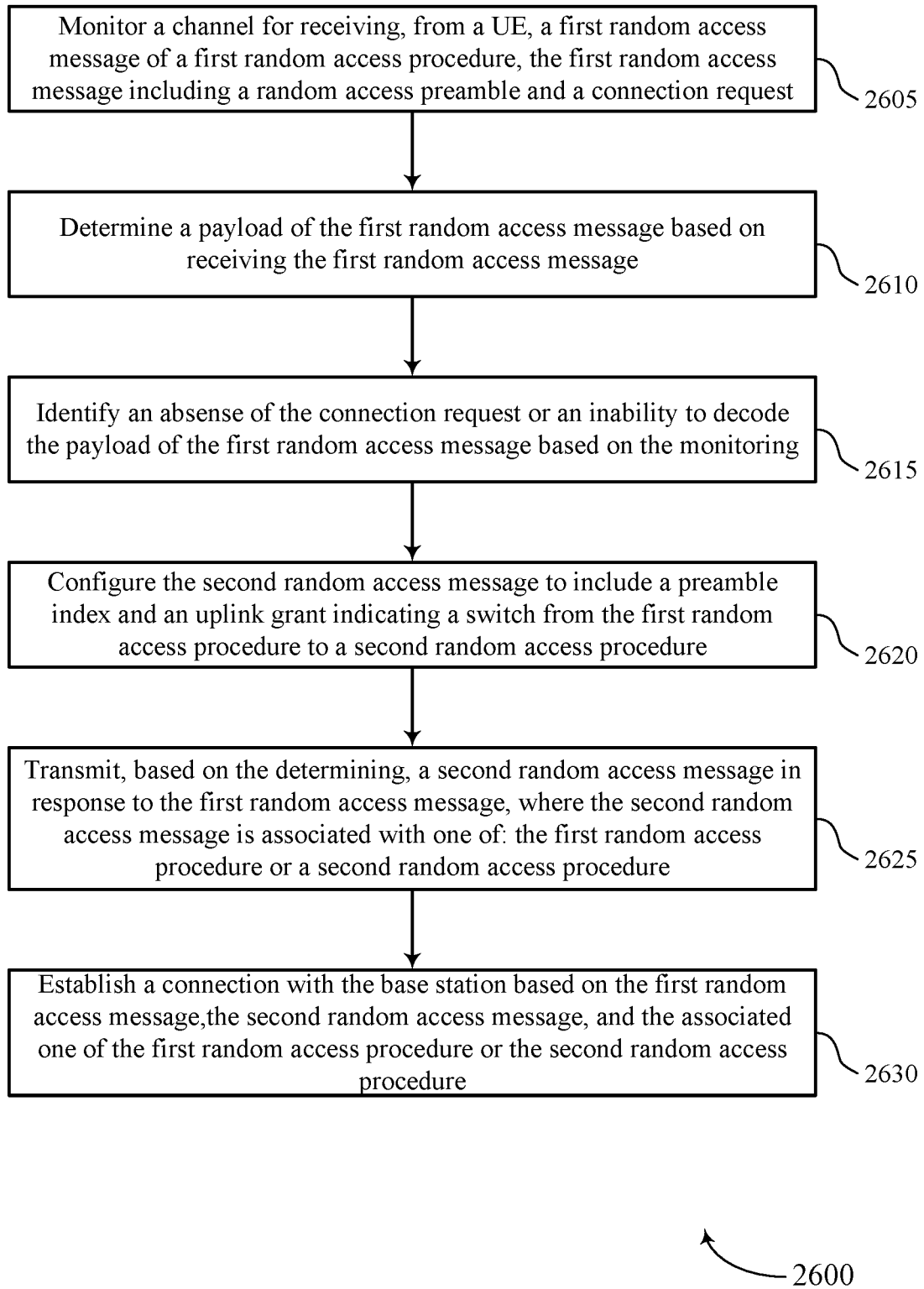

FIG. 26 illustrates a flowchart illustrating an example method 2600 that supports random access procedure fallback. The operations of method 2600 may be implemented by a base station 105 or its components as described herein. For example, the operations of method 2600 may be performed by a communications manager as described with reference to FIGS. 13-16. In some implementations, a base station may execute a set of instructions to control the functional elements of the base station to perform the functions described below. Additionally, or alternatively, a base station may perform aspects of the functions described below using special-purpose hardware.

At 2605, the base station may monitor a channel for receiving, from a UE, a first random access message of a first random access procedure, the first random access message including a random access preamble and a connection request. The operations of 2605 may be performed according to the methods described herein. In some implementations, aspects of the operations of 2605 may be performed by a monitoring component as described with reference to FIGS. 13-16.

At 2610, the base station may determine a payload of the first random access message based on receiving the first random access message. The operations of 2610 may be performed according to the methods described herein. In some implementations, aspects of the operations of 2610 may be performed by a monitoring component as described with reference to FIGS. 13-16.

At 2615, the base station may identify an absence of the connection request or an inability to decode the payload of the first random access message based on the monitoring. The operations of 2615 may be performed according to the methods described herein. In some implementations, aspects of the operations of 2615 may be performed by a monitoring component as described with reference to FIGS. 13-16.

At 2620, the base station may configure the second random access message to include a preamble index and an uplink grant indicating a switch from the first random access procedure to the second random access procedure. The operations of 2620 may be performed according to the methods described herein. In some implementations, aspects of the operations of 2620 may be performed by a configuring component as described with reference to FIGS. 13-16.

At 2625, the base station may transmit, based on the determining, a second random access message in response to the first random access message, where the second random access message is associated with one of: the first random access procedure or a second random access procedure. The operations of 2625 may be performed according to the methods described herein. In some implementations, aspects of the operations of 2625 may be performed by a random access component as described with reference to FIGS. 13-16.

At 2630, the base station may establish a connection with the base station based on the first random access message, the second random access message, and the associated one of the first random access procedure or the second random access procedure. The operations of 2630 may be performed according to the methods described herein. In some implementations, aspects of the operations of 2630 may be performed by a connection component as described with reference to FIGS. 13-16.

Figure 27:
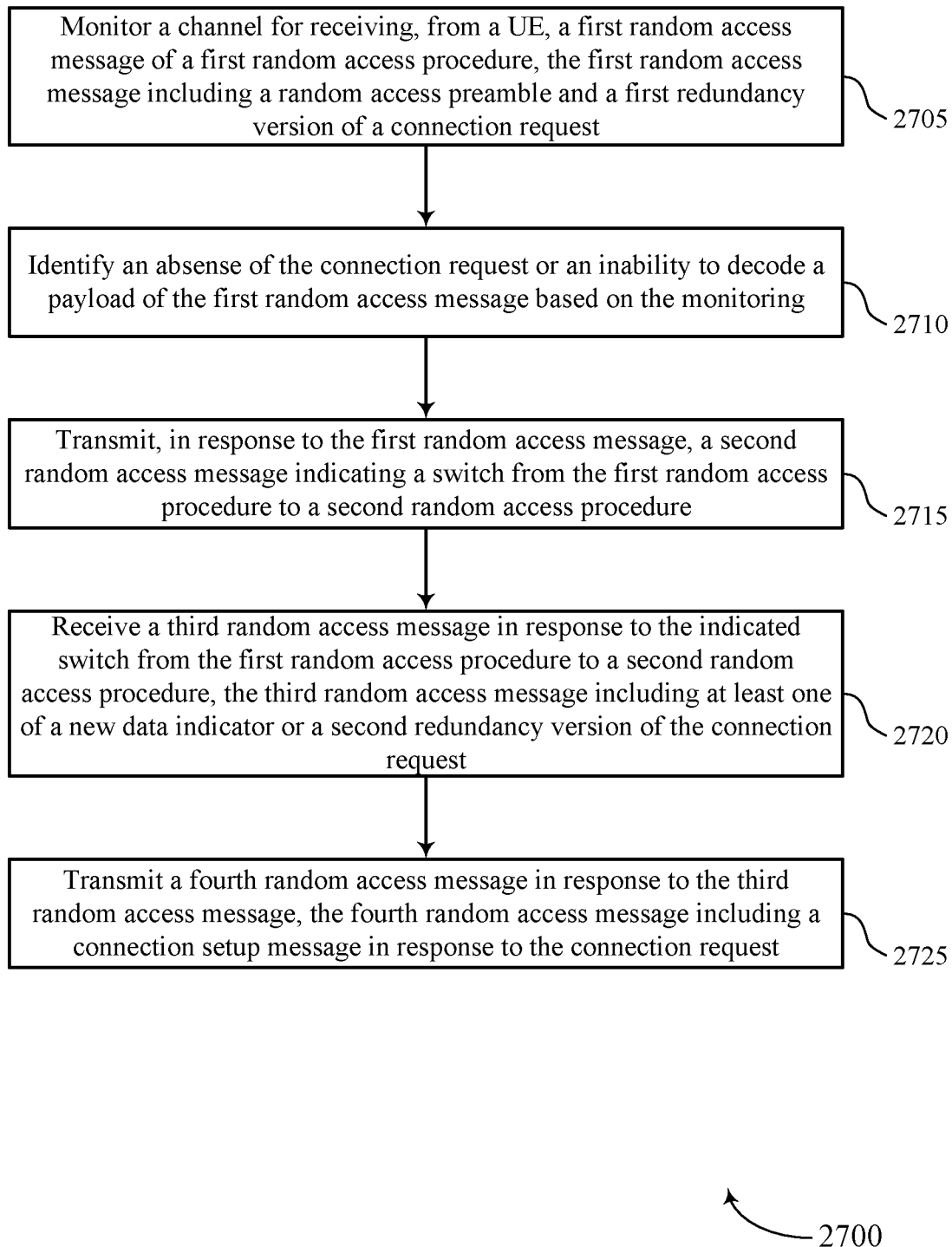

FIG. 27 illustrates a flowchart illustrating an example method 2700 that supports random access procedure fallback. The operations of method 2700 may be implemented by a base station 105 or its components as described herein. For example, the operations of method 2700 may be performed by a communications manager as described with reference to FIGS. 13-16. In some implementations, a base station may execute a set of instructions to control the functional elements of the base station to perform the functions described below. Additionally, or alternatively, a base station may perform aspects of the functions described below using special-purpose hardware.

At 2705, the base station may monitor a channel for receiving, from a UE, a first random access message of a first random access procedure, the first random access message including a random access preamble and a first redundancy version of a connection request. The operations of 2705 may be performed according to the methods described herein. In some implementations, aspects of the operations of 2705 may be performed by a monitoring component as described with reference to FIGS. 13-16.

At 2710, the base station may identify an absence of the connection request or an inability to decode a payload of the first random access message based on the monitoring. The operations of 2710 may be performed according to the methods described herein. In some implementations, aspects of the operations of 2710 may be performed by a monitoring component as described with reference to FIGS. 13-16.

At 2715, the base station may transmit, in response to the first random access message, a second random access message indicating a switch from the first random access procedure to a second random access procedure. The operations of 2715 may be performed according to the methods described herein. In some implementations, aspects of the operations of 2715 may be performed by a fallback component as described with reference to FIGS. 13-16.

At 2720, the base station may receive a third random access message in response to the indicated switch from the first random access procedure to a second random access procedure, the third random access message including at least one of a new data indicator or a second redundancy version of the connection request. The operations of 2720 may be performed according to the methods described herein. In some implementations, aspects of the operations of 2720 may be performed by a random access component as described with reference to FIGS. 13-16.

At 2725, the base station may transmit a fourth random access message in response to the third random access message, the fourth random access message including a connection setup message in response to the connection request. The operations of 2725 may be performed according to the methods described herein. In some implementations, aspects of the operations of 2725 may be performed by a random access component as described with reference to FIGS. 13-16.

Figure 28:
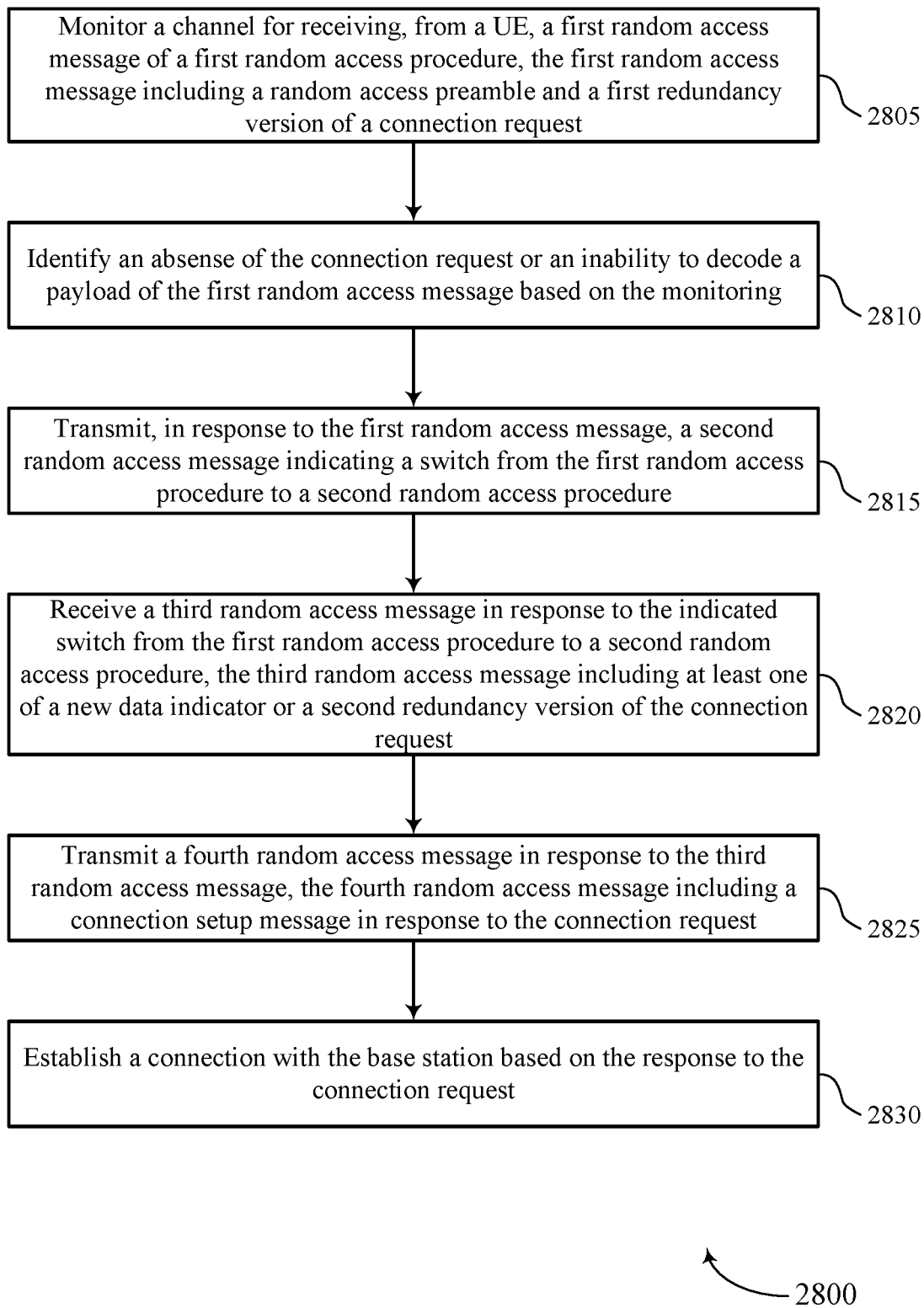

FIG. 28 illustrates a flowchart illustrating an example method 2800 that supports random access procedure fallback. The operations of method 2800 may be implemented by a base station 105 or its components as described herein. For example, the operations of method 2800 may be performed by a communications manager as described with reference to FIGS. 13-16. In some implementations, a base station may execute a set of instructions to control the functional elements of the base station to perform the functions described below. Additionally, or alternatively, a base station may perform aspects of the functions described below using special-purpose hardware.

At 2805, the base station may monitor a channel for receiving, from a UE, a first random access message of a first random access procedure, the first random access message including a random access preamble and a first redundancy version of a connection request. The operations of 2805 may be performed according to the methods described herein. In some implementations, aspects of the operations of 2805 may be performed by a monitoring component as described with reference to FIGS. 13-16.

At 2810, the base station may identify an absence of the connection request or an inability to decode a payload of the first random access message based on the monitoring. The operations of 2810 may be performed according to the methods described herein. In some implementations, aspects of the operations of 2810 may be performed by a monitoring component as described with reference to FIGS. 13-16.

At 2815, the base station may transmit, in response to the first random access message, a second random access message indicating a switch from the first random access procedure to a second random access procedure. The operations of 2815 may be performed according to the methods described herein. In some implementations, aspects of the operations of 2815 may be performed by a fallback component as described with reference to FIGS. 13-16.

At 2820, the base station may receive a third random access message in response to the indicated switch from the first random access procedure to a second random access procedure, the third random access message including at least one of a new data indicator or a second redundancy version of the connection request. The operations of 2820 may be performed according to the methods described herein. In some implementations, aspects of the operations of 2820 may be performed by a random access component as described with reference to FIGS. 13-16.

At 2825, the base station may transmit a fourth random access message in response to the third random access message, the fourth random access message including a connection setup message in response to the connection request. The operations of 2825 may be performed according to the methods described herein. In some implementations, aspects of the operations of 2825 may be performed by a random access component as described with reference to FIGS. 13-16.

At 2830, the base station may establish a connection with the base station based on the response to the connection request. The operations of 2830 may be performed according to the methods described herein. In some implementations, aspects of the operations of 2830 may be performed by a connection component as described with reference to FIGS. 13-16.

It should be noted that the methods described herein describe possible implementations, and that the operations and the steps may be rearranged or otherwise modified and that other implementations are possible. Further, aspects from two or more of the methods may be combined.

An OFDMA system may implement a radio technology such as Ultra Mobile Broadband (UMB), E-UTRA, IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (such as several kilometers in radius) and may allow unrestricted access by UEs with service subscriptions with the network provider. A small cell may be associated with a lower-powered base station, as compared with a macro cell, and a small cell may operate in the same or different (such as licensed, unlicensed, etc.) frequency bands as macro cells. Small cells may include pico cells, femto cells, and micro cells according to various implementations. A pico cell, for example, may cover a small geographic area and may allow unrestricted access by UEs with service subscriptions with the network provider. A femto cell also may cover a small geographic area (such as a home) and may provide restricted access by UEs having an association with the femto cell (such as UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (such as two, three, four, and the like) cells, and also may support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, multiple of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Some features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication at a user equipment (UE), comprising:
    sensing a first channel prior to a random access preamble and a radio resource control (RRC) connection request included in a first random access message;
    transmitting, to a base station, the first random access message, wherein the RRC connection request is transmitted over one or more physical uplink shared channel transmit occasions based at least in part on sensing the first channel and wherein the RRC connection request is transmitted using a fixed redundancy version for the RRC connection request, wherein the fixed redundancy version is for transmission of the RRC connection request and for retransmission of the RRC connection request;
    monitoring a response window of a second channel to receive a second random access message in response to the first random access message, the response window based at least in part on a configured timer, wherein the second random access message indicates one of: successful first random access message reception or a fallback procedure; and
    establishing a connection with the base station, based, at least in part, on the first random access message and the second random access message.

2. The method of claim 1, wherein:
    the second random access message comprises at least a random access response and a connection setup message, the random access response and the connection setup message indicating the successful first random access message reception.

3. The method of claim 1, wherein:
    the second random access message comprises at least a preamble index and an uplink grant, the preamble index and the uplink grant indicating the fallback procedure.

4. The method of claim 3, further comprising:
    transmitting a third random access message based at least in part on the second random access message indicating the fallback procedure, the third random access message comprising the retransmission of the RRC connection request, wherein the third random access message is transmitted using the fixed redundancy version for the RRC connection request;
    receiving a fourth random access message from the base station in response to the third random access message, the fourth random access message comprising a connection setup message in response to the RRC connection request; and
    wherein establishing the connection is further based at least in part on the third random access message and the fourth random access message.

5. The method of claim 1, wherein monitoring the response window of the second channel further comprises:
    initiating the response window of the second channel following the RRC connection request.

6. The method of claim 1, wherein monitoring the response window of the second channel further comprises:
    initiating the response window of the second channel following the random access preamble and prior to the RRC connection request.

7. The method of claim 1, wherein:
    the successful first random access message reception is associated with a two-step random access procedure and the fallback procedure is associated with a four-step random access procedure.

8. The method of claim 1, wherein:
    the second random access message comprises a first format if indicating the successful first random access message reception and a second format if indicating the fallback procedure.

9. An apparatus for wireless communication at a user equipment (UE), comprising:
    a processor,
    memory coupled with the processor; and
    instructions stored in the memory and executable by the processor to cause the apparatus to:
        sense a first channel prior to a random access preamble and a radio resource control (RRC) connection request included in a first random access message;
        transmit, to a base station, the first random access message, wherein the RRC connection request is transmitted over one or more physical uplink shared channel transmit occasions based at least in part on sensing the first channel and wherein the RRC connection request is transmitted using a fixed redundancy version for the RRC connection request, wherein the fixed redundancy version is for transmission of the RRC connection request and for retransmission of the RRC connection request;
monitor a response window of a second channel to receive a second random access message in response to the first random access message, the response window based at least in part on a configured timer, wherein the second random access message indicates one of: successful first random access message reception or a fallback procedure; and
establish a connection with the base station based at least in part on the first random access message and the second random access message.

10. The apparatus of claim 9, wherein:
the second random access message comprises at least a random access response and a connection setup message, the random access response and the connection setup message indicating the successful first random access message reception.

11. The apparatus of claim 9, wherein:
the second random access message comprises at least a preamble index and an uplink grant, the preamble index and the uplink grant indicating the fallback procedure.

12. The apparatus of claim 11, wherein the instructions are further executable by the processor to cause the apparatus to:
transmit a third random access message based at least in part on the second random access message comprising the preamble index and the uplink grant, the third random access message comprising the retransmission of the RRC connection request, wherein the third random access message is transmitted using the fixed redundancy version for the RRC connection request;
receive a fourth random access message from the base station in response to the third random access message, the fourth random access message comprising a connection setup message in response to the RRC connection request; and
wherein establishing the connection is further based at least in part on the third random access message and the fourth random access message.

13. The apparatus of claim 9, wherein the instructions to monitor the response window of the second channel further are executable by the processor to cause the apparatus to:
initiate the response window of the second channel following the RRC connection request.

14. The apparatus of claim 9, wherein:
the successful first random access message reception is associated with a two-step random access procedure and the fallback procedure is associated with a four-step random access procedure.

15. The apparatus of claim 9, wherein:
the second random access message comprises a first format if indicating the successful first random access message reception and a second format if indicating the fallback procedure.

16. An apparatus for wireless communication at a user equipment (UE), comprising:
means for sensing a first channel prior to a random access preamble and a radio resource control (RRC) connection request included in a first random access message;
means for transmitting, to a base station, the first random access message, wherein the RRC connection request is transmitted over one or more physical uplink shared channel transmit occasions based at least in part on sensing the first channel and wherein the RRC connection request is transmitted using a fixed redundancy version for the RRC connection request, wherein the fixed redundancy version is for transmission of the RRC connection request and for retransmission of the RRC connection request;
means for monitoring a response window of a second channel to receive a second random access message in response to the first random access message, the response window based at least in part on a configured timer, wherein the second random access message indicates one of: successful first random access message reception or a fallback procedure; and
means for establishing a connection with the base station based at least in part on the first random access message and the second random access message.

17. The apparatus of claim 16, wherein:
the second random access message comprises at least a random access response and a connection setup message, the random access response and the connection setup message indicating the successful first random access message reception.

18. The apparatus of claim 16, wherein:
the second random access message comprises at least a preamble index and an uplink grant, the preamble index and the uplink grant indicating the fallback procedure.

19. The apparatus of claim 18, further comprising:
means for transmitting a third random access message based at least in part on the second random access message indicating the fallback procedure, the third random access message comprising the retransmission of the RRC connection request, wherein the third random access message is transmitted using the fixed redundancy version for the RRC connection request;
means for receiving a fourth random access message from the base station in response to the third random access message, the fourth random access message comprising a connection setup message in response to the RRC connection request; and
wherein establishing the connection is further based at least in part on the third random access message and the fourth random access message.

20. The apparatus of claim 16, wherein the means for monitoring the response window of the second channel further comprises:
means for initiating the response window of the second channel following the RRC connection request.

21. The apparatus of claim 16, wherein the means for monitoring the response window of the second channel further comprises:
means for initiating the response window of the second channel following the random access preamble and prior to the RRC connection request.

22. The apparatus of claim 16, wherein the successful first random access message reception is associated with a two-step random access procedure and the fallback procedure is associated with a four-step random access procedure.

23. The apparatus of claim 16, wherein:
the second random access message comprises a first format if indicating the successful first random access message reception and a second format if indicating the fallback procedure.

24. A non-transitory computer-readable medium storing code for wireless communication at a user equipment (UE), the code comprising instructions executable by a processor to:
sense a first channel prior to a random access preamble and a radio resource control (RRC) connection request included in a first random access message;

transmit, to a base station, the first random access message, wherein the RRC connection request is transmitted over one or more physical uplink shared channel transmit occasions based at least in part on sensing the first channel and wherein the RRC connection request is transmitted using a fixed redundancy version for the RRC connection request, wherein the fixed redundancy version is for transmission of the RRC connection request and for retransmission of the RRC connection request;

monitor a response window of a second channel to receive a second random access message in response to the first random access message, the response window based at least in part on a configured timer, wherein the second random access message indicates one of: successful first random access message reception or a fallback procedure; and establish a connection with the base station based at least in part on the first random access message and the second random access message.

25. The non-transitory computer-readable medium of claim 24, wherein:

the second random access message comprises at least a random access response and a connection setup message, the random access response and the connection setup message indicating the successful first random access message reception.

26. The non-transitory computer-readable medium of claim 24, wherein:

the second random access message comprises at least a preamble index and an uplink grant, the preamble index and the uplink grant indicating the fallback procedure.

27. The non-transitory computer-readable medium of claim 26, wherein the instructions are further executable to:

transmit a third random access message based at least in part on the second random access message indicating the fallback procedure, the third random access message comprising the retransmission of the RRC connection request, wherein the third random access message is transmitted using the fixed redundancy version for the RRC connection request;

receive a fourth random access message from the base station in response to the third random access message, the fourth random access message comprising a connection setup message in response to the RRC connection request; and wherein establishing the connection is further based at least in part on the third random access message and the fourth random access message.

28. The non-transitory computer-readable medium of claim 24, wherein the instructions to monitor the response window of the second channel further are executable to:

initiate the response window of the second channel following the RRC connection request.

29. The non-transitory computer-readable medium of claim 24, wherein the successful first random access message reception is associated with a two-step random access procedure and the fallback procedure is associated with a four-step random access procedure.

30. The non-transitory computer-readable medium of claim 24, wherein:

the second random access message comprises a first format if indicating the successful first random access message reception and a second format if indicating the fallback procedure.

* * * * *